US012567198B2

(12) United States Patent
Roychowdhury et al.

(10) Patent No.: US 12,567,198 B2
(45) Date of Patent: Mar. 3, 2026

(54) METHODS AND APPARATUS FOR SENSOR-ASSISTED PART DEVELOPMENT IN ADDITIVE MANUFACTURING USING A MACHINE LEARNING MODEL

(71) Applicant: General Electric Company, Evendale, OH (US)

(72) Inventors: Subhrajit Roychowdhury, Cohoes, NY (US); Rogier Sebastiaan Blom, Clifton Park, NY (US); Steven J. Duclos, Clifton Park, NY (US); Anthony J. Vinciquerra, Rexford, NY (US); Xiaohu Ping, Halfmoon, NY (US); Voramon S. Dheeradhada, Latham, NY (US); Brent Brunell, Clifton Park, NY (US); Sharath Aramanekoppa, Bangalore (IN)

(73) Assignee: General Electric Company, Evendale, OH (US)

( * ) Notice: Subject to any disclaimer, the term of this patent is extended or adjusted under 35 U.S.C. 154(b) by 780 days.

(21) Appl. No.: 17/840,401

(22) Filed: Jun. 14, 2022

(65) Prior Publication Data

US 2023/0410412 A1 Dec. 21, 2023

(51) Int. Cl.
*G06T 15/08* (2011.01)
*B29C 64/386* (2017.01)
(Continued)

(52) U.S. Cl.
CPC ............ *G06T 15/08* (2013.01); *B29C 64/386* (2017.08); *B33Y 50/00* (2014.12);
(Continued)

(58) Field of Classification Search
CPC ....... G05T 15/08; B33Y 50/00; B29C 64/386; G05B 19/40199; G05B 2219/35134; G05B 2219/49023
(Continued)

(56) References Cited

U.S. PATENT DOCUMENTS 6,995,334 B1 2/2006 Kovacevic et al.
7,497,977 B2 3/2009 Nielsen et al.
(Continued)

FOREIGN PATENT DOCUMENTS

CN 112487601 A 3/2021
WO 2018029478 A1 2/2018
(Continued)

OTHER PUBLICATIONS

Rongxuan et al., "In Situ Melt Pool Measurements for Laser Powder Bed Fusion Using Multi-Sensing and Correlation Analysis," Scientific Reports, vol. 12, No. 1, URL:[https://www.nature.com/articles/s41598-022-18096-w], dated Aug. 2022, 17 pages.
(Continued)

*Primary Examiner* — Md Abul Azad
(74) *Attorney, Agent, or Firm* — Hanley, Flight & Zimmerman, LLC

(57) ABSTRACT

Methods and apparatus for sensor-based part development are disclosed. An example apparatus includes at least one memory, instructions in the apparatus, and processor circuitry to execute the instructions to translate at least one user-defined material property selection into a desired process observable, the desired process observable including a meltpool property, perform voxel-based autozoning of an input part geometry, the input part geometry based on a computer-generated design, and output a voxelized reference map for the input part geometry based on the desired process observable and the voxel-based autozoning.

20 Claims, 26 Drawing Sheets

(51) Int. Cl.
    *B33Y 50/00*       (2015.01)
    *G05B 19/4099*    (2006.01)

(52) U.S. Cl.
    CPC ................... *G05B 19/4099* (2013.01); *G05B*
         *2219/35134* (2013.01); *G05B 2219/49023*
                                  (2013.01)

(58) Field of Classification Search
    USPC ........................................................ 700/118
    See application file for complete search history.

(56)               References Cited

U.S. PATENT DOCUMENTS

| | | |
|---|---|---|
| 10,507,549 B2 | 12/2019 | Buller et al. |
| 10,821,512 B2 | 11/2020 | Yuan et al. |
| 2010/0125356 A1* | 5/2010 | Shkolnik ................ B33Y 30/00 |
| | | 700/118 |
| 2017/0239891 A1 | 8/2017 | Buller et al. |
| 2019/0001658 A1* | 1/2019 | Mathews, Jr. ......... B22F 10/85 |
| 2019/0056717 A1 | 2/2019 | Kothari |
| 2019/0213789 A1* | 7/2019 | Uyyala ................. G06T 17/005 |
| 2019/0217416 A1 | 7/2019 | Brochu |
| 2019/0272665 A1* | 9/2019 | X ............................. G06T 15/08 |
| 2019/0389137 A1 | 12/2019 | Frohnmaier et al. |
| 2020/0147868 A1 | 5/2020 | Gold |
| 2020/0189197 A1 | 6/2020 | Spears |
| 2020/0218628 A1* | 7/2020 | Mathews, Jr. ......... B33Y 50/00 |
| 2020/0230884 A1 | 7/2020 | Buggenthin |
| 2020/0242495 A1 | 7/2020 | Roychowdhury et al. |
| 2020/0242496 A1 | 7/2020 | Salasoo et al. |
| 2020/0272127 A1 | 8/2020 | Roychowdhury et al. |
| 2020/0331059 A1 | 10/2020 | Acharya |
| 2020/0393813 A1* | 12/2020 | Gupta ................... B33Y 50/02 |
| 2021/0034037 A1* | 2/2021 | Rangarajan ........ G06K 15/1823 |
| 2021/0048802 A1* | 2/2021 | Pal ................... G05B 19/41885 |
| 2021/0200187 A1 | 7/2021 | Zeng |
| 2021/0349428 A1 | 11/2021 | Riss |
| 2022/0402038 A1* | 12/2022 | Tourangeau ........... G06T 19/00 |
| 2023/0158595 A1 | 5/2023 | Huang |

FOREIGN PATENT DOCUMENTS

| | | |
|---|---|---|
| WO | 2018031594 | 2/2018 |
| WO | 2018070993 | 4/2018 |
| WO | 2020028431 | 2/2020 |
| WO | 2021015714 | 1/2021 |

OTHER PUBLICATIONS

European Patent Office, "Extended European Search Report," issued in connection with European Patent Application No. 23178993.4, mailed on Sep. 29, 2023, 7 pages.

European Patent Office, "Extended European Search Report," issued in connection with European Application No. 23156555.7, dated Nov. 10, 2023, 10 pages.

United States Patent and Trademark Office, "Non-Final Office Action," issued in connection with U.S. Appl. No. 17/840,386, dated Dec. 17, 2024, 15 pages.

The State Intellectual Property Office of the People's Republic of China, "First Office Action and First Search," issued in connection with Application No. 202310549272.6, dated Dec. 26, 2025, 20 pages [English translation included].

\* cited by examiner

100

150

500

START

502
MATERIAL PROPERTIES INPUT
(e.g., porosity, surface finish, etc.)

504
PART GEOMETRY INPUT

506
GENERATE VOXELIZED REFERENCE MAP

508
TRAIN MELTPOOL
FEATURE
EXTRACTING
CIRCUITRY

507
FEATURE EXTRACTING CIRCUITRY
PREVIOUSLY TRAINED?

NO

YES

510
GENERATE A SCAN FILE

512
UPDATE SCAN FILE

516
PERFORM ERROR IDENTIFICATION AND
PARAMETER ADJUSTMENT(S)

END

506

GENERATE VOXELIZED REFERENCE MAP

TRANSLATE MATERIAL PROPERTIES INTO DESIRED PROCESS OBSERVABLES (e.g., meltpool dimensions) — 602

AUTOZONE A COMPLEX PART TO ASSIGN THE DESIRED MATERIAL PROPERTY TO DIFFERENT SECTION(S) OF THE PART — 604

ASSIGN REFERENCE TO EACH VOXEL — 606

VOXELIZED REFERENCE MAP — 608

RETURN

508

1000

TARGET PART QUALITY
POROSITY, LOF, SF

1002

1004

GEOMETRY FEATURE
BULK, THIN WALL,
OVERHANG,...

1006

PROCESS OBSERVABLES

TEMPERATURE,
MELTPOOL WIDTH, ...

1050

1052

DESIRED DEPTH IN UM

VERTICAL DISTANCE FROM POWDER 1054
IN NUMBER OF LAYERS

1400

1450

1452
DEPTH PREDICTOR

1454
WIDTH PREDICTOR

1456
HEIGHT PREDICTOR

RMSE: 20.2
MAPE: 20.9%

RMSE: 12.2
MAPE: 6.9%

RMSE: 13.5
MAPE: 12%

METHODS AND APPARATUS FOR SENSOR-ASSISTED PART DEVELOPMENT IN ADDITIVE MANUFACTURING USING A MACHINE LEARNING MODEL

FIELD OF THE DISCLOSURE

This disclosure relates generally to additive manufacturing and, more particularly, to methods and apparatus for sensor-assisted part development in additive manufacturing.

BACKGROUND

Additive manufacturing technologies (e.g., three-dimensional (3D) printing) permit formation of three-dimensional parts from computer-aided design (CAD) models. For example, a 3D printed part can be formed layer-by-layer by adding material in successive steps until a physical part is formed. Numerous industries (e.g., engineering, manufacturing, healthcare, etc.) have adopted additive manufacturing technologies to produce a variety of products, ranging from custom medical devices to aviation parts.

Figure 1A:
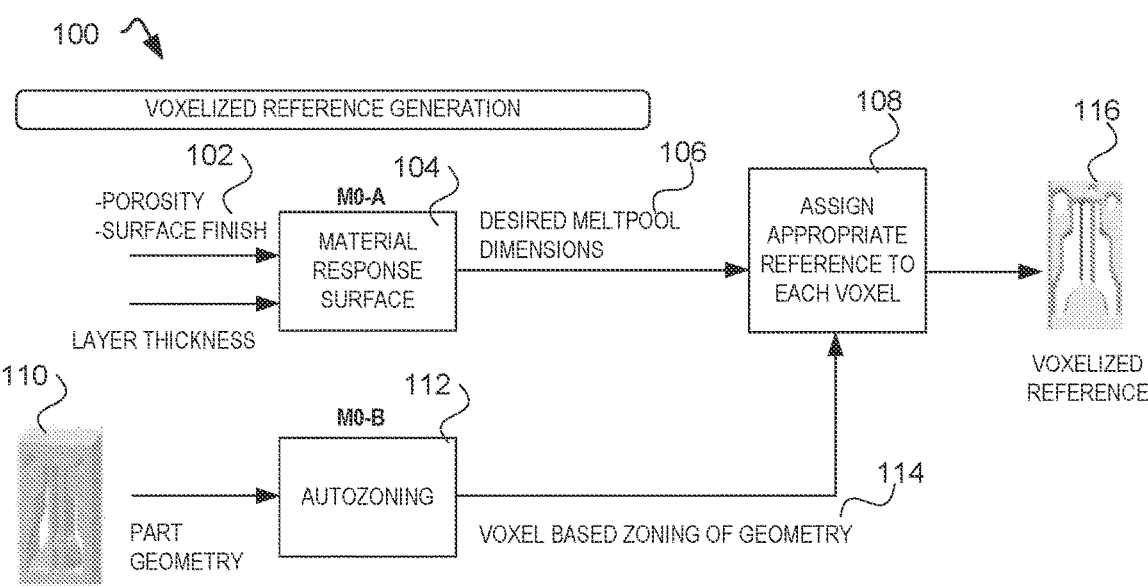
FIG. 1A illustrates example voxelized reference generation for sensor-assisted part development based on the apparatus and methods disclosed herein.

The figures are not to scale. In general, the same reference numbers will be used throughout the drawing(s) and accompanying written description to refer to the same or like parts. Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe an exemplary implementation and not to be taken limiting on the scope of the subject matter described in this disclosure. Certain features from different aspects of the following description may be combined to form yet new aspects of the subject matter discussed below.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

As used herein, the terms "system," "unit," "module," "component," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, or system may include a hard-wires device that performs operations based on hard-wired logic of the device. Various modules, units, component, and/or systems shown in the attached figures may represent the hardware that operates based on software or hardwired instructions, the software that directs hardware to perform the operations, or a combination thereof.

Additive manufacturing (AM), also known as 3D-printing, permits the formation of physical objects from three-dimensional (3D) model data using layer-by-layer material addition. For example, consumer and industrial-type 3D printers can be used for fabrication of 3D objects, with the goal of replicating a structure generated using computer-aided design (CAD) software. Complex 3D geometries including high-resolution internal features can be printed without the use of tooling, with sections of the geometries varied based on the type of material selected for forming the structure. However, 3D printing requires the assessment of printing parameters, such as 3D printer-specific settings, to determine which parameters result in the highest quality build (e.g., limiting presence of defects and/or deviations from the original CAD-based model). Such a process is especially important when 3D printed parts and/or objects are used in products intended for particular uses (e.g., aviation, medicine, etc.), as opposed to just prototyping needs. However, selection of build parameters attaining 3D printed object quality standards is time consuming and expensive, given the need to run numerous tests and evaluate numerous 3D printed parts prior to identifying the parameters that are most appropriate for a given material and/or 3D part design. For example, such parameters may need to be established separately for each material and/or each individual geometry. Accordingly, methods and apparatus that permit the use of in-situ information during the 3D printing process to control part quality would be welcomed in the technology.

AM-based processes are diverse and include powder bed fusion, material extrusion, and material jetting. For example, powder bed fusion uses either a laser or an electron beam to melt and fuse the material together to form a 3D structure. Powder bed fusion can include multi jet fusion (MJF), direct metal laser sintering (DMLS), direct metal laser melting (DMLM), electron beam melting (EBM), selective laser sintering (SLS), among others. For example, DMLM uses lasers to melt ultra-thin layers of metal powder to create the 3D object, with the object built directly from a CAD file (e.g., .STL file) generated using CAD data. Using a laser to selectively melt thin layers of metal particles permits objects to exhibit homogenous characteristics with fine details. A variety of materials can be used to form 3D objects using additive manufacturing, depending on the intended final application (e.g., prototyping, medical devices, aviation parts, etc.). For example, the DMLM process can include the use of titanium, stainless steel, superalloys, and aluminum, among others. For example, titanium can withstand high pressures and temperatures, superalloys (e.g., cobalt chrome) can be more appropriate for applications in jet engines (e.g., turbine and engine parts) and the chemical industry, while 3D printed parts formed from aluminum can be used in automotive and thermal applications.

Powder bed fusion techniques such as DMLM use a fabrication process that is determined by a range of controlled and uncontrolled process parameters. Such parameters can vary throughout the geometry of different regions of a given part (e.g., bulk, thin walls, overhangs, contours, downskins, upskins, etc.). For example, laser control parameters (e.g., power, velocity, spot size, beam shape, etc.) as well as powder layer parameters (e.g., material, density, layer height, etc.) should be well-defined and include specific combinations to permit adequate melting of adjacent laser scan tracks and/or the underlying substrate (e.g., previously melted layers). Experimental approaches to determine appropriate parameters combinations are cumbersome and require repetition when parameter adjustments are made. Any variation in a given parameter combination can further introduce defects that decrease the quality of the printed 3D object. For example, pore formation in the 3D printed object can be attributed to laser-based control parameter combinations (e.g., laser power, scan velocity, spot size, etc.), including insufficient re-melting of an adjacent scan vector (e.g., resulting from a wide hatch spacing, which refers to the scan spacing or separation between two consecutive laser beams). For example, controlling the laser-based control parameter combination(s) along each scan vector can change occurrence of pore formation or allow for optimization and/or other improvement of other 3D printed object properties. During the melting process, the laser scanning parameters (e.g., laser scanning pattern) affect the formation of a meltpool. The meltpool is formed when the powder melts from exposure to laser radiation, such that the meltpool includes both a width and a depth determined by laser characteristics (e.g., laser power, laser shape, laser size, etc.). Control of the meltpool properties affects presence of defects in the layer-by-layer build of a 3D object and subsequently determines the quality of the final output of the 3D printing process (e.g., porosity, microstructure, etc.). In addition to monitoring various 3D printing parameters, the development of parameters for new geometries is complex and time-consuming. For example, the part development process can include several iterations during which part parameters are adjusted, parts are printed and post-processed, followed by inspection.

Methods and apparatus disclosed herein introduce the use of in-situ information to control part quality, enabling significant reduction of part development time. For example, in-situ information can include: (1) voxel-level reference for meltpool characteristics (dimensions, temperature, etc.), used to define a desired meltpool for every voxel in each part to be 3D-printed to obtain the desired part quality for that voxel, and (2) a closed-loop control architecture that adjusts process parameters using process sensors, with the objective to obtain the reference meltpool for each voxel. The loop is closed build-to-build, layer-to-layer, and/or in real-time. Methods and apparatus disclosed herein provide for voxelized reference generation and the use of the generated data in the developed control architecture. After convergence of the control iterations, the resulting parameters can be smoothed/simplified and then fixed for production at which stage no further control takes place. This method can be applied for entire parts, or for the development of parameters for specific part features. As such, part quality can be controlled at the voxel level, with faster part development time and reduced cost for printing, post processing, and inspecting test parts. For example, a voxel corresponds to a three-dimensional (3D) unit of an image with a single value, where controlling part quality at the voxel level indicates controlling the resulting three-dimensional output at the level of a 3D unit of a given image (e.g., derived from a computer-aided design file, etc.). Additionally, methods and apparatus disclosed herein can be used to lower the application barrier for additive manufacturing, reducing the need for expert knowledge related to part development by introducing automated part development as part of, for example, software module(s) that control a given three-dimensional printer. As such, methods and apparatus disclosed herein include a unified methodology to develop parameters for complex parts using data from a plurality of sensors and/or a voxelized reference map (e.g., where the voxelized reference map corresponds to a mapping of voxel(s) representative of three-dimensional (3D) unit(s) of an input image), supporting the development of parts with a high level of quality and/or reproducibility.

Furthermore, methods and apparatus disclosed herein permit for desired part quality (e.g., porosity, surface finish etc.) to be translated to desired values and/or ranges of process observables (e.g., melt-pool dimensions, temperature distributions, cooling rates, etc.) at a voxel level for any part. In the examples disclosed herein, part quality can be defined based on, but not limited to, porosity (e.g., lack of fusion defects, keyholes, voids, etc.), surface finish (e.g., roughness, tortuosity, etc.), cracks (e.g., micro and macrocracks), dimensional accuracy (e.g., with respect to desired/targeted dimensions), and/or shape (e.g., with respect to desired and/or target geometry). As part of the voxelized reference generation, autozoning of a part is performed to assign appropriate references to voxels based on their geometric location and/or thermal leakage. For example, as used herein, autozoning represents voxel(s) and/or group(s) of voxel(s) of the input image that are assigned desired material properties. In some examples, a response surface translates specified material properties into desired process observables. In some examples, a model is used to autozone a complex part to assign desired material properties for different section(s) of the part. Furthermore, derivation of process observables (e.g., meltpool dimensions, temperature distribution, cooling rate, etc.) from a plurality of in-situ sensors can be used to reduce effects of random variations across builds and/or across machines in a fleet. Additionally, data from multiple sensors can be used to make decisions based on a fused dataset for metal additive manufacturing. However, combining data-streams from different sensors (including high dimensional sensors like a camera) is necessary for derivation of process-based observables. Methods and apparatus disclosed herein use machine learning based methods to efficiently fuse the sensor data-streams and build a predictor to predict process observables from the fused data-stream (or associated features). For example, physical characterization results for a limited set of experiments can be used for ground truth data in the training of the models. Properties (e.g., dimensions, temperature) of the meltpool can be estimated through fusion of in situ sensors (e.g., on axis sensors and/or off axis sensors) based on: (1) a feature extraction module, to ingest high dimensional data-streams from the plurality of sensors and generate a tractable set of features capable of reconstructing the original data-stream with low reconstruction error via a nonlinear mapping, and (2) a predictor module, which ingests the features generated by the feature extraction module and predicts desired process observables. As such, estimates of melt-pool variables that are not directly measurable by common sensors can be obtained (e.g., depth prediction, width prediction, height prediction).

Using methods and apparatus disclosed herein, 3D-printing process inputs (e.g., laser power, scan velocity, spot size, beam shape, laser shape, laser size, etc.) can be controlled based on insights about the process state from a sensor suite to control the part quality to a desired level for every section of the part. As different variations occur at different time scales, one or more control algorithms can be designed to include several modules operating at different time scales that interact among each other to maximize the efficacy of each module (e.g., a model for capturing thermal characteristics of a complex part, a model that estimates meltpool properties given process parameters and geometric features, and a model that estimates meltpool characteristics from sensor-based data). For example, a set of control algorithms can be developed to receive an error metric between a reference map and the process observable estimates and adjust the process input parameters (e.g., power, speed, spot-size, beam profile, etc.) to drive the error metric down to an acceptable value so that the desired quality (e.g., as intended by the reference map) is maintained. The control architecture can include multiple sub-modules working at different time scales. The corrective actions can thus work in real-time or substantially real-time (e.g., at the individual voxel level, strike level, layer level, build level and/or a combination thereof. Algorithms used at different temporal levels may also have a nested loop architecture with the fastest action happening in the innermost loop and every inner loop feeding output to the outer loops to increase efficiency. In some examples, the results of the models can be stored in a feature library, enabling faster development for future parts with similar features.

FIG. 1A illustrates example voxelized reference generation 100 used for sensor-assisted part development based on the apparatus and methods disclosed herein. In the example of FIG. 1A, the voxelized reference generation 100 includes example material property input 102, an example material response surface model 104 (M0-A), example desired melt-pool dimensions output 106, example assigner of references to voxels 108, an example part geometry 110, an example autozoning (M0-B) model 112, an example voxel-based zoning of geometry output 114, and an example voxelized reference map 116. In the example of FIG. 1A, material property input 102 includes desired part qualities as determined based on, for example, porosity and surface finish. The material response surface model (M0-A) 104 translates the material property input 102 into desired process observables (e.g., meltpool dimensions, temperature, cooling rate, etc.). In some examples, porosity and surface finish requirements (e.g., as represented using material property input 102) can be translated to meltpool dimensions (e.g., melt-pool depth), as represented using desired meltpool dimensions output 106.

In the example of FIG. 1A, the desired meltpool dimensions output 106 are input into the assigner of references to voxels 108. In some examples, the assigner of references to voxels 108 determines the assignment of desired process observables to appropriate region(s) (or collection of voxels) of a given part based on part geometry 110 that has been autozoned (e.g., using the autozoning model 112). For example, desired meltpool characteristics in voxels near down facing surfaces can emphasize resulting surface finish whereas desired meltpool characteristics in bulk voxels can emphasize resulting porosity metrics. In some examples, the assignments performed using the assigner of references to voxels 108 can either be discrete and/or continuous. For example, in continuous assignment(s), parameters can be used in reference generation to assign dimensions to each voxel in a voxelized reference for continuous assignments, while in discrete assignment(s) parameters can be used in reference generation to assign dimensions to the voxel(s) in a discrete manner. For example, part geometry 110 can be input into the autozoning (M0-B) model 112 to autozone the part geometry 110 to assign one or more desired material property (e.g., porosity, surface finish, layer thickness) to different section(s) of the part geometry 110. In some examples, the autozoning (M0-B) model 112 includes the use of a drill down model providing a vertical distance of a voxel from the nearest powder layer as determined during an ongoing 3D printing process, as described in connection with FIG. 11 In some examples, the drill down model includes computing how far a particular voxel is from a downfacing surface. For example, reference map generation (e.g., voxelized reference map 116) can include setting a reference for each voxel based on a vertical distance of the voxel from the underlying powder. In some examples, the reference for each voxel can be determined based on thermal leakage characteristics of the voxel. For example, thermal leakage at different regions of a given part can be used to identify subsurface and/or bulk regions. As such, a part can be autozoned to assign appropriate references to voxels based on geometric location and/or thermal leakage. The generated reference map 116 includes zones based on the part geometry 110, with the zones being either discrete or continuous, where for each zone target part quality metrics (e.g., porosity, lack of fusion (LOF), etc.) can be translated to appropriate process observables (e.g., desired meltpool dimensions). The generated reference map 116 can be used in a closed loop system (e.g., a closed loop system of an example control architecture 150 of FIG. 1B) to obtain a desired part quality. As such, desired part quality (e.g., based on porosity, surface finish, etc.) can be translated to process observables (e.g., meltpool dimensions, temperature distribution, etc.) and assigned to individual voxels. As such, the voxelized reference map 116 forms a reference for voxel-based level control of part quality in a feedback system, enabling automatic optimization of parameters to achieve desired part quality.

Figure 1B:
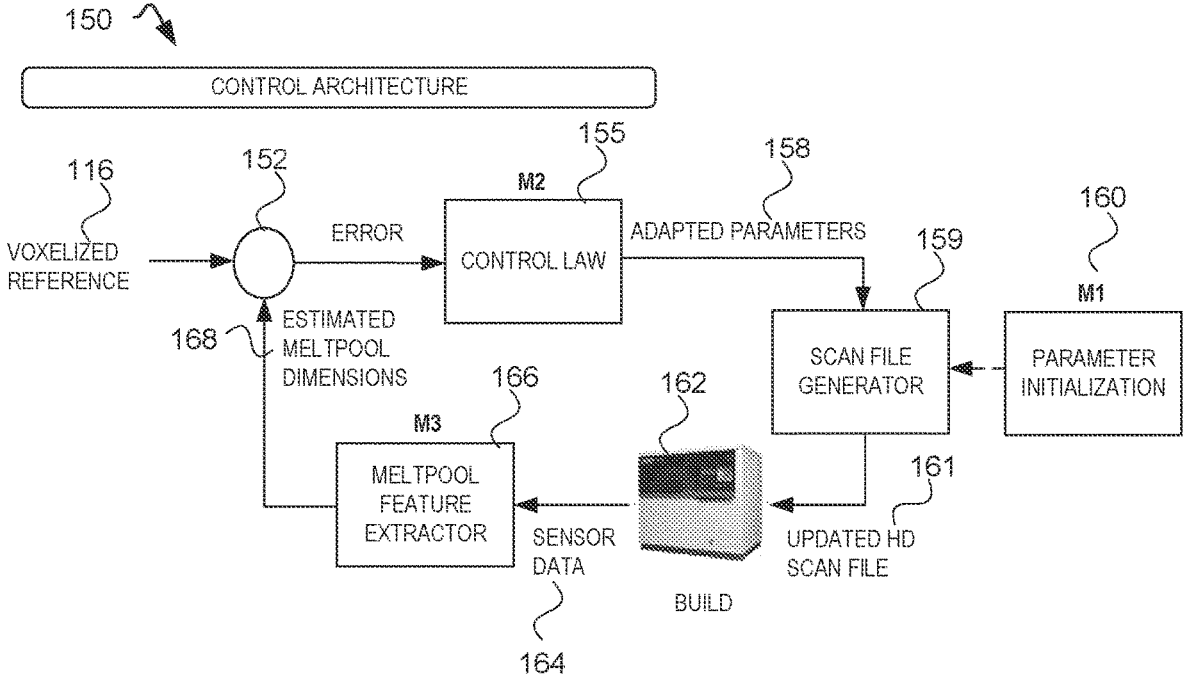
FIG. 1B illustrates an example control architecture for sensor-assisted part development based on the apparatus and methods disclosed herein.

FIG. 1B illustrates an example control architecture 150 for sensor-assisted part development based on the apparatus and methods disclosed herein. In the example of FIG. 1B, the voxelized reference map 116 of FIG. 1A serves as input into the control architecture 150. For example, the control architecture 150 allows for controlling process inputs (e.g., laser power, scan velocity, spot size, beam shape, etc.) based on insights about the process state from a sensor suite of a three-dimensional printing system. For example, the control architecture 150 can be used to control part quality to a desired level for every section of the part (e.g., during the course of the printing process). Given that different variations occur at different time scales, the control algorithm can be designed to include several modules operating at different time scales that interact among each other to maximize the efficacy of each module. In the example of FIG. 1B, the control architecture 150 includes a set of algorithms that identify an error metric (e.g., error metric 152) between the voxelized reference map 116 and process observable estimates (e.g., estimates of physical melt-pool characteristics such as meltpool dimensions, temperature profile, cooling rate, etc.). In some examples, the control architecture 150 adjusts the process input parameters (e.g., power, speed, spot-size, beam profile, etc.) to drive the error metric (e.g., error metric 152) down to an acceptable value so that the desired build quality is maintained (e.g., based on the reference map 116). In some examples, the control architecture 150 includes multiple sub-modules capable of working at different and/or appropriate time scales (e.g., day, hours, minutes, seconds), given that disturbances during a printing process that move the process from nominal values can occur at different time scales, while other disturbances are repetitive from one build to another (e.g., geometric disturbances). As such, the control architecture 150 can be used to implement corrective actions in real-time (e.g., at an individual voxel level, strike level, layer level, build level or a combination thereof). In some examples, algorithms of the control architecture 150 working at different temporal levels can include a nested loop architecture with the fastest action occurring in the innermost loop and/or every inner loop of the control architecture 150 used to inform the outer loops of actions undertaken and/or results obtained as part of increasing the outer loop efficiency. As such, the control architecture 150 can be used to control part quality down to a voxel level. Such in-situ control enables higher yield by reducing effects of random variations across builds and/or across machines in a fleet. Furthermore, sensor-assisted control of material and/or part quality reduces the need for physical characterization, enabling accelerated parameter development of new parts and/or materials. For example, while known methods using closed loop control methodologies can be used to control melt-pool parameters based on sensor output (e.g., intensity, temperature, etc.), methods and apparatus disclosed herein permit more comprehensive control over a desired part quality down to a voxel-based level.

In FIG. 1B, the control architecture 150 includes an example control law process 155, an example scan file generator 159, an example parameter initialization process 160, an example printer 162, and/or an example meltpool feature extractor 166. The control law process 155 model includes an invertible process model that estimates meltpool properties given process parameters and/or geometric features. In some examples, the control law process 155 model (M2) includes a layer-to-layer (L2L) and/or a build-to-build (B2B) updating algorithm for energy density (ED) based on an error (e.g., error metric 152) identified between reference and/or depth estimates. In some examples, the control law process 155 model (M2) can use a L2L power update equation based on input from a specified sensor or a combination of sensor(s) (e.g., down beam camera (DBC) image sensor, Avalanche Photo Diode (APD) sensor, and/or any other type of sensor(s), etc.), such that information from a previous layer of the same build is used. In some examples, the L2L power update equation can be defined in accordance with Equation 1, where k represents a build number, n represents a layer number, (i,j) corresponds to a voxel location, $e_{k,\,n-1}$ (i,j) corresponds to an error (e.g., indicative of a difference between a reference and a measurement) between a desired and an observed projection, and n−1 corresponds to a layer before layer n (e.g., a previous layer):

$$P_{k,\,n}(i,j) = P_{k,\,n-1}(i,j) + \alpha_1 e_{k,\,n-1} \qquad \text{Equation 1.}$$

In some examples, the control law process 155 model (M2) includes a build-to-build (B2B) power update equation to obtain information at the same locations but from a previous build (e.g., rather than information from a previous layer of the same build as described in connection with Equation 1). The selection of the L2L power update equation and/or the B2B power update equation can be independent of the choice to use designated sensor(s). For example, the selection of the L2L power update equation and/or the B2B power update equation can be associated with the geometry of the part. In some examples, the L2L power update equation is applicable when the geometry changes gradually from one layer to the next layer, such that information gained from the previous layer can be used during the generation of a subsequent layer of the three-dimensional build. In some examples, the B2B power update equation can be defined in accordance with Equation 2, where k represents a build number, n represents a layer number, (i,j) corresponds to a voxel location, e corresponds to an error between desired and observed APD signal, and k−1 corresponds to a build before build k (e.g., a previous layer):

$$P_{k,\,n}(i,j) = P_{k,\,n-1}(i,j) + \alpha_2 e_{k-1,\,n} \qquad \text{Equation 2.}$$

The power update shown in the example of Equations 1 and/or 2 can be based on a proportional correction scheme, but can be extended to include integral and derivative terms, or further leverage nonlinear or learning-based strategies. In some examples, the control law process 155 model (M2) includes a combined B2B and L2L energy density update equation that outputs an energy density (E) that can be translated to a power and/or speed change. For example, the B2B+L2L energy density update equation can be defined in accordance with Equation 3, where k represents a build number, n represents a layer number, (i,j) corresponds to a voxel location, $E_{k-1,n}$ (i,j) corresponds to energy density applied in the same layer during a previous build (k−1), $e_{k,\,n-1}$ (i, j) corresponds to an error from the previous layer (n−1) during the same build (k), and $e_{k-1, n}$ (i, j) corresponds an error from the same layer (n) during a previous build (k−1), where the error is based on a fused projection from DBC and APD sensors:

$$E_{k, n}(i, j)=\gamma U_{k-1, n}(i, j)+\beta_1 e_{k, n-1}(i, j)+\beta_2 e_{k-1, n} \qquad \text{Equation 3.}$$

Once the linear energy density (ED) is determined, power (P) and/or speed (S) can be derived using the linear energy density E, such that E=P/S. In some examples, the control law process 155 model (M2) decomposes ED into power and speed to send commands to the printer (e.g., printer 162 of FIG. 1B). In some examples, power and speed can be independently controlled in a multi-variable control problem (e.g., simultaneous control of depth and/or width). For example, for purposes of depth control, lower ED can be required for lower volume fraction regions (e.g., downskin regions) to achieve higher quality. In some examples, decreasing the power alone can be insufficient to achieve low enough ED in lower volume fraction regions. In some examples, a continuous map between velocity (v) and/or the volume fraction $f(v_f)$ can be assigned as $v=f(v_f)$. For example, a two-level velocity map can be implemented in accordance with Equation 4, where (i, j) represents a voxel, while the power (P) for the voxel can be calculated in accordance with Equation 5:

$$v(i, j)=v_H \text{ if } v_f(i, j)<v_{fith} \text{ and } v(i, j)=v_L \text{ if } v_H \text{ if } v_f(i,j)\geq v_{fith} \qquad \text{Equation 4.}$$

$$P_{k, n}(i, j)=E_{k, n}(i, j)/v(i, j) \qquad \text{Equation 5.}$$

Once control law process 155 model (M2) updates the L2L and B2B algorithms for energy density (ED) based on identified error(s) between reference and depth estimates, meltpool properties can be estimated based on the given process parameters and/or geometric features, resulting in example adapted parameter output 158 that can be provided for further processing using the scan file generator 159.

In the example of FIG. 1B, the parameter initialization process 160 model captures thermal characteristics of a complex part (e.g., using a first order fast thermal leakage model applicable to complex parts, as described in connection with FIGS. 19-20). For example, parameter initialization can be needed to identify a starting point for parameters to reduce the number of iterations and/or ensure that the identified parameter set does not give rise to keyholing, given that depth estimation in keyhole regions lose accuracy. For example, under optimal conditions, a meltpool shape has certain characteristics (e.g., the shape is shallow and/or semi-circular). However, during the actual printing process, the high-power laser can change the meltpool shape into a keyhole-like structure (e.g., when moving at slow speeds, etc.). The keyhole meltpool can appear round and large on top, with a narrow spike at the bottom, leading to defects in the final printed product. As set, the parameter initialization process 160 can be used to ensure that the initially selected parameters avoid the formation of keyhole regions. Furthermore, the parameter initialization process 160 (M1) obviates the need for any further parameter selection iteration(s) (e.g., implements an intelligent feedforward (IFF) process to meet the reference meltpool criteria for any voxel). For example, an IFF process with increasing complexity reduces the need for sensor-assisted adjustment of parameters. Using IFF, the parameter initialization process 160 can capture the thermal behavior of the geometry and solve an inverse problem associated with compensating for thermal behavior to identify the optimal or otherwise improved input parameters to meet the reference meltpool. For example, meltpool properties are a function of a balance of thermal input and thermal output (e.g., based on geometry and laser scan strategy). By adjusting thermal input appropriately for a given geometry and scan strategy, desired meltpool properties can be maintained to provide a desired part quality. However, in some examples, the parameter initialization process 160 requires approximation, given a lack of a detailed thermal model that can be executed in a desired amount of time. For example, thermal leakage at a given voxel level can be approximated using a volume fraction $(v_f)$. The volume fraction can be computed as a ratio of a connected thermal path (e.g., metal) to a powder path in a probe volume around a given set of voxels of interest. For example, energy density (ED) (e.g., energy delivered per unit area) for each voxel can then be initialized based on the identified volume fraction (e.g., using $e_i=e_B-\alpha v_f$, where $e_i$ represents the assigned energy density, $e_B$ represents energy density for a bulk voxel, and $\alpha$ is a reduction factor).

In additive manufacturing, energy density (ED) can be used to determine the melting power of a processing laser given that the area over which the energy is deposited affects the material used during additive manufacturing (e.g., heat affected zones). For example, if the same amount of energy is deposited over a larger area, the energy applied has reduced melting power. Therefore, high energy density (even for a laser of the same power) corresponds to a higher melting power. In some examples, linear energy density can also be used in additive manufacturing as an additional metric. Linear energy density is defined using the ratio $$\frac{p}{v},$$

where P represents power and v represents scanning velocity of the processing laser. In some examples, linear energy density can be used as a substitute to the actual energy density given that the processing power and scanning velocity can be easily identified, whereas computation of real energy density requires estimation of additional quantities.

Once the parameter initialization process 160 is completed as described above, the scan file generator 159 generates an updated HD scan file 161 is provided to the printer 162, which provides example sensor data 164 (e.g., data from the DBC, APD sensors, etc.) to the meltpool feature extractor 166. In the example of FIG. 1B, the meltpool feature extractor 166 model (M3) estimates meltpool characteristics from data provided by a suite of sensors (e.g., sensor data 164 related to DBC, APD sensors, etc.). In some examples, the meltpool feature extractor 166 model (M3) can include a deep neural network (DNN)-based meltpool depth predictor based on fused data obtained from the DBC and/or APD sensor(s), as described in connection with 13A, and/or 13B. For example, the DNN-based estimator for meltpool dimensions associated with the meltpool feature extractor 166 model (M3) can include an encoder and/or a depth/width estimator for the extraction of image features and/or training and validation on images collected on a variety of parameter set(s) and/or underlying geometries. As such, different sensor stream(s) can be evaluated to determine their performance on validation dataset(s) for different meltpool dimensional quantities. As such, the meltpool feature extractor 166 provides example estimated meltpool dimensions 168 to be assessed against reference-based meltpool dimensions as provided by the voxelized reference map 116, with the control loop of the control architecture 150 repeating continuously and/or periodically to improve the build quality based on the sensor data 164 (e.g., during a real-time three-dimensional part building process).

Figure 2:
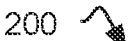
FIG. 2 is a block diagram of an example implementation of voxelized reference generating circuitry that can be implemented as part of the sensor-assisted part development of FIG. 1A and/or 1B.
Figure 2:
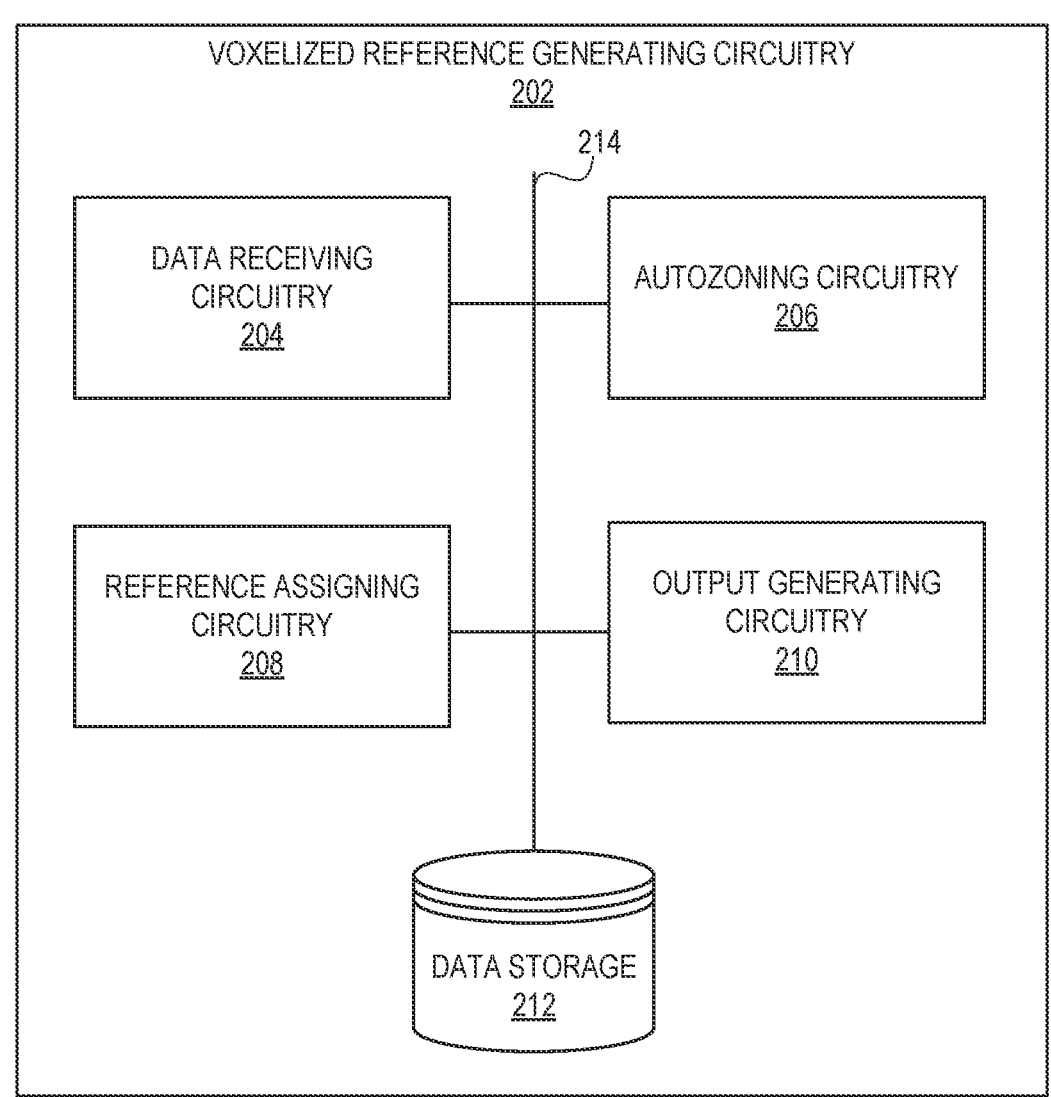

FIG. 2 is a block diagram 200 of an example implementation of voxelized reference generating circuitry 202 that can be implemented as part of the sensor-assisted part development of FIG. 1A. The voxelized reference generating circuitry 202 includes example data receiving circuitry 204, example autozoning circuitry 206, example reference assigning circuitry 208, example output generating circuitry 210, and/or an example data storage 212. In the example of FIG. 2, the data receiving circuitry 204, the autozoning circuitry 206, the reference assigning circuitry 208, the output generating circuitry 210, and/or the data storage 212 are in communication using an example bus 214.

The data receiving circuitry 204 receives data pertaining to material property input(s), including desired part qualities as determined based on, for example, porosity, surface finish, etc. In some examples, the data receiving circuitry 204 translates the material property input (e.g., material property input 102 of FIG. 1A) into desired process observables (e.g., meltpool dimensions) using the material response surface model 104 of FIG. 1A. For example, the data receiving circuitry 204 can translate porosity and surface finish requirements to meltpool dimensions (e.g., meltpool depth). In some examples, the data receiving circuitry 204 identifies a meltpool depth needed to maintain a desired LOF and/or porosity level in the bulk region(s) of the part being printed. In some examples, the data receiving circuitry 204 can be used to identify a meltpool depth needed to maintain a desired roughness value in the downskin region(s) of a part being three-dimensionally printed.

Figure 11:
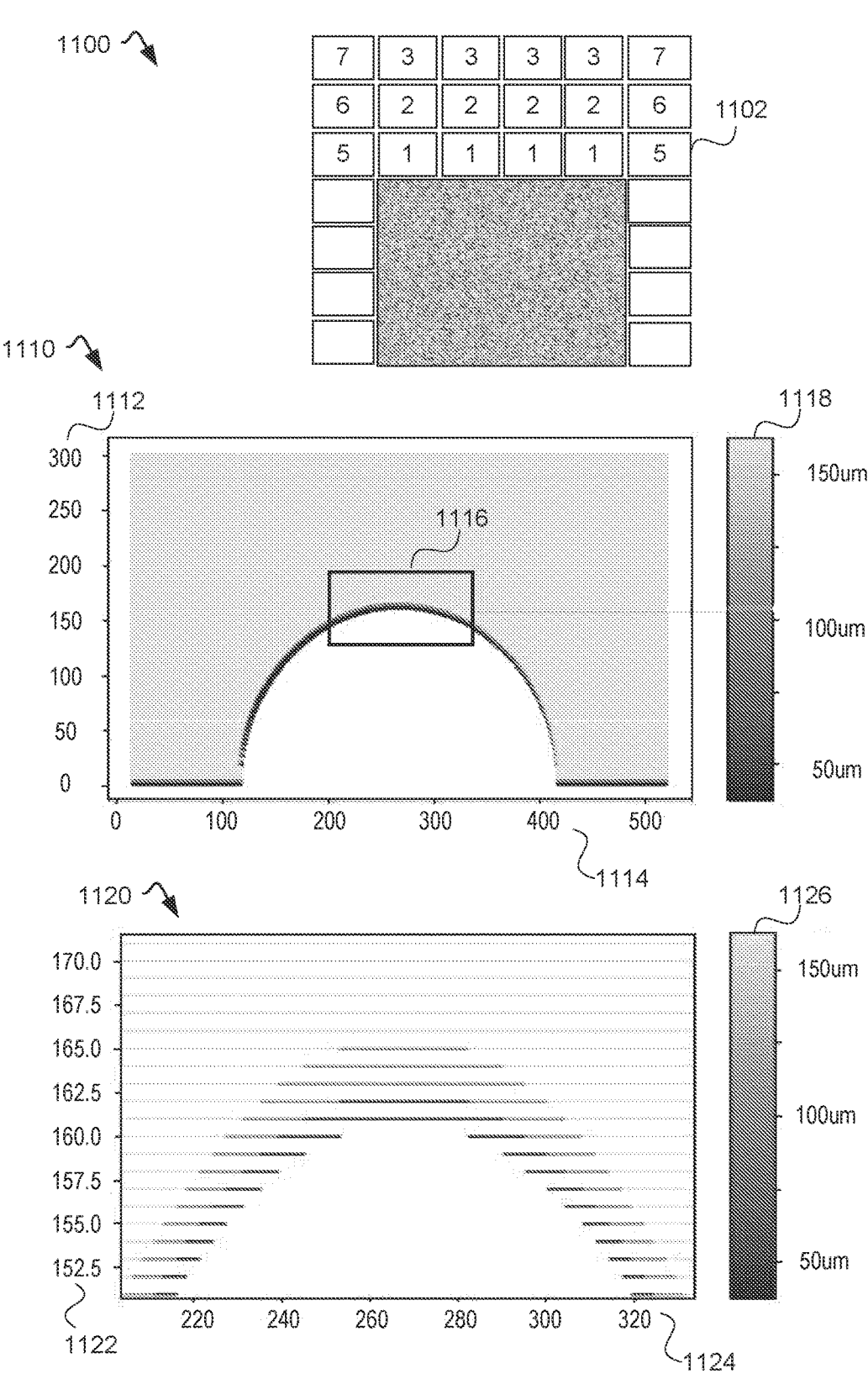
FIG. 11 illustrates example autozoning and depth reference map generation based on a drill down model and/or thermal leakage map(s) in connection with the voxelized reference generating circuitry of FIG. 2.

The autozoning circuitry 206 performs autozoning using the autozoning model 112 of FIG. 1A. For example, the autozoning circuitry 206 performs autozoning on a part geometry (e.g., part geometry 110) based on a drill down model and/or a thermal leakage map to assign different references to different features, as shown in connection with FIG. 11. For example, FIG. 11 provides an example of autozoning and depth reference map generation based on a drill down model and/or thermal leakage map(s). For example, the autozoning circuitry 206 uses the part geometry input to assign one or more desired material property (e.g., porosity, surface finish) to different section(s) of the part geometry, resulting in a voxel-based zoning of the part geometry which can be used to further assign an appropriate reference for each individual voxel using the reference assigning circuitry 208.

The reference assigning circuitry 208 determines the assignment of desired process observables to appropriate region(s) (or collection of voxels) of a given part based on a part geometry that has been autozoned (e.g., using the autozoning circuitry 206) and the translation of material property input(s) into desired process observables (e.g., meltpool dimensions). In some examples, the reference assigning circuitry 208 uses the assigner of references to voxels 108 of FIG. 1A to perform the reference assignments. In some examples, the reference assigning circuitry 208 assigns references to voxels in a discrete and/or a continuous manner. In some examples, the reference assigning circuitry 208 selects process observables to emphasize surface finish in voxels near down facing surfaces of the complex three-dimensional part and/or process observables to emphasize porosity metrics in bulk voxels of the complex three-dimensional part.

The output generating circuitry 210 outputs a voxelized reference map (e.g., voxelized reference map 116 of FIG. 1A) following the assignment of appropriate references to each voxel of a complex part using the reference assigning circuitry 208. In some examples, the voxelized reference map is generated by setting a reference for each voxel based on a vertical distance of the voxel from the underlying powder, as shown in connection with FIG. 11. In some examples, the reference for each voxel can be determined based on thermal leakage characteristics of the voxel. For example, thermal leakage at different regions of a given part can be used to identify subsurface and/or bulk regions. The output generating circuitry 210 outputs the voxelized reference map, including zones based on the input part geometry received by the autozoning circuitry 206, with the zones being either discrete or continuous, where for each zone target part quality metrics (e.g., porosity, LOD, etc.) is translated to an appropriate process observable (e.g., a desired meltpool dimension). Given that a desired part quality (e.g., based on porosity, LOF, surface finish, etc.) can be translated to a process observable (e.g., meltpool dimensions, temperature distribution, etc.) and assigned to individual the voxels of the complex part geometry, the voxelized reference map generated by the output generating circuitry 210 serves as a reference for voxel-based level control of part quality in a feedback system, enabling automatic optimization of parameters to achieve desired part quality, as described in connection with FIG. 4. For example, the assignment of process observables to appropriately indexed voxels facilitates efficient retrieval of references needed for closed loop feedback implemented by the controlling circuitry 402 of FIG. 4.

The data storage 212 can be used to store any information associated with the data receiving circuitry 204, autozoning circuitry 206, reference assigning circuitry 208, and/or the output generating circuitry 210. The example data storage 212 of the illustrated example of FIG. 2 can be implemented by any memory, storage device and/or storage disc for storing data such as flash memory, magnetic media, optical media, etc. Furthermore, the data stored in the example data storage 212 can be in any data format such as binary data, comma delimited data, tab delimited data, structured query language (SQL) structures, image data, etc.

Figure 3:
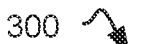
FIG. 3 is a block diagram of an example implementation of training circuitry that can be implemented as part of the control architecture of FIG. 1A and/or 1B.
Figure 3:
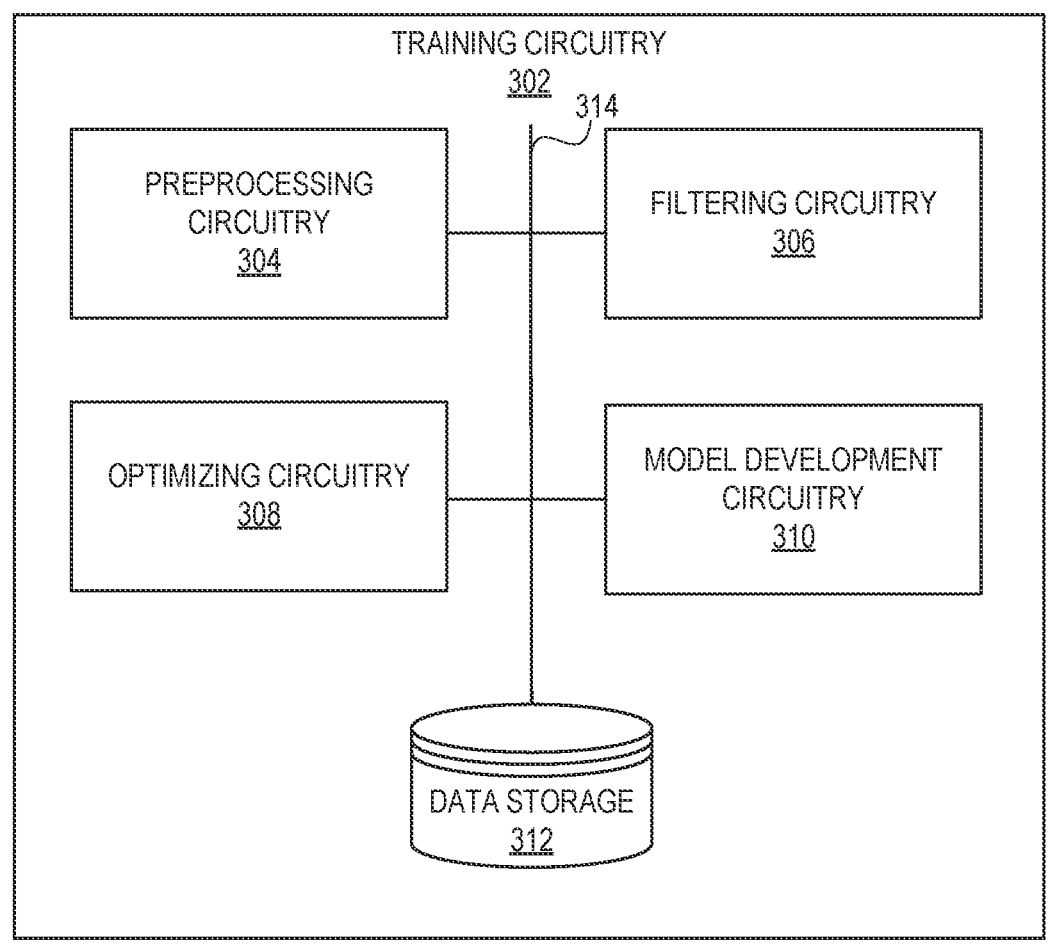

FIG. 3 is a block diagram of an example implementation of training circuitry 302 that can be implemented as part of the control architecture of FIG. 1B. In the example of FIG. 3, the training circuitry 302 includes example preprocessing circuitry 304, example filtering circuitry 306, example optimizing circuitry 308, example model development circuitry 310, and/or an example data storage 312. The preprocessing circuitry 304, the filtering circuitry 306, the optimizing circuitry 308, the model development circuitry 310, and/or the data storage 312 are in communication using an example bus 314.

Figure 13A:
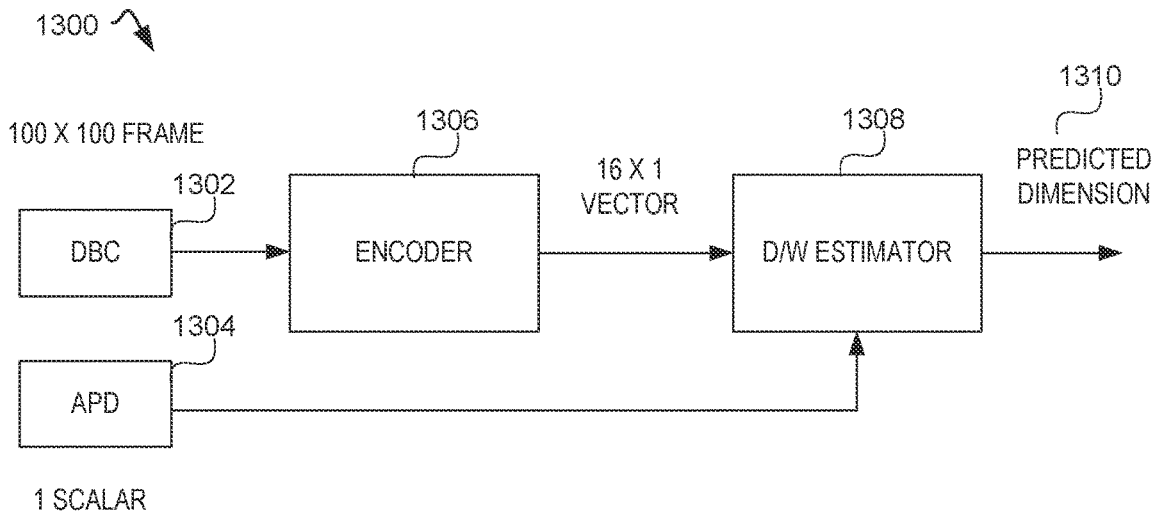
FIG. 13A illustrates an example encoder for extracting features from input images and/or an example estimator to identify meltpool depth and/or meltpool width based on a deep neural network model in connection with the training circuitry of FIG. 3.
Figure 13B:
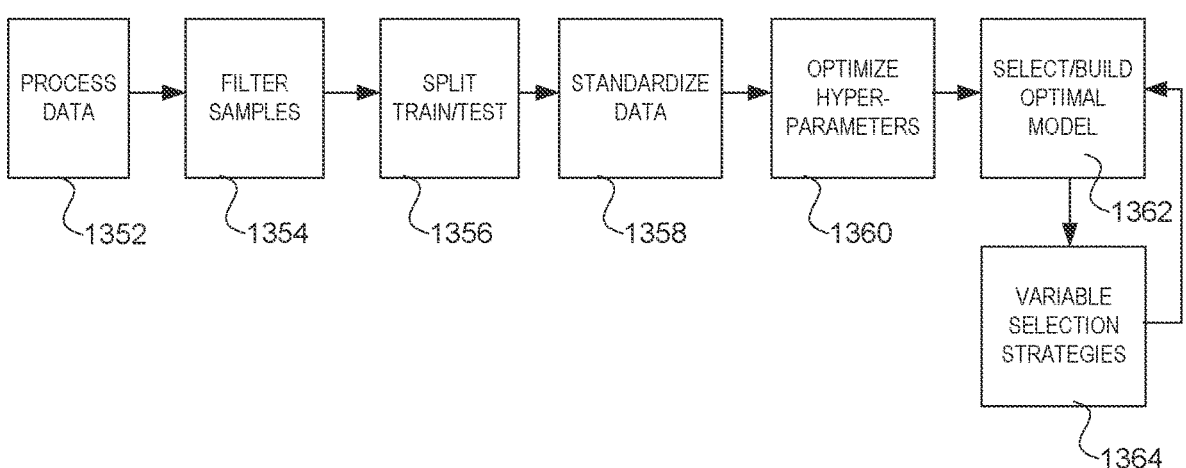
FIG. 13B illustrates an example training workflow for meltpool depth and/or width estimation based on the depth/width estimator of FIG. 13A.

The preprocessing circuitry 304 of the training circuitry 302 performs preprocessing of data input(s) used for the training of a meltpool depth/width estimator (e.g., depth/width estimator 1308 of FIG. 13A). However, the preprocessing circuitry 304 can be used to preprocess data associated with the training of any type of estimator for a desired process observable (e.g., meltpool dimensions, temperature, cooling rate, etc.). For example, the meltpool depth/width estimator can be a part of the meltpool feature extractor 166 model of FIG. 1B. In some examples, the meltpool feature extractor 166 model includes a deep neural network (DNN)-based meltpool depth predictor (e.g., the meltpool depth/width estimator) to predict meltpool depth from fused sensor data (e.g., data from a down-beam camera, a photodiode, etc.). The meltpool depth/width estimator requires training to allow for accurate meltpool feature extraction. As shown in connection with FIG. 13A and/or 13B, the estimator can receive the extracted features from an encoder (e.g., encoder 1306) and/or input from a sensor (e.g., avalanche photo-diode input 1304). For example, FIG. 13A illustrates an example encoder for extracting features from input images and/or an example estimator to identify meltpool depth and/or meltpool width based on a deep neural network model while FIG. 13B illustrates an example training work-flow for meltpool depth and/or width estimation based on the depth/width estimator. Prior to training of the meltpool depth/width estimator, the preprocessing circuitry 304 pre-processes data by performing build plate normalization, merging data with characterization data, filtering out dark frames, and/or any other type of data preprocessing, for example.

The filtering circuitry 306 performs data filtering of preprocessed data. In some examples, the filtering circuitry 306 filters samples based on a set threshold, such that samples below a certain threshold are not included in the data training set used for the meltpool depth/width estimator training, as shown in connection with FIG. 13B. In some examples, prior to training of the meltpool depth/width estimator, the input data (e.g., originating from sensors such as a down-beam camera sensor and/or a photodiode sensor) is evaluated and preprocessed/filtered using the preprocess-ing circuitry 304 and/or the filtering circuitry 306. In some examples, the input data (e.g., training data) can include images collected on a variety of parameters sets and/or underlying geometries.

The optimizing circuitry 308 performs optimization of hyperparameters on the training data that has been prepro-cessed, filtered, and/or standardized. In some examples, optimization of hyperparameters can include setting a num-ber of hidden layers in the network, identifying a number of neurons per hidden layer, selecting an optimizer (e.g., Adam, RMSprop), setting a batch size, etc. In some examples, the optimizing circuitry 308 identifies DNN-based network properties, including the number of hidden layers to use in the deep neural network, the number of neurons to use per hidden layer, the type of optimizers to implement, etc. For example, the optimizing circuitry 308 permits the selection of optimal hyperparameters for the DNN learning algorithm used to train the meltpool depth/width estimator, where the hyperparameter value(s) can be used to control the leaning process through the optimization of different constraints, weight, and/or learning rates to generalize different data patterns.

The model development circuitry 310 develops a training model to permit the selection and/or building of an optimal model used for the meltpool depth/width estimator. For example, the model development circuitry 310 can be used to develop a model to allow for the meltpool depth/width estimator to be trained on a given data set. In some examples, the training data is a data stream from in-situ sensor(s). In some examples, training data as described herein (e.g., data identifying the actual meltpool character-istics) can be determined based on any other type of appli-cable data assessment technique (e.g., part characterization using cut-ups, etc.). In some examples, the output provided by the meltpool depth/width estimator can be compared to the actual meltpool dimensions to determine the level of accuracy associated with the meltpool depth/width estimator output. Once the meltpool depth/width estimator has been trained to accurately estimate meltpool dimensions, the estimator can be used as part of the meltpool feature extractor 166 of FIG. 1B in the control architecture described in connection with FIG. 4.

The data storage 312 can be used to store any information associated with the preprocessing circuitry 304, the filtering circuitry 306, the optimizing circuitry 308, and/or the model development circuitry 310. The example data storage 312 of the illustrated example of FIG. 3 can be implemented by any memory, storage device and/or storage disc for storing data such as flash memory, magnetic media, optical media, etc. Furthermore, the data stored in the example data storage 312 can be in any data format such as binary data, comma delimited data, tab delimited data, structured query language (SQL) structures, image data, etc.

Figure 4:
FIG. 4 is a block diagram of an example implementation of controlling circuitry that can be implemented as part of the sensor-assisted part development of FIG. 1A and/or 1B.
Figure 4:
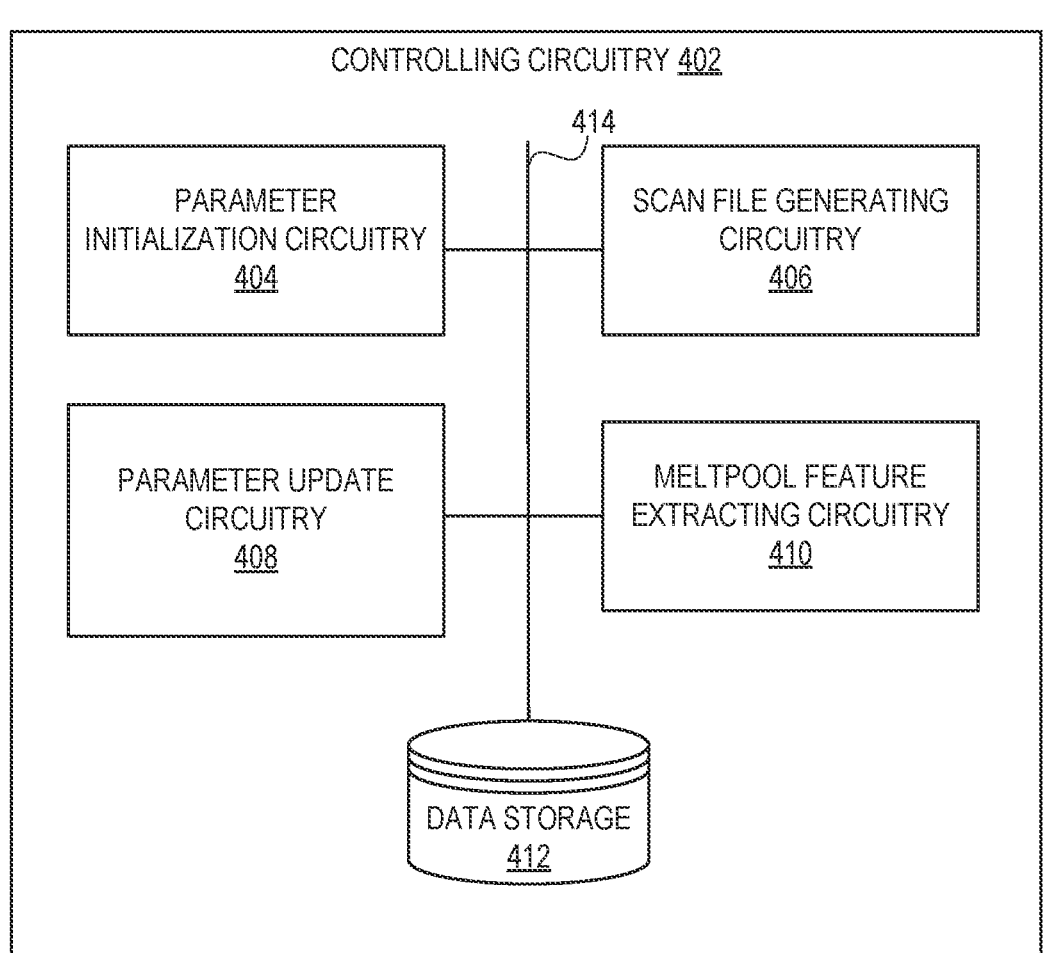

FIG. 4 is a block diagram 400 of an example implemen-tation of controlling circuitry 402 that can be implemented as part of the sensor-assisted part development of FIG. 1B. For example, the controlling circuitry 402 can be imple-mented in real-time and/or offline. In the example of FIG. 4, the controlling circuitry 402 includes example parameter initialization circuitry 404, example scan file generating circuitry 406, example parameter update circuitry 408, example meltpool feature extracting circuitry 410, and/or an example data storage 412. The parameter initialization cir-cuitry 404, the scan file generating circuitry 406, the param-eter update circuitry 408, the meltpool feature extracting circuitry 410, and/or the data storage 412 are in communi-cation using an example bus 414.

The parameter initialization circuitry 404 initializes parameters to identify a starting point for parameters to reduce the number of iterations. In some examples, the parameter initialization circuitry 404 selects parameters that are equal across an entire geometry. For example, the parameter initialization circuitry 404 can be used to better initialize parameters to permit iterations to achieve a faster convergence in the control architecture 150 of FIG. 1B. For example, the parameter initialization circuitry 404 identifies input that can be used to initiate the printing process with high-definition scan paths for a particular geometry. In some examples, the parameter initialization circuitry 404 ensures that the identified parameter set does not give rise to keyholing, given that depth estimation in keyhole regions leads to a reduction in accuracy. In some examples, the parameter initialization circuitry 404 obviates the need for any further parameter selection iteration(s) (e.g., implements an intelligent feedforward (IFF) process to meet the refer-ence meltpool criteria for any voxel). For example, an IFF process with increasing complexity reduces the need for sensor-assisted adjustment of parameters. The scan file generating circuitry 406 generates an updated scan file (e.g., scan file 161 of FIG. 1B) to be used for printing (e.g., using the scan file generator 159 of FIG. 1B). For example, the scan file generating circuitry 406 generates a scan file based on the parameters initialized using the parameter initializa-tion circuitry 404. In some examples, the scan file generating circuitry 406 generates the scan file based on adapted parameters provided using the control law process 155 of FIG. 1B using the parameter update circuitry 408. The scan file generating circuitry 406 can provide an updated high-definition (HD) scan file 161 to the printer 162. As the parameters continue to be updated using the control archi-tecture 150 of FIG. 1B (e.g., based on parameter initializa-tion and/or updated adapted parameters), the scan file gen-erating circuitry 406 updates the scan file as needed.

The parameter update circuitry 408 updates meltpool properties given process parameters and/or geometric fea-tures. For examples, the parameter update circuitry 408 uses the control law process 155 model of FIG. 1B, which includes a layer-to-layer (L2L) and/or a build-to-build (B2B) updating algorithm for energy density (ED) based on an error (e.g., error metric 152) identified between reference and/or depth estimates. In some examples, the parameter update circuitry 408 updates meltpool properties using a L2L power update equation based on input from a down beam camera (DBC) image, such that information from a previous layer of the same build can be used for meltpool estimation, as described in connection with FIG. 1B.

The meltpool feature extracting circuitry 410 extracts meltpool characteristics from data provided by a suite of sensors using the meltpool feature extractor 166 model of FIG. 1B. In some examples, the meltpool feature extracting circuitry 410 uses a deep neural network (DNN)-based meltpool depth/width estimator based on fused data obtained from the DBC and/or APD sensor(s). The meltpool depth/width estimator can be trained using the training circuitry 302 of FIG. 3. In some examples, the meltpool feature extracting circuitry 410 evaluates different sensor stream(s) to determine their performance on validation dataset(s) for different meltpool dimensional quantities. As such, the meltpool feature extracting circuitry 410 identifies estimated meltpool features to be assessed against reference-based meltpool features as provided by a voxelized reference map (e.g., the voxelized reference map 116 of FIGS. 1A, 1B).

The data storage 412 can be used to store any information associated with the parameter initialization circuitry 404, the scan file generating circuitry 406, the parameter update circuitry 408, and/or the meltpool feature extracting circuitry 410. The example data storage 412 of the illustrated example of FIG. 4 can be implemented by any memory, storage device and/or storage disc for storing data such as flash memory, magnetic media, optical media, etc. Furthermore, the data stored in the example data storage 412 can be in any data format such as binary data, comma delimited data, tab delimited data, structured query language (SQL) structures, image data, etc.

While an example manner of implementing the voxelized reference generating circuitry 202 is illustrated in FIG. 2, one or more of the elements, processes, and/or devices illustrated in FIG. 2 may be combined, divided, re-arranged, omitted, eliminated, and/or implemented in any other way. Further, the example data receiving circuitry 204, the example autozoning circuitry 206, the example reference assigning circuitry 208, the example output generating circuitry 210 and/or, more generally, the example voxelized reference generating circuitry 202 of FIG. 2, may be implemented by hardware, software, firmware, and/or any combination of hardware, software, firmware. Thus, for example, any of the example data receiving circuitry 204, the example autozoning circuitry 206, the example reference assigning circuitry 208, the example output generating circuitry 210 and/or, more generally, the example voxelized reference generating circuitry 202 of FIG. 2, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example data receiving circuitry 204, the example autozoning circuitry 206, the example reference assigning circuitry 208, the example output generating circuitry 210 and/or, more generally, the example voxelized reference generating circuitry 202 of FIG. 2 is/are hereby expressly defined to include a non-transitory computer readable storage device or storage disk such as a memory, a digital versatile disk (DVD), a compact disk (CD), a Blu-ray disk, etc., including the software and/or firmware. Further still, the example voxelized reference generating circuitry 202 of FIG. 2 may include one or more elements, processes, and/or devices in addition to, or instead of, those illustrated in FIG. 2, and/or may include more than one of any or all of the illustrated elements, processes and devices.

While an example manner of implementing the training circuitry 302 is illustrated in FIG. 3, one or more of the elements, processes, and/or devices illustrated in FIG. 3 may be combined, divided, re-arranged, omitted, eliminated, and/or implemented in any other way. Further, the example preprocessing circuitry 304, the example filtering circuitry 306, the example optimizing circuitry 308, the example model development circuitry 310, and/or, more generally, the example training circuitry 302 of FIG. 3, may be implemented by hardware, software, firmware, and/or any combination of hardware, software, and/or firmware. Thus, for example, any of the example preprocessing circuitry 304, the example filtering circuitry 306, the example optimizing circuitry 308, the example model development circuitry 310, and/or, more generally, the example training circuitry 302 of FIG. 3, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example preprocessing circuitry 304, the example filtering circuitry 306, the example optimizing circuitry 308, the example model development circuitry 310, and/or, more generally, the example training circuitry 302 of FIG. 3 is/are hereby expressly defined to include a non-transitory computer readable storage device or storage disk such as a memory, a digital versatile disk (DVD), a compact disk (CD), a Blu-ray disk, etc., including the software and/or firmware. Further still, the example training circuitry 302 of FIG. 3 may include one or more elements, processes, and/or devices in addition to, or instead of, those illustrated in FIG. 3, and/or may include more than one of any or all of the illustrated elements, processes and devices.

While an example manner of implementing the controlling circuitry 402 is illustrated in FIG. 4, one or more of the elements, processes, and/or devices illustrated in FIG. 3 may be combined, divided, re-arranged, omitted, eliminated, and/or implemented in any other way. Further, the example parameter initialization circuitry 404, the example scan file generating circuitry 406, the example parameter update circuitry 408, the example meltpool feature extracting circuitry 410, and/or, more generally, the example controlling circuitry 402 of FIG. 4, may be implemented by hardware, software, firmware, and/or any combination of hardware, software, and/or firmware. Thus, for example, any of the example parameter initialization circuitry 404, the example scan file generating circuitry 406, the example parameter update circuitry 408, the example meltpool feature extracting circuitry 410, and/or, more generally, the example controlling circuitry 402 of FIG. 4, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example parameter initialization circuitry 404, the example scan file generating circuitry 406, the example parameter update circuitry 408, the example meltpool feature extracting circuitry 410, and/or, more generally, the example controlling circuitry 402 of FIG. 4 is/are hereby expressly defined to include a non-transitory computer readable storage device or storage disk such as a memory, a digital versatile disk (DVD), a compact disk (CD), a Blu-ray disk, etc., including the software and/or firmware. Further still, the controlling circuitry 402 of FIG. 4 may include one or more elements, processes, and/or devices in addition to, or instead of, those illustrated in FIG. 4, and/or may include more than one of any or all of the illustrated elements, processes and devices.

Figure 5:
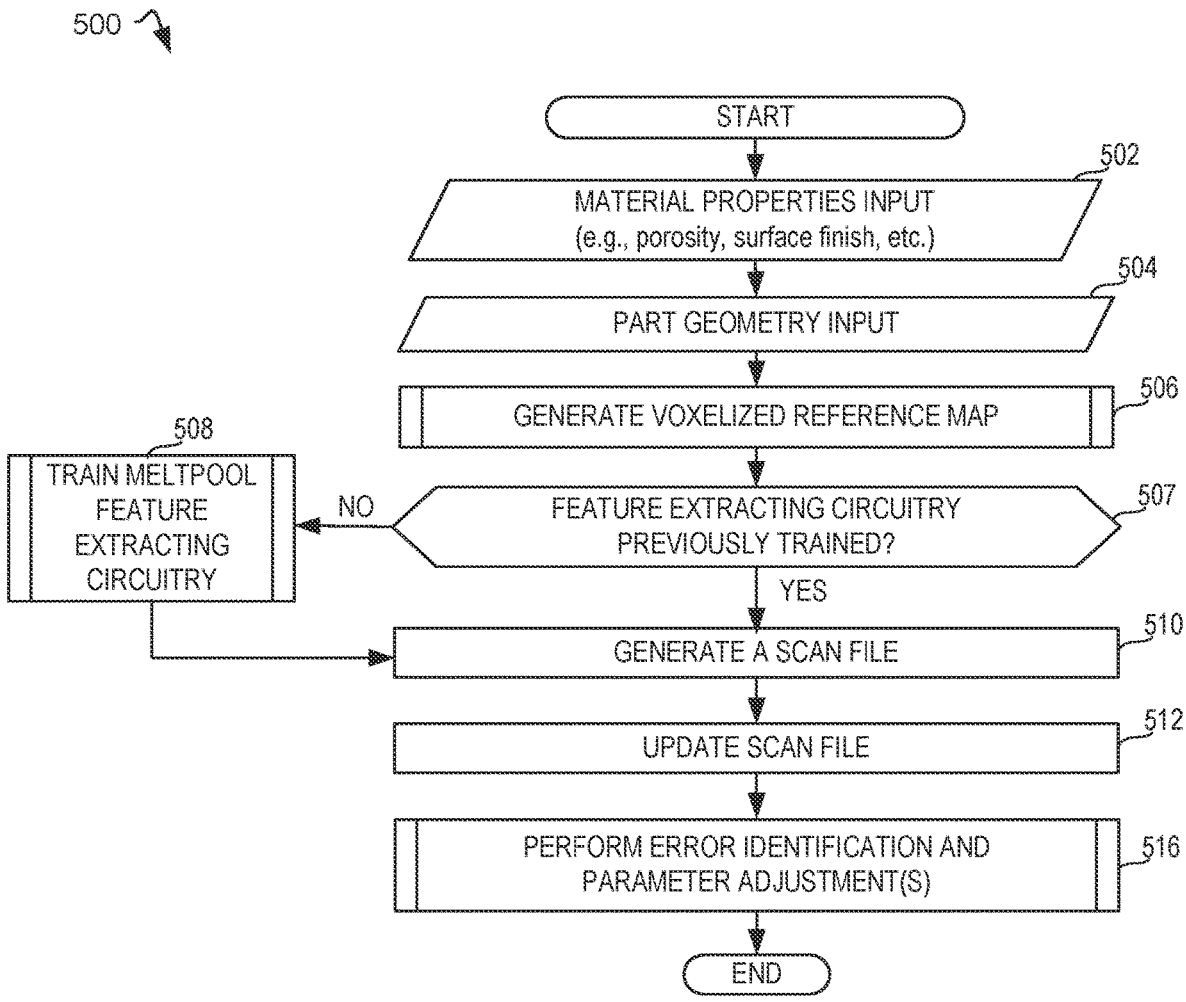
FIG. 5 illustrates a flowchart representative of example machine readable instructions which may be executed to implement the example voxelized reference generating circuitry of FIG. 2 and/or the example controlling circuitry of FIG. 4.
Figure 6:
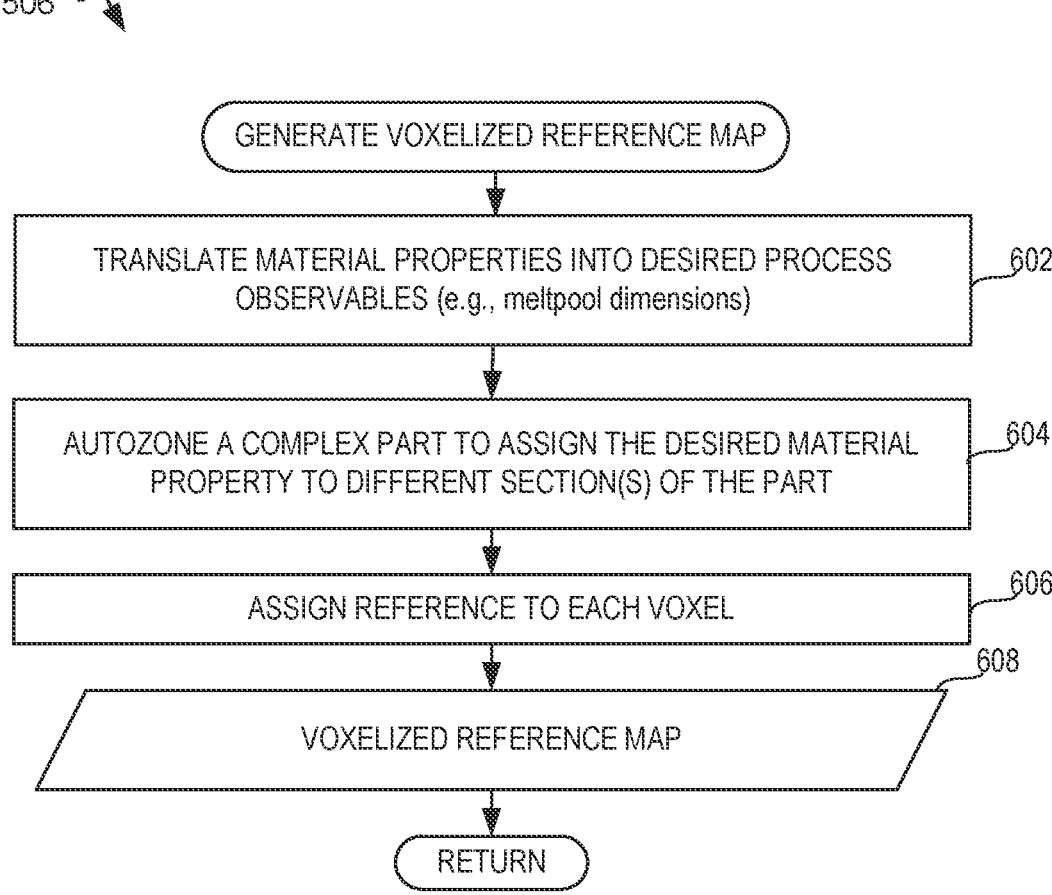
FIG. 6 illustrates a flowchart representative of example machine readable instructions which may be executed to implement the example voxelized reference generating circuitry of FIG. 2.

Flowcharts representative of example hardware logic circuitry, machine readable instructions, hardware implemented state machines, and/or any combination thereof for implementing the voxelized reference generating circuitry 202 of FIG. 2 is shown in FIGS. 5, 6. The machine readable instructions may be one or more executable programs or portion(s) of an executable program for execution by processor circuitry, such as the processor circuitry 2112 shown in the example processor platform 2100 discussed below in connection with FIG. 21 and/or the example processor circuitry discussed below in connection with FIGS. 24 and/or 25. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 5, 6, many other methods of implementing the example voxelized reference generating circuitry 202 of FIG. 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

Figure 7:
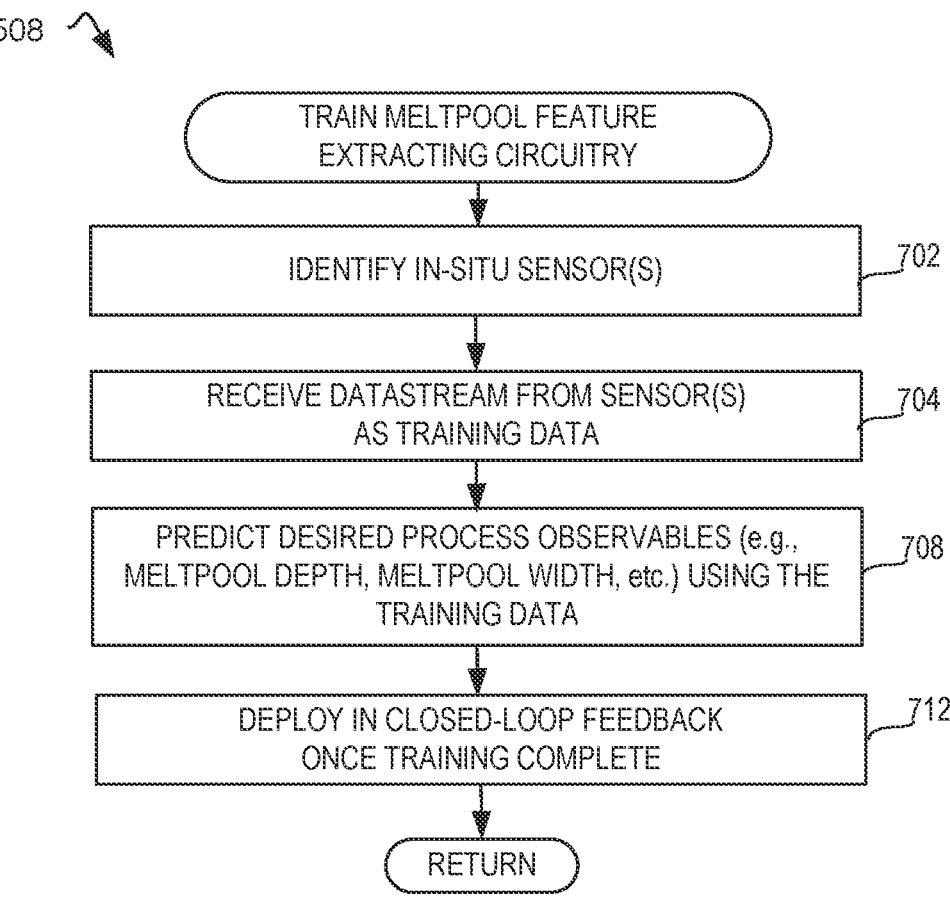
FIG. 7 illustrates a flowchart representative of example machine readable instructions which may be executed to implement the example training circuitry of FIG. 4.

Flowcharts representative of example hardware logic circuitry, machine readable instructions, hardware implemented state machines, and/or any combination thereof for implementing the training circuitry 302 of FIG. 3 is shown in FIGS. 5, 7. The machine readable instructions may be one or more executable programs or portion(s) of an executable program for execution by processor circuitry, such as the processor circuitry 2212 shown in the example processor platform 2200 discussed below in connection with FIG. 22 and/or the example processor circuitry discussed below in connection with FIGS. 24 and/or 25. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 5, 7, many other methods of implementing the example training circuitry 302 of FIG. 3 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

Flowcharts representative of example hardware logic circuitry, machine readable instructions, hardware implemented state machines, and/or any combination thereof for implementing the controlling circuitry 402 of FIG. 4 is shown in FIG. 5. The machine readable instructions may be one or more executable programs or portion(s) of an executable program for execution by processor circuitry, such as the processor circuitry 2312 shown in the example processor platform 2300 discussed below in connection with FIG. 23 and/or the example processor circuitry discussed below in connection with FIGS. 24 and/or 25. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 5, many other methods of implementing the example controlling circuitry 402 of FIG. 4 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 5, 6, and/or 7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

FIG. 5 illustrates a flowchart representative of example machine readable instructions 500 which may be executed to implement the example voxelized reference generating circuitry 202 of FIG. 2 and/or the example controlling circuitry 402 of FIG. 4. In the example of FIG. 5, the data receiving circuitry 204 receives material property-based input(s), where the material property-based input(s) can include a porosity, a surface finish, and/or (block 502). In some examples, the data receiving circuitry 204 and/or the auto-zoning circuitry 206 receives a part geometry input (block 504). For example, the part geometry input can represent the complex geometry generated to show geometric features of a part to be three-dimensionally printed (e.g., part geometry 110 of FIG. 1A). Using these inputs, the voxelized reference generating circuitry 202 proceeds to generate a voxelized reference map (e.g., voxelized reference map 116 of FIG. 1A), as described in connection with FIG. 6. If the meltpool feature extracting circuitry 410 has not been previously trained (block 507), the training circuitry 302 trains the meltpool feature extracting circuitry 410 (e.g., a meltpool width/depth estimator used as part of the meltpool feature extracting circuitry 410 of FIG. 4) (block 508). For example, the training circuitry 302 trains the meltpool feature extracting circuitry 410 to estimate meltpool dimensions using a suite of sensors, as described in connection with FIG. 7. Once the training is complete, the parameter update circuitry 408 can update layer-to-layer (L2L) and/or build-to-build (B2B) algorithms for energy density (ED) based on identified error(s) between reference and depth estimates.

Once the meltpool feature extracting circuitry has been trained, the scan file generating circuitry 406 generates a scan file (block 510) and/or updates the scan file (block 512). Once the scan file is available, the parameter update circuitry 408 of FIG. 4 performs parameter adjustment using measured build data (block 514). For example, during the building process, the meltpool feature extracting circuitry 410 estimates meltpool characteristics based on in-situ sensor data (e.g., photodiode sensor, camera sensor, etc.). As such, the meltpool feature extracting circuitry 410 evaluates different sensor stream(s) to estimate meltpool dimensions to be assessed against reference-based meltpool dimensions as provided by a voxelized reference map (e.g., the voxelized reference map 116 of FIGS. 1A, 1B). If errors are identified (e.g., error metric 152 of FIG. 1B), the parameter update circuitry 408 adjusts parameters and, in some examples, updates the scan file using the scan file generating circuitry 406. In some examples, the error identification process and/or the parameter adjustment process (block 516) varies depending on the type of feedback implementation selected (e.g., real-time feedback, layer-to-layer (L2L) feedback, build-to-build (B2B) feedback, combined L2L+B2B feedback, etc.), as described in connection with FIG. 8. For example, if no errors are present and/or the updated scan file has been provided to the printing system, the printing process can complete for a given build and/or a given layer of the build by allowing the printer to proceed with the three-dimensional build process. In L2L-based feedback, if the part has not been completed after a given layer, control can return to the printer to allow a subsequent layer to print based on the same scan file and/or an updated scan file. The feedback loop continues with additional data provided from sensor-based printer data for evaluation of reference-based meltpool dimensions to actual meltpool dimensions based on meltpool features extracted using the meltpool feature extracting circuitry 410, as described in connection with FIG. 8.

FIG. 6 illustrates a flowchart representative of example machine readable instructions 506 which may be executed to implement the example voxelized reference generating circuitry 202 of FIG. 2. Once the data receiving circuitry 204 receives the input material properties (block 502 of FIG. 5), the data receiving circuitry 204 translates the material properties into desired process observables (e.g., meltpool dimensions) (block 602). For example, the data receiving circuitry 204 uses material quality metrics to represent predictor variables and process observables to represent response variables. In some examples, porosity and surface finish requirements (e.g., as represented using material property input 102) can be translated to meltpool dimensions (e.g., meltpool depth). Once the process observables are identified, the autozoning circuitry 206 autozones the complex part (e.g., based on part geometry 110) to assign the desired material properties to different section(s) of the complex part (block 604). For example, the autozoning circuitry 206 performs autozoning based on a drill down model and/or a thermal leakage map to assign different references to different features. For example, the autozoning circuitry 206 uses the part geometry input to assign one or more desired material property (e.g., porosity, surface finish,) to different section(s) of the part geometry. In some examples, the reference assigning circuitry 208 assigns a reference to each voxel of the autozoned region, such that a reference is generated for each individual voxel (block 606). Based on the assigned references, the output generating circuitry 210 outputs a voxelized reference map (block 608). The voxelized reference map (e.g., voxelized reference map 116 of FIG. 1A) can assign a reference for each voxel based on a vertical distance of the voxel from the underlying powder. In some examples, the reference assigning circuitry 208 identifies the reference for each voxel based on thermal leakage characteristics of the voxel, as described in connection with FIG. 1A. The voxelized reference map can include zones based on the part geometry, where for each zone target part quality metrics can be translated to appropriate process observables (e.g., desired meltpool dimensions). In some examples, the voxelized reference map can be used as a reference for voxel-based level control of part quality in a feedback system, enabling automatic optimization of parameters to achieve desired part quality, as described in connection with FIG. 1B and FIG. 5.

FIG. 7 illustrates a flowchart representative of example machine readable instructions according to block 508 which may be executed to implement the example training circuitry 302 of FIG. 4. In some examples, the training circuitry 302 can be implemented using a neural network to identify the relationship between sensor data and estimated meltpool properties. For example, to train the meltpool feature extractor 166 of FIG. 1B, the depth/width meltpool estimator that can be used as part of the meltpool feature extractor 166 can be trained to recognize and interpret meltpool dimensions based on incoming sensor feedback from the printing system (e.g., sensor data 164 of FIG. 1B). To train the deep neural network system, the training circuitry 302 identifies in-situ sensors associated with the printing system, including, but not limited to, sensors associated with camera(s) and/or photodiodes (block 702). The preprocessing circuitry 304 receives a data stream from the in-situ sensor(s) and can perform preprocessing of the data prior to use of the depth/ width estimator (e.g., build plate normalization, merging data with characterization data, filtering out dark frames, etc.) (block 704). In some examples, the filtering circuitry 306 performs data filtering of the preprocessed data (e.g., filtering of samples based on a set threshold, such that samples below a certain threshold are not included in the data training set used for the meltpool depth/width estimator). In some examples, the optimizing circuitry 308 performs optimization and/or other improvement of hyperparameters on the training data that has been preprocessed, filtered, and/or standardized (e.g., via identification of the number of hidden layers to use in the deep neural network, the number of neurons to use per hidden layer, the type of optimizers to implement, etc.), as part of the training process of FIG. 7. In some examples, the model development circuitry 310 builds a model to allow for the meltpool depth/width estimator to be trained on the given data set, yielding an output consisting of estimated meltpool dimensions (e.g., meltpool width, meltpool depth, etc.) (block 708). Training data as described herein (e.g., data identifying the actual meltpool characteristics) can be determined based on any other type of applicable data assessment technique (e.g., part characterization using cut-ups, etc.). If the accuracy of the depth/width estimator is within a desired range, the training circuitry 302 completes the training process. In some examples, further training is involved to improve the depth/width estimator accuracy. Once training is complete (block 712), the training circuitry 302 deploys the depth/width estimator in the closed-loop feedback system associated with the control architecture 150 of FIG. 1B (e.g., as part of the meltpool feature extractor 166). However, the identification of the relationship between sensor-based data and meltpool properties is not limited to the use of neural network-based training. In some examples, data can be used from high-fidelity simulation model(s) and/or multiple sensor modalities can be combined with physics-based model(s) to determine other meltpool characteristic(s) (e.g., temperature, etc.). As such, any other type of model can be implemented that allows for observing relevant meltpool properties from sensor data as part of the training circuitry 302.

Figure 8:
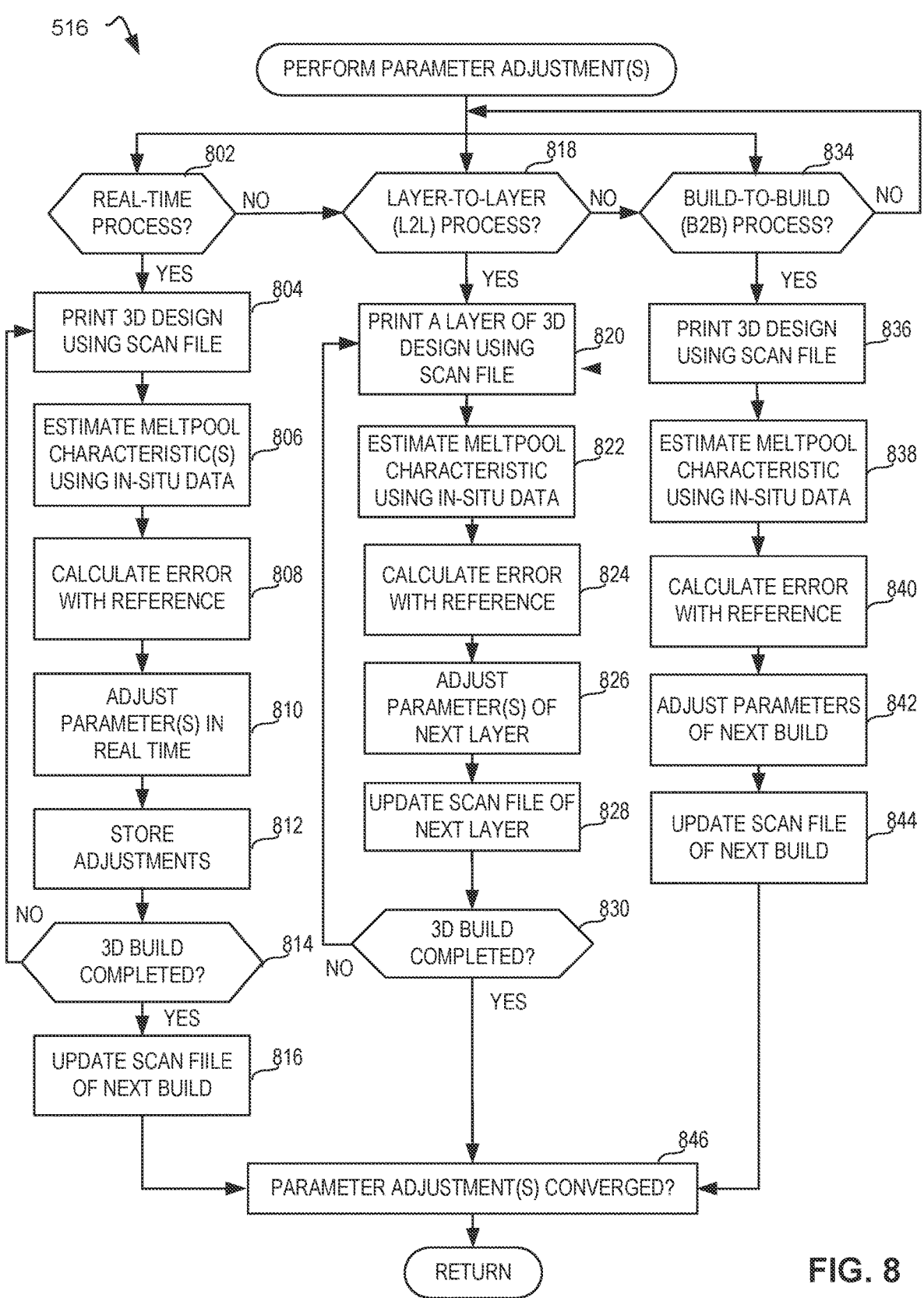
FIG. 8 illustrates a flowchart representative of example machine readable instructions which may be executed to perform parameter adjustment(s) based on a real-time, a layer-to-layer, and/or a build-to-build feedback implementation.

FIG. 8 illustrates a flowchart representative of example machine readable instructions according to block 516 which may be executed to perform parameter adjustment(s) based on a real-time, a layer-to-layer, and/or a build-to-build feedback implementation. In the example of FIG. 8, the parameter update circuitry 408 identifies the feedback implementation as a real-time process (block 802), a layer-to-layer (L2L) process (block 818), and/or a build-to-build (B2B) process (block 834). If the parameter update circuitry 408 identifies the feedback implementation as a real-time process, the parameter update circuitry 408 proceeds to initiate printing of the 3D design using the available scan file (block 804). In some examples, the parameter update circuitry 408 estimates meltpool characteristic(s) using in situ data (e.g., for each voxel) (block 806) and calculates an error with reference based on the in situ data (block 808). Once the error(s) are identified, the parameter update circuitry 408 adjusts parameter(s) in real-time (block 810) and stores the adjustment(s) (block 812) (e.g., using data storage 412 of FIG. 4). Once the 3D build is completed (block 814), the parameter update circuitry 408 updates the scan file of the next build (block 816). If the 3D build is not yet complete, the parameter update circuitry 408 repeats the estimation of meltpool characteristics, calculation of error(s), and adjustment of parameter(s) until the 3D build is complete (block 814). Once the parameter update circuitry 408 determines that the parameter adjustment(s) have converged, the additive manufacturing process is complete.

If the parameter update circuitry 408 identifies the feedback implementation as a layer-to-layer (L2L) process (block 818), the parameter update circuitry 408 initiates the printing of a layer of the 3D design using the available scan file (block 820). Based on the printed layer, the parameter update circuitry 408 estimates meltpool characteristics using in situ data for a single layer (block 822), which can be used to determine error(s) with reference (block 824). Based on the identified errors, the parameter update circuitry 408 adjusts parameter(s) of the next layer of the 3D build (block 826). For example, the parameter update circuitry 408 adjusts the parameter(s) of the next layer using an error of the present layer. Using the parameter adjustment(s), the parameter update circuitry 408 updates the scan file of the subsequent layer (block 828). Once the 3D build is completed (block 830), the parameter update circuitry 408 determines whether the parameter adjustment(s) are converged (block 846). If the parameter update circuitry 408 identifies the feedback implementation as a build-to-build (B2B) process (block 834), the parameter update circuitry 408 initiates the printing of the 3D design using the available scan file (block 836). In some examples, the parameter update circuitry 408 estimates the meltpool characteristic(s) using in situ data for the entire build (block 838) and calculates an error with reference based on the estimated meltpool characteristics (block 840). The parameter update circuitry 408 adjusts the parameter(s) of the next build (block 842) and updates the scan file of the next build (block 844). Once the parameter update circuitry 408 identifies that all parameter adjustment(s) are converged (block 846), the additive manufacturing process is complete. In the example of FIG. 8, the parameter update circuitry 408 can adjust parameters based on the L2L power update equation (e.g., using information from a previous layer of the same build), the B2B power update equation (e.g., using information from the same location of the previous build), and/or a combined L2L+B2B energy density update equation (e.g., combining error-based information from the previous layer during the same build, error-based information from the same layer during the previous build, and/or energy density applied in the same layer during a previous build, etc.). In some examples, the selection of an update equation can depend on factors such as which parameter(s) are to be controlled (e.g., velocity, power, and/or energy density, etc.). For example, energy density delivered to a meltpool can be influenced by various parameters (e.g., power, speed, focus, beam shape, etc.). Control loops described herein can be used to control any of these parameter(s) (e.g., controlling power and/or energy density by constraining the relationship between power and speed).

Figure 9:
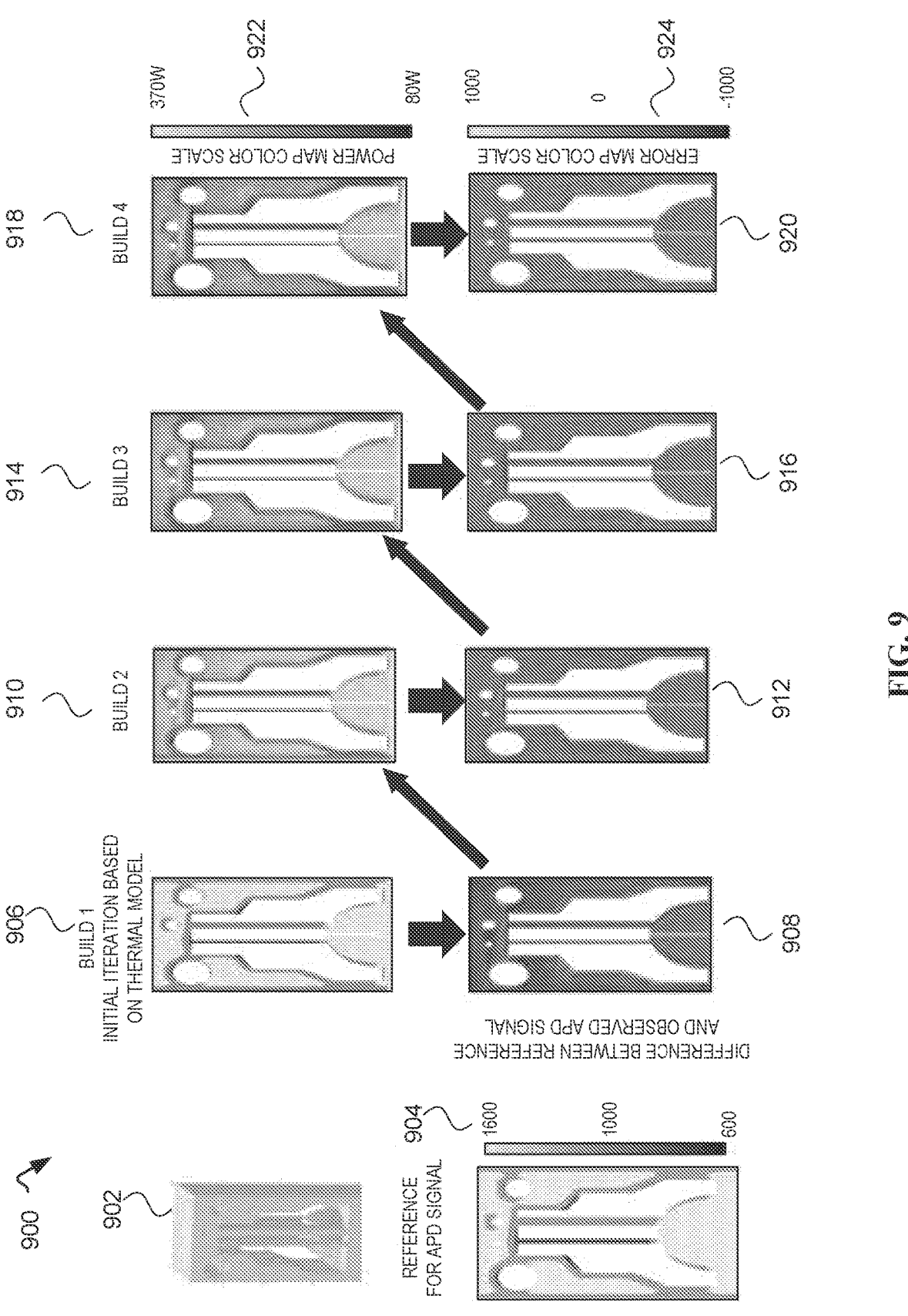
FIG. 9 illustrates example build-to-build results using complex part geometry.

FIG. 9 illustrates example build-to-build (B2B) results 900 using complex part geometry. For example, as described in connection with FIG. 1B, the control law process 155 model (M2) includes a build-to-build (B2B) power update equation based on sensor data (e.g., from an Avalanche Photo Diode (APD) sensor, etc.) to obtain information from the same locations but from a previous build (e.g., as described in connection with Equation 2). In FIG. 9, an example three-dimensional reference voxelized map 902 is shown, with an example single voxelized part layer 904 including sensor-based intensity measurements (e.g., higher intensity values on internal regions of the part). For example, the voxelized part layer 904 can be established using autozoning to assign appropriate references to voxel(s) based on their geometric location and/or thermal leakage, as described in connection with FIG. 1A. A first horizontal panel of images shows example power map-based build(s) 906, 910, 914, 918 which are adjusted based on example error map output(s) 908, 912, 916, 920 to reduce the difference between the reference sensor signal (e.g., reference APD signal) and the observed sensor signal (e.g., observed APD signal). As such, B2B-based iterations over several builds (e.g., build(s) 906, 910, 914, 918) show a reduction in the error identified between the reference APD signal and the observed APD signal. For example, the power map color scale 922 shows a decrease in power applied at various regions of the build, with a corresponding decrease in the error between the reference APD signal and the observed APD signal as identified using the error map color scale 924. As such, the B2B algorithm permits convergence to a desired reference point (e.g., desired power map). In some examples, the B2B-based algorithm can be improved by updating reference generation, updating the choice of meltpool characteristics that are included in the control loop, and/or increasing a degree of freedom to control the process (e.g., as opposed to using power-based control alone). As discussed in connection with FIG. 1B, methods and apparatus disclosed herein permit the generation of a voxelized reference map (e.g., reference map 116) based on a material response surface model (e.g., material response surface model 104 (M0-A)). Furthermore, methods and apparatus disclosed herein permit the control of meltpool dimensions and layer-to-layer (L2L), as well as build-to-build (B2B), control of the printing result. For example, methods and apparatus disclosed herein can rely on a combination of APD and DBC-based sensor data input(s) to increase the accuracy of meltpool dimension estimations as opposed to using a linear prediction model with APD sensor input alone. As such, the algorithm(s) applied by the control architecture 150 of FIG. 1B allow for the steering of the printing process towards target meltpool settings (e.g., meltpool width, meltpool depth, etc.) defined by input material targets (e.g., porosity, etc.). Furthermore, the algorithm(s) applied by the control architecture 150 of FIG. 1B compensate for variation(s) in thermal behavior due to changes in geometry, while near real-time estimation of meltpool properties can be made possible using field-programmable gate array (FPGA) implementation, enabling L2L feedback, as described in connection with FIG. 18.

Figures 10A, 10B:
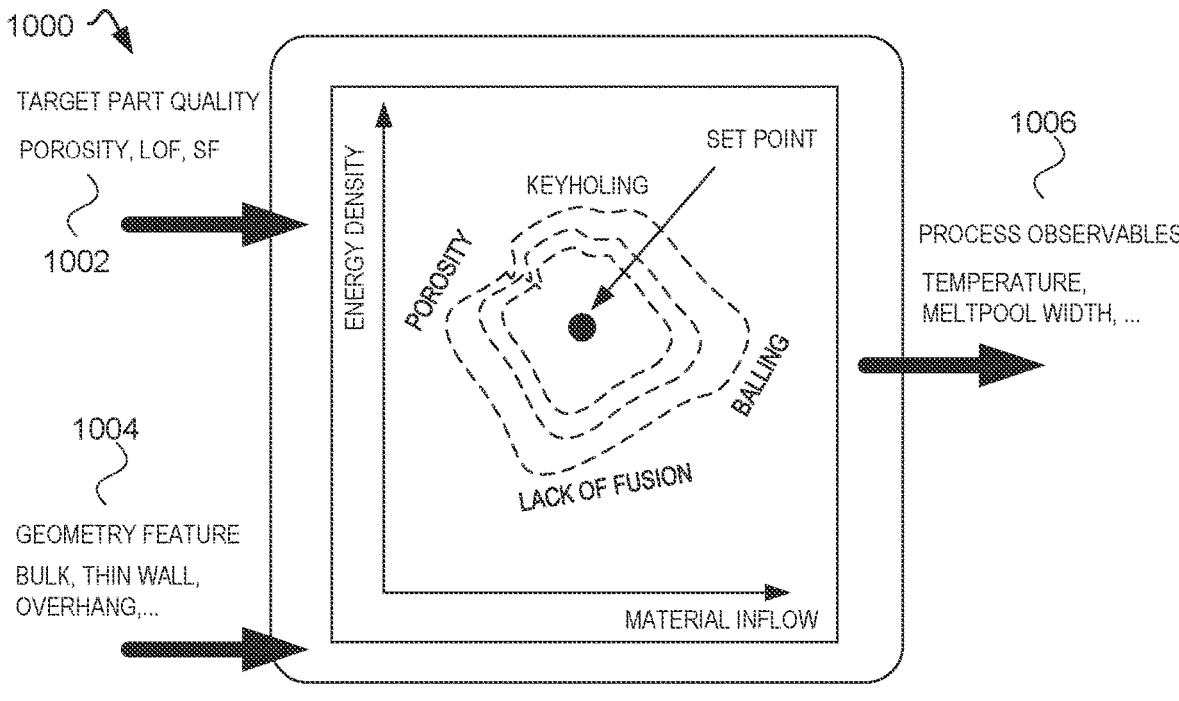
FIG. 10A illustrates an example translation of material properties into process observables.
FIG. 10B illustrates an example simplified approach used for the material response surface model of FIG. 1A.

FIG. 10A illustrates an example translation 1000 of material properties into process observables (e.g., meltpool depth, meltpool width, etc.). FIG. 10A illustrates the translation of material properties into process observables using a two-dimensional example. In FIG. 10A, an example target part quality input 1002 and an example geometry feature input 1004 are used to determine example reference value(s) of the process observable(s) 1006 using inverse mapping of the material response surface. For example, the target part quality input 1002 includes desired material properties (e.g., porosity, surface finish, etc.), the geometry feature input 1004 includes part geometry features (e.g., volume fraction, thermal leakage, etc.), and the reference value(s) output of the process observable(s) 1006 includes, for example, temperature and meltpool width, as described in connection with the material response surface model 104 (M0-A) of FIG. 1A (e.g., translation of desired material properties to process of observables). As such, desired part quality (e.g., porosity, surface finish etc.) can be translated to desired values and/or ranges of process observables (e.g., melt-pool dimensions, temperature distributions) at a voxel level for any part.

In some examples, the material response surface can be identified as a multi-dimensional mapping of desired material properties (e.g., porosity, lack of fusion, etc.) in response to several process observables (e.g., meltpool dimensions, temperature, etc.). In some examples, geometric features (e.g., thermal leakage, volume fraction, etc.) can also be optionally included as parameters to the mapping function. In some examples, the materials response surface can be used to understand the range of process variables (e.g., geometric features) that result in desired material qualities. Given that material quality can be used as an end metric, the material response surface (e.g., or the inverse mapping thereof) allows for the computation of desired process observables for a given geometric feature set that can be used to set voxelized references.

In the example of FIG. 10A, the material response surface model 104 (M0-A) can translate the target part quality input 1002 (e.g., porosity, lack of fusion, etc.) to meltpool depth. In some examples, the material response surface model 104 identifies a meltpool depth of 150 micrometers (um) to maintain a desired LOF and/or porosity level in the bulk region(s) of the part being printed. In some examples, the material response surface model 104 identifies a meltpool depth of 50 micrometers to maintain a desired roughness value in the downskin region(s) of the part being printed. Such an approach, as described using the methods and apparatus disclosed herein, permits a more efficient and accurate method of identifying the reference value(s) of the process observables output 1006 compared to a more simplified approach as illustrated in connection with FIG. 10B. For example, FIG. 10B illustrates an example simplified approach 1050 used for the material response surface model 104 (M0-A) of FIG. 1A. In the example of FIG. 10B, a desired meltpool depth 1052 is determined based on a vertical distance 1054 from the printing powder in a number of layers (e.g., layers 1-8). In FIG. 10B, as the vertical distance 1054 from the powder layer increases, the meltpool depth also increases.

FIG. 11 illustrates example autozoning and depth reference map generation based on a drill down model 1100 and/or thermal leakage map(s) 1110, 1120 in connection with the voxelized reference generating circuitry of FIG. 2. For example, a drill down model 1100 can be used to assign an identified distance (d) 1102 (e.g., from the powder surface) to a voxel. For example, the autozoning (M0-B) model 112 of FIG. 1A can perform autozoning on a part geometry (e.g., part geometry 110) based on the drill down model 1100 to assign different references to different features. For example, the drill down model 1100 of FIG. 11 measures the vertical distance 1102 from a voxel to the printing powder. In the example of FIG. 11, each vertical distance measurement is indicated as a number (e.g., 1, 2, 3, . . . 5, 6, 7, etc.) based on the vertical distance of the voxel from the underlying powder (e.g., 0). As such, the drill down model 1100 allows identification of what is around a voxel (e.g., powder versus solid object). However, the autozoning (M0-B) model 112 can also include the use of thermal leakage maps 1110, 1120, where the horizontal and vertical axes correspond to the x- and z-dimension(s) 1112, 1114 of a vertical section representing a model part. In the example of FIG. 11, the autozoning (M0-B) model 112 identifies a thermal leakage map, such that a reference for each voxel is set based on the thermal leakage characteristics of the voxel, as shown using a thermal leakage indicator 1118. The thermal leakage map 1110 identifies areas with higher and/or lower thermal leakage. In some examples, there is a combination of solid and/or powder areas (e.g., as in section 1116). The thermal leakage map of section 1116 (e.g., with zoomed in sections of x- and z-dimension(s) 1122, 1124 and zoomed in thermal leakage indicator 1126) shows the transition between areas of higher thermal leakage (indicated by lighter colors) and areas of lower thermal leakage (indicated by darker colors).

Figure 12:
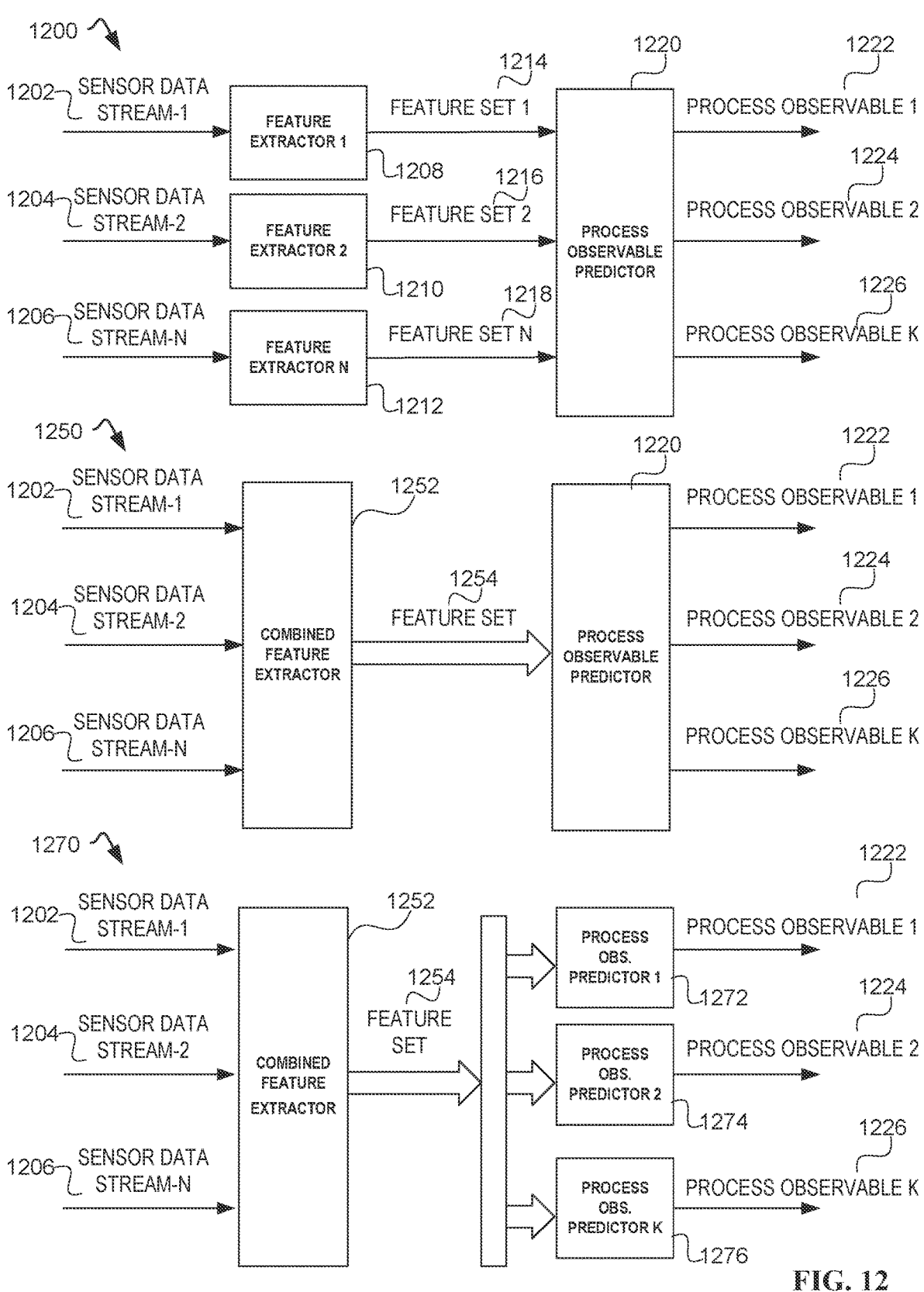
FIG. 12 illustrates example algorithms used for processing data streams originating from one or more sensors linked to an additive manufacturing process.

FIG. 12 illustrates example algorithms 1200, 1250, 1270 used for processing data streams originating from one or more sensors linked to an additive manufacturing process. As described in connection with FIG. 1B, the control architecture 150 includes the meltpool feature extractor 166 model (M3), which can be used to ingest high dimensional data streams coming from printer sensor(s) and/or generate a tractable set of features capable of reconstructing the original data stream with low resolution error via a linear mapping, allowing for efficient handling of the high dimensional dataset(s). In the example of FIG. 12, algorithm 1200 includes separate feature extractor(s) with a single process observable predictor, algorithm 1250 includes a combined feature extractor with a single process observable predictor, and algorithm 1270 includes a combined feature extractor with multiple process observable predictor(s). In the example of algorithm 1200, sensor data stream(s) 1202,

1204, and/or 1206 are passed through individual feature extractor(s) 1208, 1210, 1212 to obtain multiple feature set(s) (e.g., feature set(s) 1214, 1216, 1218). The feature set(s) 1214, 1216, 1218 serve as input into an example process observable predictor 1220, which outputs multiple example process observables (e.g., process observables 1222, 1224, 1226). In the example of algorithm 1250, the multiple sensor data stream(s) 1202, 1204, and/or 1206 are input into a combined feature extractor 1252, which outputs a single feature set 1254. The single feature set 1254 is then processed using the single process observable predictor 1220, as in algorithm 1200, resulting in the multiple process observables 1222, 1224, 1226. In the example of algorithm 1250, the multiple sensor data stream(s) 1202, 1204, and/or 1206 are input into the combined feature extractor 1252, which outputs the single feature set 1254. The single feature set 1254 is then fed into separate process observable predictor(s) 1272, 1274, 1276, resulting in the multiple process observables 1222, 1224, 1226. In some examples, the selection of algorithm(s) 1200, 1250, 1270 depends on the number of sensor(s) available, processing power, and/or the material of interest. In some examples, the presence of multiple sensors can require the extraction of features from the multiple individual sensors (e.g., algorithm 1200). In some examples, the use of camera(s) that can lack the capacity for onboard processing can benefit from the use of a field-programmable gate array (FPGA) that receives input from the camera(s). Likewise, the selection of an algorithm that uses a single versus multiple process observable predictor(s) can be determined based on the use of a centralized control versus a decentralized control, as well as the availability of computational resources (e.g., a single computer generating information versus distribution of the computation using machine and/or cloud-based processing). Using the algorithms 1200, 1250, and/or 1270, the meltpool feature extractor 166 model (M3) can directly estimate process observables from a plurality of sensor(s) (e.g., sensor(s) 1202, 1204, 1206). For example, while methods and apparatus disclosed herein focus on the estimation of meltpool width and/or meltpool depth, the use of additional sensor(s) can permit the estimation of any other process observables (e.g., temperature distribution, cooling rate, etc.).

FIG. 13A is an example diagram 1300 of an encoder for extracting features from input images and/or an estimator to identify meltpool depth and/or meltpool width based on a deep neural network model in connection with the training circuitry of FIG. 3. However, as previously described in connection with FIG. 7, high-fidelity simulation model(s) and/or multiple sensor modalities can also be combined with physics-based model(s) to determine meltpool characteristic(s). For example, the control architecture 150 can include the use of machine learning model(s) can that combine multiple sensor data input (e.g., Down Beam Camera (DBC) input 1302, Avalanche Photo Diode (APD) input 1304, etc.). In some examples, the DBC input 1302 is provided to an encoder 1306 (e.g., deep autoencoder) for extracting features (e.g., a total of 16 features) from images provided by the DBC input 1302 (e.g., 100×100 images) while maintaining a high level of reconstruction accuracy (e.g., >99% reconstruction accuracy). The encoder 1306 can be trained and validated on images collected on a variety of parameter sets and/or underlying geometries. In some examples, the encoder 1306 can be trained to be scan angle invariant to make latent features less sensitive to scan angle variation. In some examples, a depth and/or width (D/W) estimator 1308 receives the extracted features from the encoder 1306 and/or input from the APD input 1304. For example, the D/W estimator 1308 can represent a deep neural network receiving inputs that can include the encoder features (e.g., 16 encoder features from the DBC input) as well as APD input 1304 (e.g., a APD sample). The D/W estimator 1308 can output either combined depth/width and/or depth, width, or height of the meltpool (e.g., predicted dimensions 1310). In some examples, the D/W estimator 1308 can be trained on 70% of the data set and tested on the remaining 30% of the data set for accuracy. In some examples, the feature extraction and/or estimation of meltpool depth and/or width models can be deployed on the FPGA to be used for closed loop feedback (e.g., in connection with the control architecture 150 of FIG. 1B). Methods and apparatus disclosed herein allow for the estimation of process observables directly and/or in situ, allowing further parameter-based development, defect detection, and/or feedback control. For example, estimates of melt-pool variables that are not directly measurable by common sensors can be obtained. Furthermore, applying the methods and apparatus disclosed herein with a suite of relatively inexpensive sensors in an existing machine architecture can provide measurements which can only be measured with more advanced sensors which may also not be available in situ or require machine architecture modification.

FIG. 13B illustrates an example training workflow 1350 for meltpool depth and/or width (D/W) estimation based on the depth/width estimator 1308 of FIG. 13A. In the example of FIG. 13B, the training workflow 1350 can perform several training steps that can include a process data step 1352, a filter samples step 1354, a split train/test step 1356, a standardize data step 1358, an optimize hyperparameters step 1360, a select/build optimal model step 1362, and/or a variable selection strategies step 1364. For example, the process data step 1352 can include performing build plate normalization for DBC and/or APD sensors, filtering out dark frames, and/or merging data with characterization data. The filter samples step 1354 can include removing samples that are below a certain threshold, while the split train/test step 1356 can include the performance of random splitting, with data standardization (e.g., minimum and/or maximum scaling between [−1, 1]) performed using the standardize data step 1358. In some examples, the training workflow 1350 includes optimizing hyperparameters (e.g., setting a number of hidden layers in the network, identifying a number of neurons per hidden layer, selecting an optimizer (e.g., Adam, RMSprop), setting a batch size, etc.). Once steps 1352, 1354, 1356, 1358, 1360 are complete, the training workflow 1350 proceeds to the selecting and/or building an optimal model step 1362 (e.g., using a selected neural network with 3 hidden layers and a select number of neurons). In some examples, the training workflow 1350 proceeds to the variable selection strategies step 1364 to eliminate extrapolating features based on architecture predictions (e.g., eliminating the APD feature). In some examples, once the variable selection strategies step 1364 is performed, control can return to the selecting and/or building an optimal model step 1362 until the training workflow 1350 results in meltpool depth and/or width estimations that reach a desired level of accuracy.

Figure 14A:
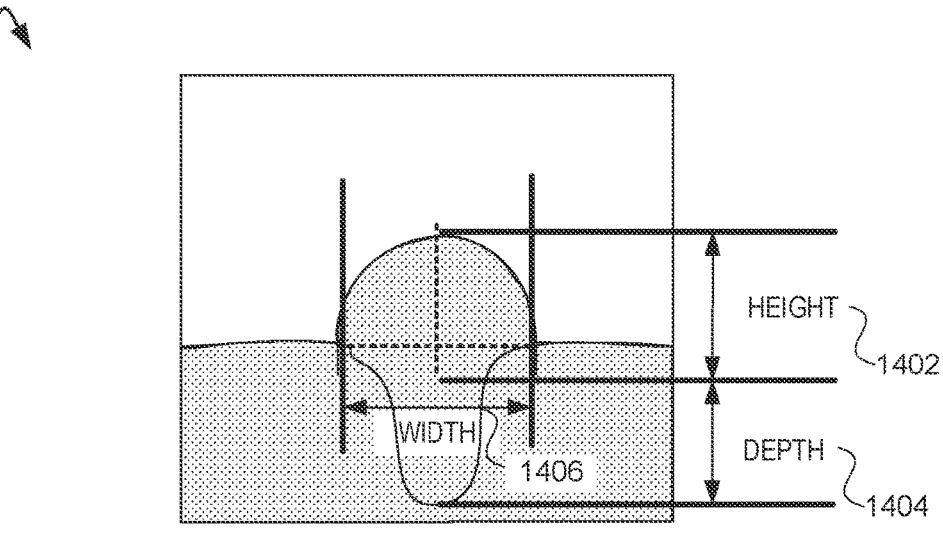
FIG. 14A illustrates an example diagram of meltpool-based estimation of dimensions using depth/width estimations on validation datasets in connection with the depth/width estimator of FIGS. 13A-13B.

FIG. 14A illustrates an example diagram 1400 of meltpool-based estimation of dimensions using depth/width estimations on validation datasets in connection with the depth/width estimator 1308 of FIGS. 13A-13B. In the example of FIG. 14A, meltpool dimensions can be calculated based on a meltpool height 1402, a meltpool depth 1404, and/or a meltpool width 1406 (e.g., derived from single track bead on powder experiments and/or post build cut-ups, etc.). FIG.

Figure 14B:
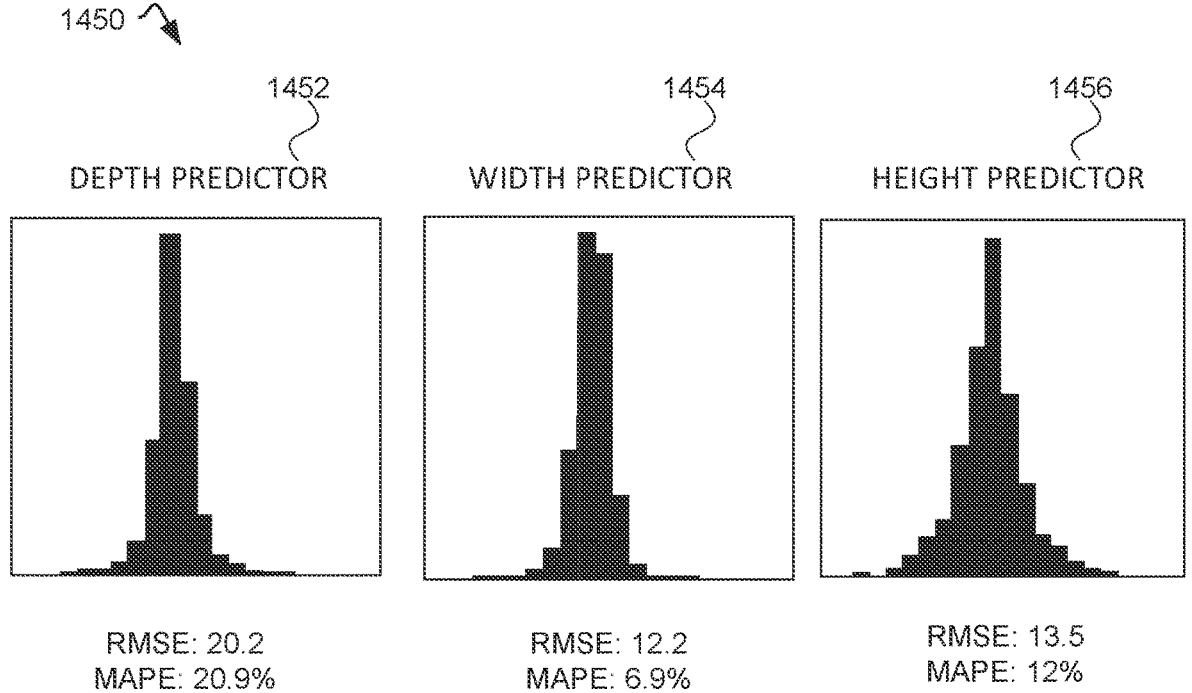
FIG. 14B illustrates example histograms generated in connection with depth/width estimation performance on validation dataset(s) for different meltpool dimensional quantities.

14B illustrates example histograms 1450 generated in connection with depth/width estimation performance on validation dataset(s) for different meltpool dimensional quantities. In FIG. 14B, an example depth predictor 1452, an example width predictor 1454, and/or an example height predictor 1456 can be used to identify which data input (e.g., DBC, APD, etc.) provides an advantage in terms of reducing error(s) and/or expanding an operating regime. For example, using a linear prediction model results in a higher prediction error as compared to using a neural network-based predictor described in connection with FIGS. 13A-13B. For example, while the root mean squared error (RMSE) for the linear predictor model (e.g., using APD-based data stream) yields an RMSE of 81.5% for a meltpool width prediction and a 78.9% RMSE for a depth prediction, the neural-network based predictor (e.g., using a combination of the APD and DBC data streams) yields an RMSE of 12.2% for the width prediction and an RMSE of 20.2% for the depth prediction. In some examples, the neural network-based predictor can include a neural network-based compression algorithm and/or a neural network-based classifier (e.g., using a convolutional neural network to extract features with an autoencoder to predict the meltpool features). For example, in FIG. 14B, the depth predictor 1452 obtains a value of 20.2% for the RMSE measurements and a corresponding mean absolute percentage error (MAPE) of 20.9%, the width predictor 1454 obtains a value of 12.2% for the RMSE measurements and a corresponding MAPE of 6.9%, and the height predictor 1456 obtains a value of 13.5% for the RMSE measurements and a corresponding MAPE of 12%. As such, the depth predictor 1452, the width predictor 1454, and/or the height predictor 1456 can be used to predict the depth, width, and/or height of a meltpool using the depth/width estimator 1308 of FIGS. 13A-13B.

Figure 15:
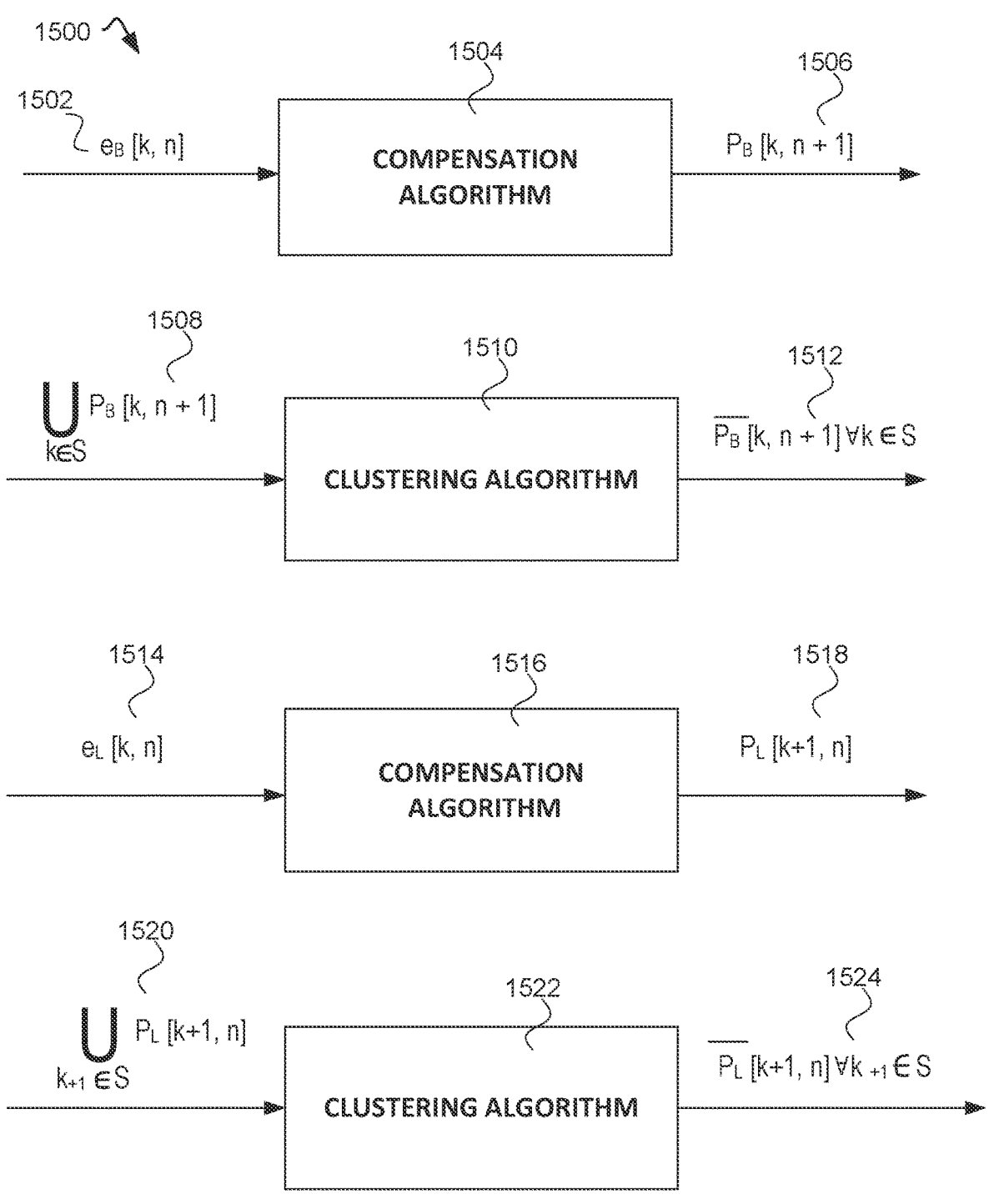
FIG. 15 illustrates example compensation algorithms and clustering algorithms associated with the controlling circuitry of FIG. 4.

FIG. 15 illustrates example compensation algorithms and clustering algorithms 1500 associated with the controlling circuitry 402 of FIG. 4. In the example of FIG. 15, a first compensation algorithm 1504 and/or a first clustering algorithm 1510 can be used for a build-to-build (B2B) updating algorithm, while a second compensation algorithm 1516 and/or a second clustering algorithm 1522 can be used for a layer-to-layer (L2L) updating algorithm. For example, in the build-to-build (B2B) updating algorithm, a B2B compensation input 1502 is provided to the first compensation algorithm 1504, which results in a B2B compensation output 1506. In the example of FIG. 15, the B2B compensation input 1502 (e.g., $e_B[k, n]$) represents a first error vector of process observable(s) between a reference and an estimate for the $k^{th}$ voxel of the $n^{th}$ build, while the B2B compensation output 1506 (e.g., $P_B[k, n+1]$) represents a first parameter vector for the $k^{th}$ voxel of the n+1 build resulting from the B2B adjustment. In the example of FIG. 15, a B2B clustering input 1508 is provided to the clustering algorithm 1510 based on the B2B compensation output 1506. For example, the B2B clustering input 1508 represents a first union of sets of the parameter vector, where S is a suitable (e.g., two-dimensional or three-dimensional) cluster of voxels which can be assigned the same parameter vector $\overline{P_B}$ based on certain metrics. As such, a B2B clustering output 1512 includes the parameter vectors which are elements of and/or can be represented by the S category. In the layer-to-layer (L2L) updating algorithm, a L2L compensation input 1514 is provided to the second compensation algorithm 1516, which results in a L2L compensation output 1518. In the example of FIG. 15, the L2L compensation input 1514 represents a second error vector of process observable(s) between a reference and an estimate for the $k^{th}$ voxel of the $n^{th}$ build, whereas the L2L compensation output 1518 represents a second parameter vector for the $k^{th}$ voxel of the $n^{th}$ build, where a voxel with k+1 denotes the voxel immediately above the $k^{th}$ voxel. Based on the L2L compensation output 1518, an L2L clustering input 1520 representing a union of all parameter vectors that represents elements of S (e.g., a suitable 2D cluster of voxels which can be assigned the same parameter vector $\overline{P_L}$ based on certain metrics) is provided to the second clustering algorithm 1522. The second clustering algorithm 1522 processes the L2L clustering input 1520 to identify parameter vectors which are elements of and/or can be represented by the S category (e.g., L2L clustering output 1524). While in the example of FIG. 15 the L2L and B2B algorithms are represented separately, methods and apparatus disclosed herein can also combine the L2L and B2B computations, as shown in connection with FIG. 16, which illustrates example execution of algorithms associated with the controlling circuitry.

Figure 16:
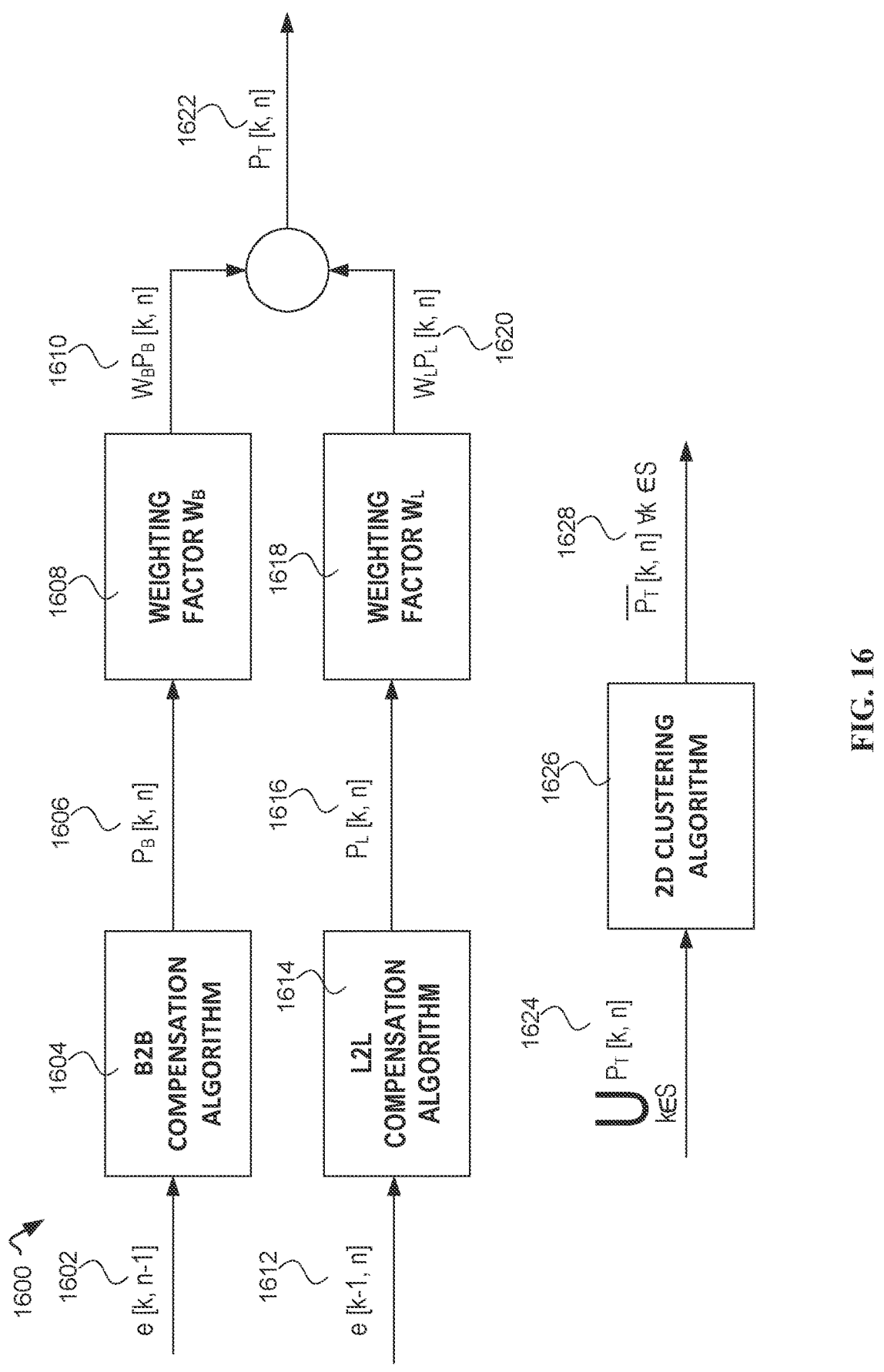
FIG. 16 illustrates example execution of algorithms associated with the controlling circuitry of FIG. 4.

FIG. 16 illustrates example execution of algorithms 1600 associated with the controlling circuitry 402 of FIG. 4. In the example of FIG. 16, B2B compensation algorithm input 1602 includes an error (e) for a given voxel k at a previous layer (n−1). An example B2B compensation algorithm 1604 (e.g., based on the first compensation algorithm 1504 of FIG. 15) can determine an example B2B parameter set 1606 ($P_B$) based on the input error provided by the B2B compensation algorithm input 1602. For example, if an error e is identified for a given voxel in a previous layer (e.g., based on B2B compensation algorithm input 1602), the parameter set being output (e.g., B2B parameter set 1606) can compensate for the identified error (e.g., adjust printing parameters). An example B2B weighing factor identifier 1608 takes in the B2B parameter set 1606 to perform factor weighing, outputting an example weighted B2B parameters set 1610. In addition to the B2B-based parameter set identification, a L2L parameter set can also be identified, allowing for correction of layer-to-layer and/or build-to-build printing based on observed build-related and/or layer-related errors. For example, a L2L compensation algorithm input 1612 including an error associated with a voxel immediately below the kth voxel (e.g., k−1) can be provided to the L2L compensation algorithm 1614 (e.g., based on the second compensation algorithm 1516 of FIG. 15). The L2L compensation algorithm 1614 identifies an example L2L parameter set 1616 ($P_L$), which serves as input into an example L2L weighing factor identifier 1618, resulting in an example weighted L2L parameter set 1620. The weighted L2L parameter set 1620 and/or the weighted B2B parameters set 1610 can be used to identify an example combined parameter set 1622 (e.g., to identify a power-based printer setting). For example, during a printing process (e.g., as shown using the printer 162 of FIG. 1B), any observed differences (e.g., identified errors) for a certain voxel when comparing a reference data input (e.g., voxelized reference map 116 of FIG. 1A, 1B) to the actual data input (e.g., derived from the sensor data 164 of FIG. 1B), the build-to-build and/or the layer-to-layer printing can be adjusted using the control architecture 150, as described in connection with FIG. 1B. For example, in a build-to-build adjusted, the subsequent build after which an error has been identified can be adjusted to compensate for the identified error (e.g., error associated with B2B compensation algorithm input 1602). However, an even faster adjustment can be made on a layer-to-layer basis, such that the subsequent layer can already have the necessary printing parameter adjustments made to compensate for the identified error (e.g., error associated with L2L compensation algorithm input 1612). When using both B2B and L2L algorithms to compensate for the identified errors between reference and actual data inputs, such a combination permits improvement in performance and increased speed of the resulting iterations, allowing a faster correction of any printing errors and a quicker convergence of the actual data input (e.g., received from the sensor data 164) to the reference data input (e.g., based on the voxelized reference map 116). In some examples, a 2D clustering algorithm 1626 can also be used by the controlling circuitry 402 to identify noise in the data and make any adjustments to the parameter sets to reduce the identified noise. For example, a total combined parameter data set 1624 (e.g., based on multiple combined parameter set(s) 1622) can be provided to the 2D clustering algorithm 1626 to identify any noise existing in the data and/or deviations from an average. The 2D clustering algorithm 1626 outputs an example adjusted parameter dataset 1628 that represents that parameter set that can be applied during the printing process. For example, if some printing parameters result in the use of a power values that fluctuates (e.g., ranging from 180 W to 210 W), such fluctuations can be due to the presence of noise. Based on spatial averaging, the 2D clustering algorithm 1626 can identify a power setting that can be maintained (e.g., 200 W) and/or eliminate any setting that deviates significantly (e.g., 118 W) based on the performed spatial averaging.

Figure 17:
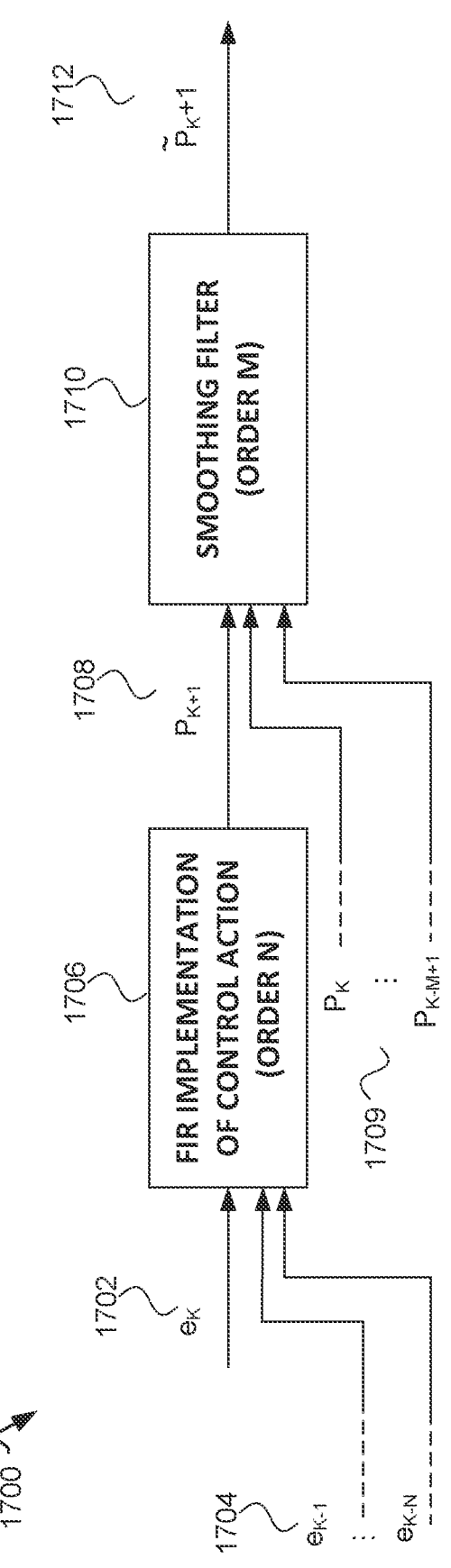
FIG. 17 illustrates example control action and/or smoothing filter processes associated with the algorithms of FIG. 16.

FIG. 17 illustrates example control action and/or smoothing filter processes 1700 associated with the algorithms of FIGS. 15-16. As previously described, any type of control law and/or smoothing algorithm can be used (e.g., nonlinear smoothing algorithm, etc.). For example, FIG. 17 presents a real-time conversion of input error(s) 1702, 1704 into finite impulse response (FIR) process parameter(s) 1708, 1709 via an FIR implementation of control action(s) 1706. In the example of FIG. 17, e k represents the error vector of process observables at $k^{th}$ time instant between their corresponding estimates and the reference vector at the instantaneous voxel location, where as P k represents the parameter vector applied at the $k^{th}$ time instant. For example, the FIR implementation of control action(s) 1706 can include an FIR filter that can be used to implement a frequency response digitally (e.g., using a series of delays, multipliers, and/or adders to create the filter's output). In some examples, the FIR process parameter(s) 1708, 1709 undergo additional filtering via a smoothing filter 1710, resulting in a merged parameter set output 1712 that can be used to identify printer-based parameters such as power. In some examples, the smoothing filter 1710 can be used to perform batch processing of the input data.

Figure 18:
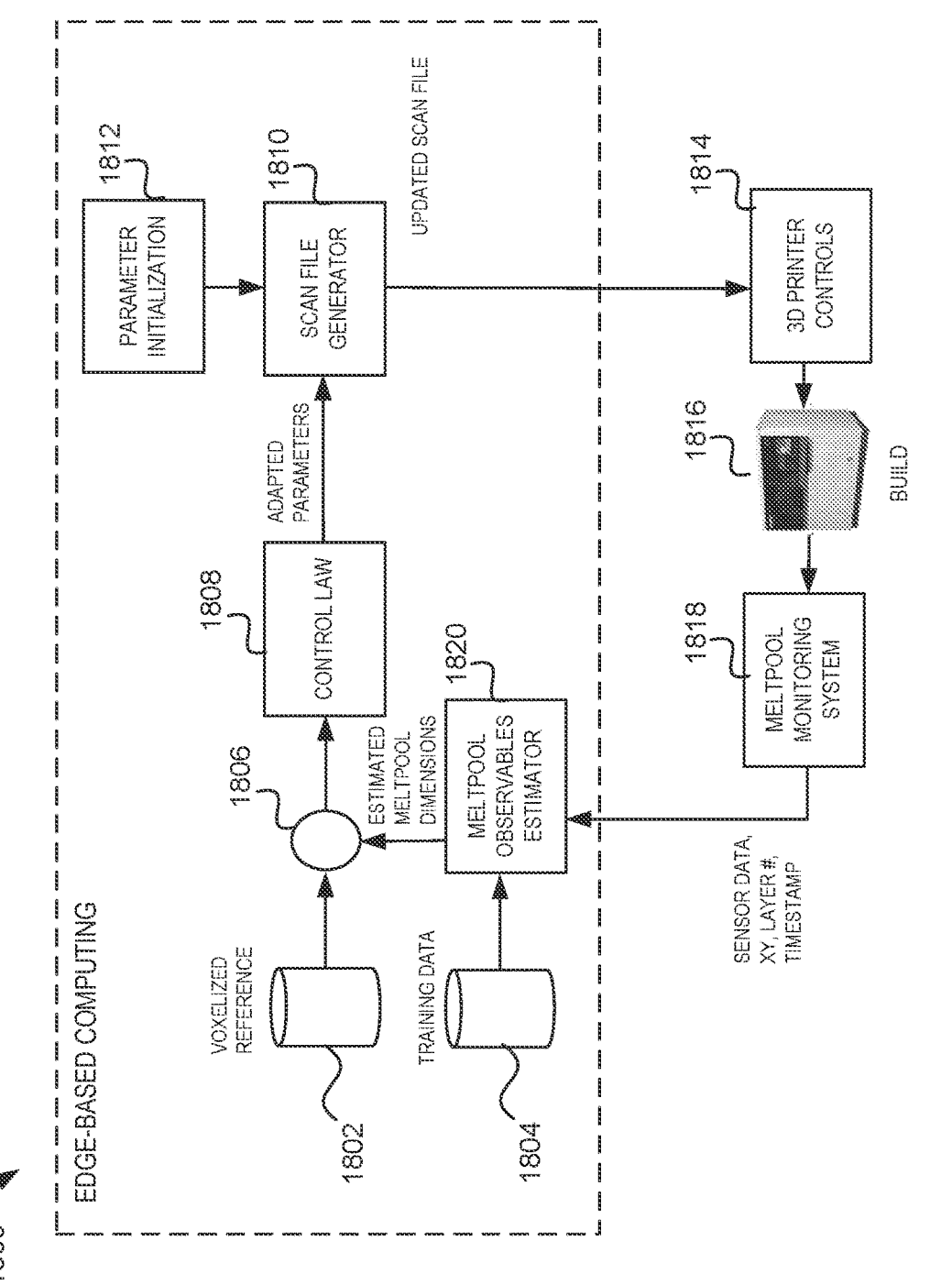
FIG. 18 illustrates an example closed loop architecture associated with the controlling circuitry of FIG. 4.

FIG. 18 illustrates an example closed loop architecture 1800 associated with the controlling circuitry 402 of FIG. 4. However, any other type of closed loop architecture arrangement can be used to implement the controlling circuitry 402. In the example of FIG. 18, data input(s) 1802, 1804 include voxelized reference data input (e.g., data input 1802) and/or training data input (e.g., data input 1804). In some examples, the data input(s) 1802 include geometry-based data input used to identify a volume fraction for a given voxel, etc. As described in connection with FIG. 1B, example error 1806 represents an error metric between the voxelized reference map 116 and process observable estimates (e.g., estimates of physical melt-pool characteristics such as meltpool dimensions, temperature profile, cooling rate, etc.) obtained using a meltpool observables estimator 1820. For example, the control architecture 150 of FIG. 1B adjusts the process input parameters (e.g., power, speed, spot-size, beam profile, etc.) to drive the error metric (e.g., error metric 152) down to an acceptable value so that the desired build quality is maintained using control law 1808. Based on the adapted parameters identified using the control law 1808 and/or initialized parameters (e.g., obtained using parameter initialization 1812, as described in connection with FIG. 1B), a scan file generator 1810 generates a scan file and/or updates an existing scan file. In some examples, these processes can be performed using edge-based computing. In some examples, the updated scan file can be sent to 3D printer controls 1814, which initiate the 3D build (e.g., build 1816). In some examples, a meltpool monitoring system 1818 identifies meltpool-based data based on the 3D build 1816 (e.g., sensor data, timestamp, layer data, build data, and/or x-coordinates and/or y-coordinates corresponding to the input data information such as the location of real-time meltpool dimension data collection within a particular layer of a three-dimensional build, etc.). The meltpool-based data based on the 3D build 1816 can be provided to the meltpool observables estimator 1820. The meltpool observables estimator 1820 uses the input data from the meltpool monitoring system 1818 and/or the training data 1804 to identify estimated meltpool dimensions, which can further be used to determine the presence of error(s) to identify parameter-based adjustments that can be made prior to the next build (e.g., in a build-to-build implementation), the next layer (e.g., in a layer-to-layer implementation), and/or in real-time, as described in connection with FIG. 8.

In some examples, the meltpool observables estimation can be performed using an image processing computer and/or a field programmable gate array (FPGA). For example, the FPGA can provide data output corresponding to x-coordinate, y-coordinate, and/or volume fraction information to a data acquisition system (e.g., an FPGA Serial Peripheral Interface (SPI) acquisition system, an FPGA image acquisition system, and/or a file transfer protocol (FTP) server to permit file transfer). However, any other type of system can be used to implement real-time, layer-to-layer and/or build-to-build controls. In some examples, the edge-based computing system of FIG. 18 generates a contour file that can be input to a 3D printing system software suite. In some examples, the 3D printing system software suite permits the use of high-definition energy density maps, as shown in connection with FIG. 20. For example, FIG. 20 illustrates experimental results associated with a select layer of a test geometry. As the printing process proceeds, data inputs can be received from various sources (e.g., a meltpool monitoring system 1818). In some examples, the meltpool monitoring system 1818 can include photodiode data, down-beam camera data, and/or other co-axial meltpool sensor date. In some examples, post-build training data obtained from characterization (e.g., cut-ups, computed tomography, etc.) can be used to assess training outcomes associated with recognition of meltpool dimensions and/or predictions of meltpool depth, meltpool with, and/or meltpool height.

Figure 19:
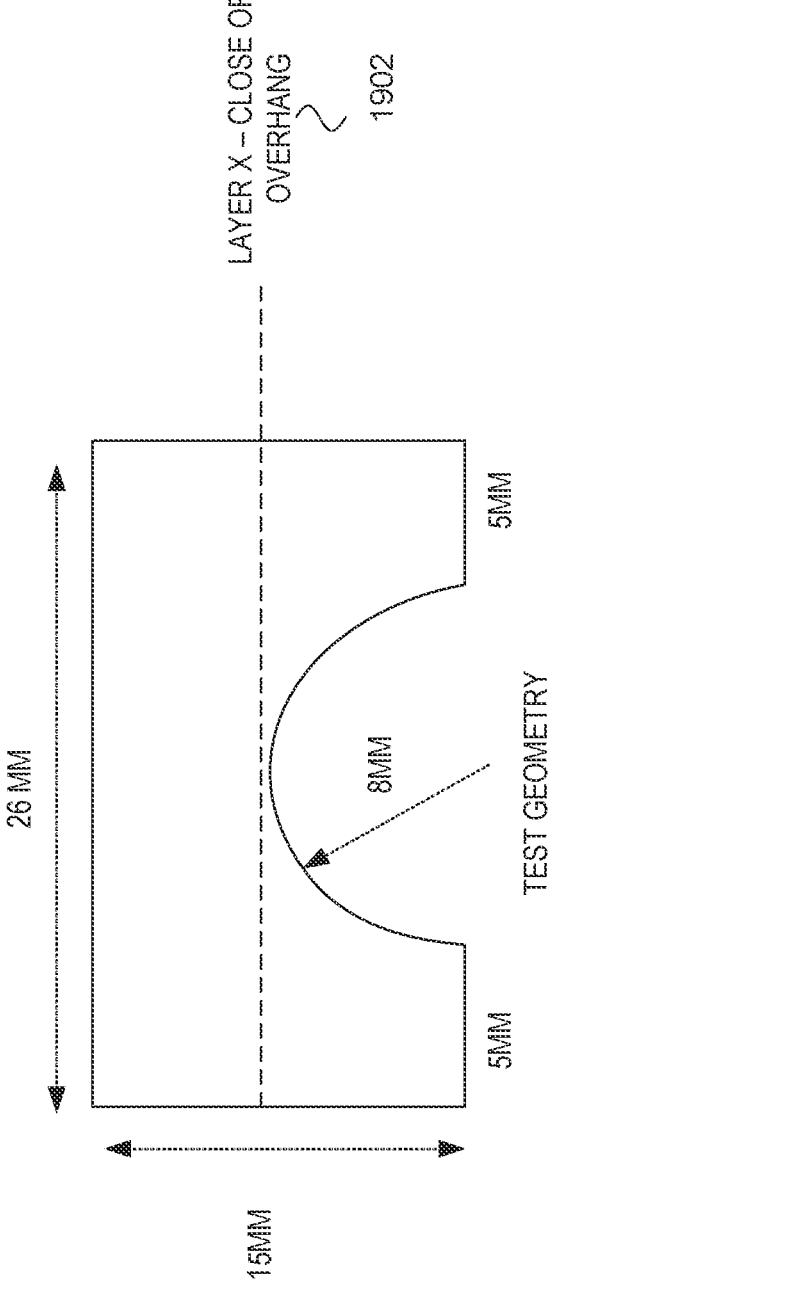
FIG. 19 illustrates an example test geometry selected for training purposes.

FIG. 19 illustrates an example test geometry 1900. In the example of FIG. 19, an arch geometry is used for purposes of assessing layer-to-layer and/or build-to-build convergence of meltpool dimension parameters. For example, an area of 15 mm by 26 mm can be selected with an 8 mm radius defining the arch. In the example of FIG. 19, a layer representative of an overhang region 1902 can be used to examine a closing of the overhang region 1902, given that some parts that require three-dimensional printing can include overhanging and/or protruding features that need to be accurately reproduced. In some examples, the test geometry 1900 shown in FIG. 19 can be used to assess the performance of the meltpool feature extraction and/or meltpool dimension adjustment process during printing. For purposes of testing, arches can be stacked on top of each other to save turnaround time. FIG. 20 represents experiment results associated with a layer representing the closing of the overhang region 1902 of FIG. 19.

Figure 20:
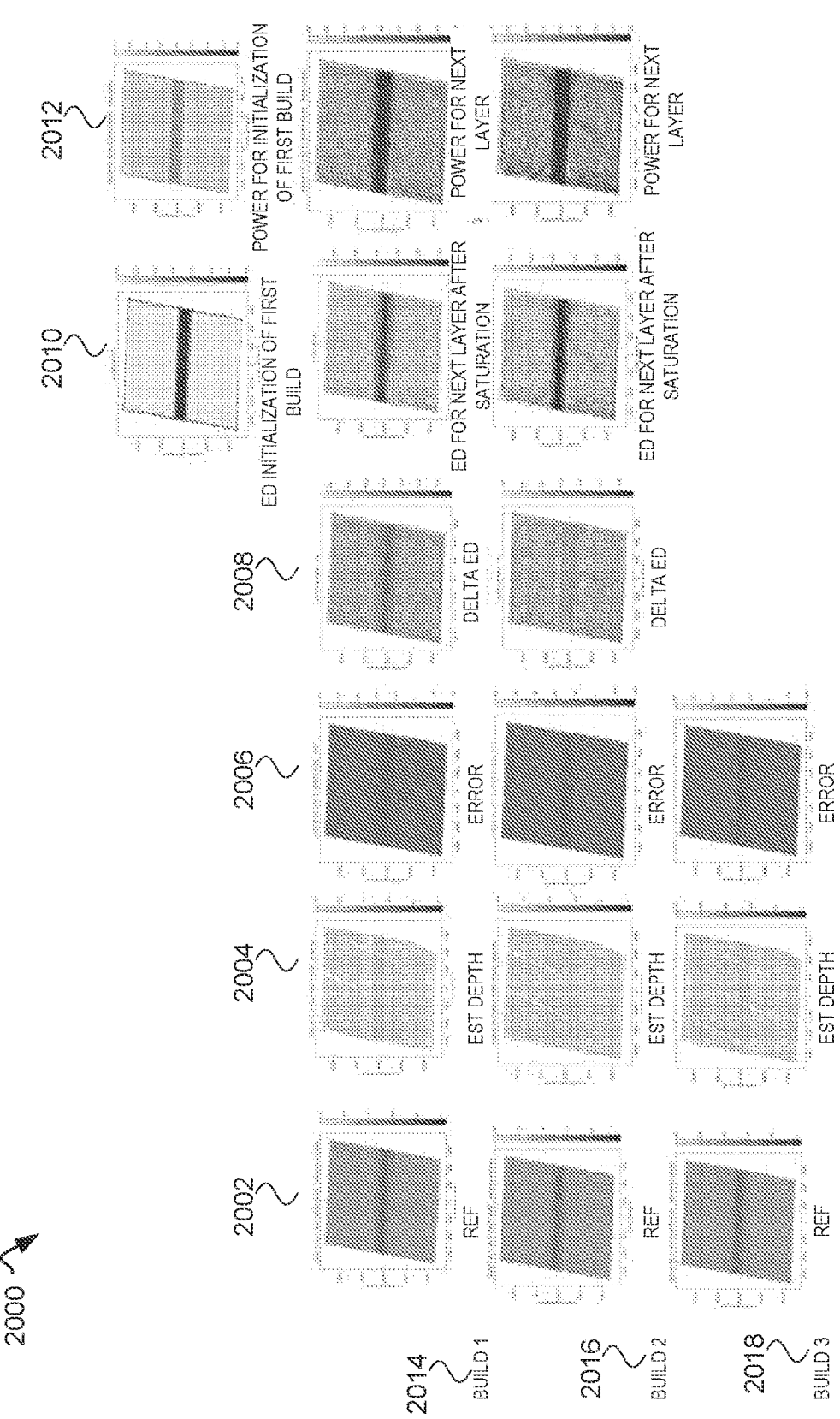
FIG. 20 illustrates example experimental results associated with a select layer of the test geometry of FIG. 18.

FIG. 20 illustrates example experimental results 2000 associated with a select layer of the test geometry of FIG. 19. In the example of FIG. 20, a reference map 2002, an estimated depth map 2004, an error map 2006, a delta energy density (ED) map 2008, an energy density map 2010 (e.g., energy density map at initialization of a first build, energy density map for a subsequent layer after saturation, etc.), and/or a power map 2012 (e.g., power map for an initialization of a first build, power map for a subsequent layer, etc.) can be generated to identify changes in energy density and determine parameter adjustments necessary to reduce the error between the reference reading and a reading of the energy density identified during the printing process. In the example of FIG. 20, maps for a total of three different builds are shown, including a first build 2014, a second build 2016, and/or a third build 2018. Beginning with the initial energy density map 2010 and the power initialization map 2012, the energy density and power maps are adjusted from the first build 2014 to the second build 2016 and from the second build 2016 to the third build 2018. As such, iterations are performed to reduce the error reading (e.g., error map 2006) over the course of each layer being added (e.g., in a layer-to-layer adjustment versus a build-to-build adjustment). In the example of FIG. 20, each voxel shown in the mapped two-dimensional image(s) corresponds to a pixel associated with a color code representing a region of interest and the values (e.g., power levels) associated with that region (e.g., each voxel representing a pixel). In some examples, the power map(s) of FIG. 20 can be passed through a filter (e.g., a spatial filter) during processing (e.g., using the edge-based computing system of FIG. 18).

Figure 21:
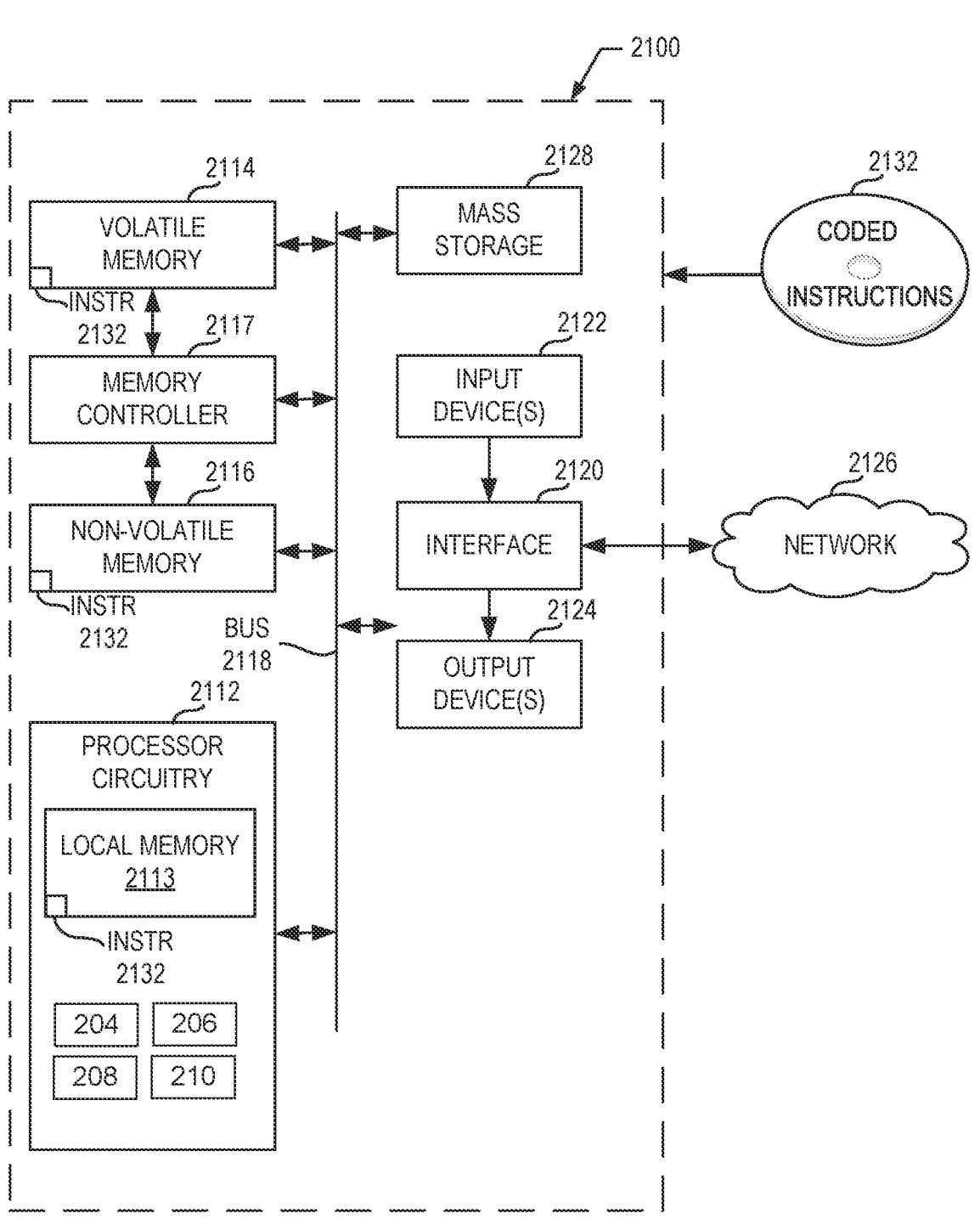
FIG. 21 is a block diagram of an example processing platform structured to execute the instructions of FIGS. 5 and/or 6 to implement the example voxelized reference generating circuitry of FIG. 2.

FIG. 21 is a block diagram of an example processor platform 2100 structured to execute the instructions of FIGS. 5 and/or 6 to implement the example voxelized reference generating circuitry of FIG. 2. The processor platform 2100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 2100 of the illustrated example includes processor circuitry 2112. The processor circuitry 2112 of the illustrated example is hardware. For example, the processor circuitry 2112 can be implemented by one or more integrated circuits, logic circuits, FPGAs micropro-cessors, CPUs, GPUs, DSPs, and/or microcontrollers from any desired family or manufacturer. The processor circuitry 2112 may be implemented by one or more semiconductor based (e.g., silicon based) devices. In this example, the processor circuitry 2112 implements the data receiving circuitry 204, the autozoning circuitry 206, the reference assigning circuitry 208, and/or the output generating circuitry 210.

The processor circuitry 2112 of the illustrated example includes a local memory 2113 (e.g., a cache, registers, etc.). The processor circuitry 2112 of the illustrated example is in communication with a main memory including a volatile memory 2114 and a non-volatile memory 2116 by a bus 2118. The volatile memory 2114 may be implemented by Synchronous Dynamic Random Access Memory (SDRAM), Dynamic Random Access Memory (DRAM), RAIVIBUS® Dynamic Random Access Memory (RDRAM®), and/or any other type of RAM device. The non-volatile memory 2116 may be implemented by flash memory and/or any other desired type of memory device. Access to the main memory 2114, 2116 of the illustrated example is controlled by a memory controller 2117.

The processor platform 2100 of the illustrated example also includes interface circuitry 2120. The interface circuitry 2120 may be implemented by hardware in accordance with any type of interface standard, such as an Ethernet interface, a universal serial bus (USB) interface, a Bluetooth® inter-face, a near field communication (NFC) interface, a PCI interface, and/or a PCIe interface.

In the illustrated example, one or more input devices 2122 are connected to the interface circuitry 2120. The input device(s) 2122 permit(s) a user to enter data and/or commands into the processor circuitry 2112. The input device(s) 2102 can be implemented by, for example, an audio sensor, a microphone, a camera (still or video), a keyboard, a button, a mouse, a touchscreen, a track-pad, a trackball, an isopoint device, and/or a voice recognition system.

One or more output devices 2124 are also connected to the interface circuitry 2120 of the illustrated example. The output devices 2124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 2120 of the illustrated example, thus, typically includes a graphics driver card, a graphics driver chip, and/or graphics processor circuitry such as a GPU.

The interface circuitry 2120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 2126. The communication can be by, for example, an Ethernet connection, a digital subscriber line (DSL) connection, a telephone line connec-tion, a coaxial cable system, a satellite system, a line-of-site wireless system, a cellular telephone system, an optical connection, etc.

The processor platform 2100 of the illustrated example also includes one or more mass storage devices 2128 to store software and/or data. Examples of such mass storage devices 2128 include magnetic storage devices, optical storage devices, floppy disk drives, HDDs, CDs, Blu-ray disk drives, redundant array of independent disks (RAID) sys-tems, solid state storage devices such as flash memory devices, and DVD drives.

The machine readable instructions 2132, which may be implemented by the machine readable instructions of FIGS. 5-6, may be stored in the mass storage device 2128, in the volatile memory 2114, in the non-volatile memory 2116, and/or on a removable non-transitory computer readable storage medium such as a CD or DVD.

Figure 22:
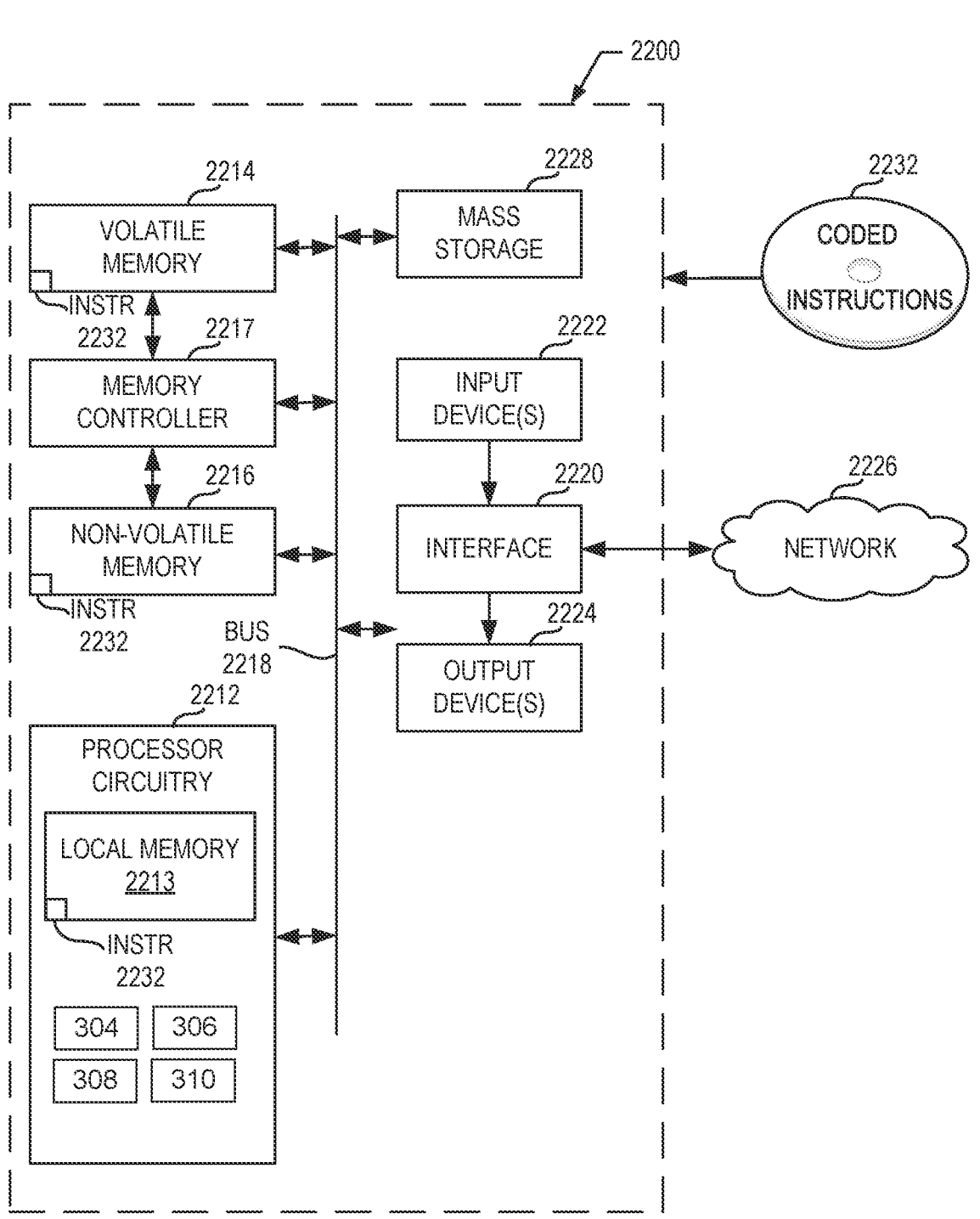
FIG. 22 is a block diagram of an example processing platform structured to execute the instructions of FIGS. 5 and/or 7 to implement the example training circuitry of FIG. 3.

FIG. 22 is a block diagram of an example processor platform 2200 structured to execute the instructions of FIGS. 5 and/or 7 to implement the example training circuitry of FIG. 3. The processor platform 2200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 2200 of the illustrated example includes processor circuitry 2212. The processor circuitry 2212 of the illustrated example is hardware. For example, the processor circuitry 2212 can be implemented by one or more integrated circuits, logic circuits, FPGAs microprocessors, CPUs, GPUs, DSPs, and/or microcontrollers from any desired family or manufacturer. The processor circuitry 2212 may be implemented by one or more semiconductor based (e.g., silicon based) devices. In this example, the processor circuitry 2212 implements the preprocessing circuitry 304, the filtering circuitry 306, the optimizing circuitry 308, and/or the model development circuitry 310.

The processor circuitry 2212 of the illustrated example includes a local memory 2213 (e.g., a cache, registers, etc.). The processor circuitry 2212 of the illustrated example is in communication with a main memory including a volatile memory 2214 and a non-volatile memory 2216 by a bus 2218. The volatile memory 2214 may be implemented by Synchronous Dynamic Random Access Memory (SDRAM), Dynamic Random Access Memory (DRAM), RAIVIBUS® Dynamic Random Access Memory (RDRAM®), and/or any other type of RAM device. The non-volatile memory 2216 may be implemented by flash memory and/or any other desired type of memory device. Access to the main memory 2214, 2216 of the illustrated example is controlled by a memory controller 2217.

The processor platform 2200 of the illustrated example also includes interface circuitry 2220. The interface circuitry 2220 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 2222 are connected to the interface circuitry 2220. The input device(s) 2222 permit(s) a user to enter data and/or commands into the processor circuitry 2212. The input device(s) 2202 can be implemented by, for example, an audio sensor, a microphone, a camera (still or video), a keyboard, a button, a mouse, a touchscreen, a track-pad, a trackball, an isopoint device, and/or a voice recognition system.

One or more output devices 2224 are also connected to the interface circuitry 2220 of the illustrated example. The output devices 2224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 2220 of the illustrated example, thus, typically includes a graphics driver card, a graphics driver chip, and/or graphics processor circuitry such as a GPU.

The interface circuitry 2220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 2226. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 2200 of the illustrated example also includes one or more mass storage devices 2228 to store software and/or data. Examples of such mass storage devices 2228 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine readable instructions 2232, which may be implemented by the machine readable instructions of FIGS. 5 and/or 7, may be stored in the mass storage device 2228, in the volatile memory 2214, in the non-volatile memory 2216, and/or on a removable non-transitory computer readable storage medium such as a CD or DVD.

Figure 23:
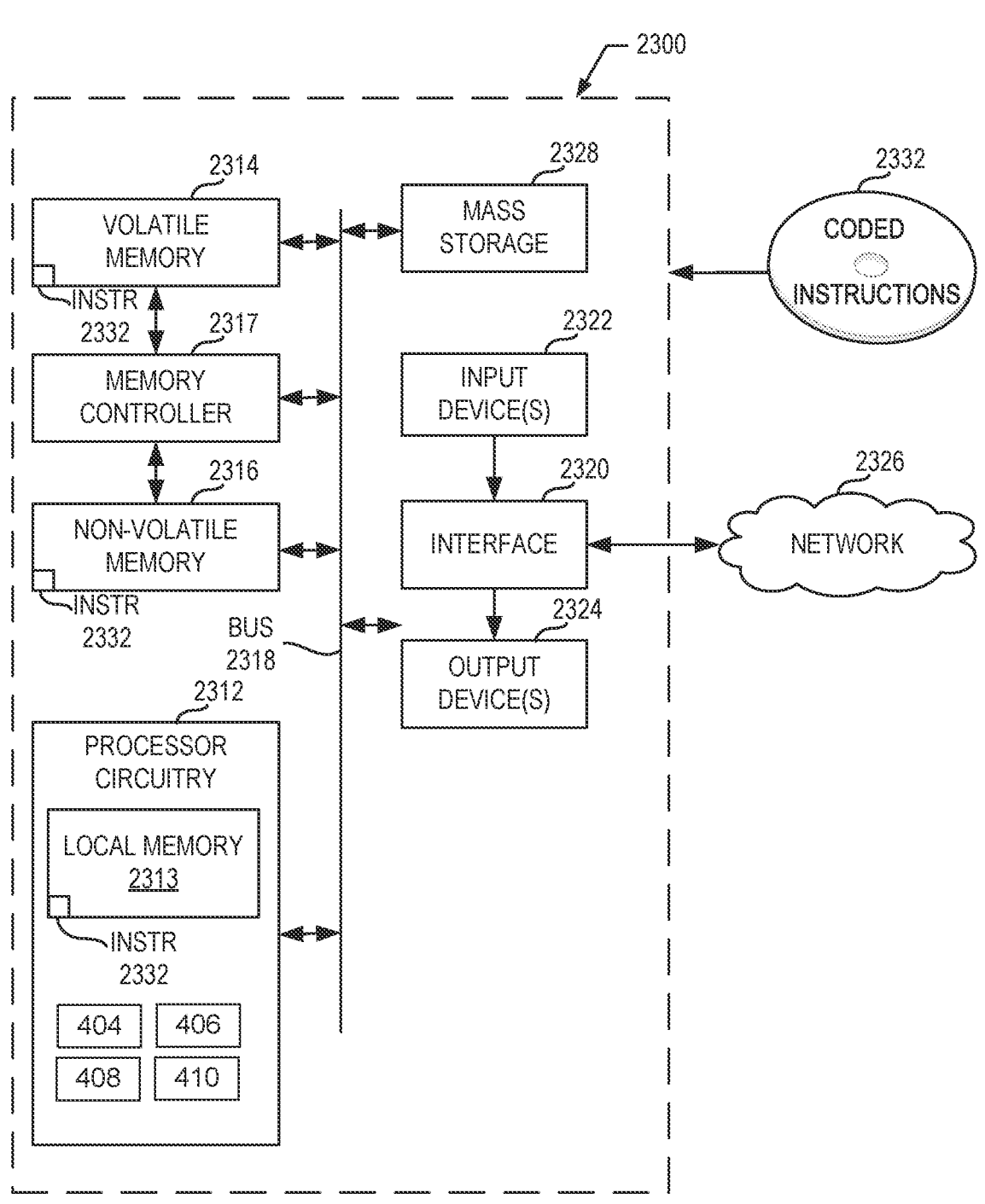
FIG. 23 is a block diagram of an example processing platform structured to execute the instructions of FIG. 5 to implement the example controlling circuitry of FIG. 4.

FIG. 23 is a block diagram of an example processing platform 2300 structured to execute the instructions of FIG. 5 to implement the example controlling circuitry of FIG. 4. The processor platform 2300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 2300 of the illustrated example includes processor circuitry 2312. The processor circuitry 2312 of the illustrated example is hardware. For example, the processor circuitry 2312 can be implemented by one or more integrated circuits, logic circuits, FPGAs microprocessors, CPUs, GPUs, DSPs, and/or microcontrollers from any desired family or manufacturer. The processor circuitry 2312 may be implemented by one or more semiconductor based (e.g., silicon based) devices. In this example, the processor circuitry 2312 implements the parameter initialization circuitry 404, the scan file generating circuitry 406, the parameter update circuitry 408, and/or the meltpool feature extracting circuitry 410.

The processor circuitry 2312 of the illustrated example includes a local memory 2313 (e.g., a cache, registers, etc.). The processor circuitry 2312 of the illustrated example is in communication with a main memory including a volatile memory 2314 and a non-volatile memory 2316 by a bus 2318. The volatile memory 2314 may be implemented by Synchronous Dynamic Random Access Memory (SDRAM), Dynamic Random Access Memory (DRAM), RAIVIBUS® Dynamic Random Access Memory (RDRAM®), and/or any other type of RAM device. The non-volatile memory 2316 may be implemented by flash memory and/or any other desired type of memory device. Access to the main memory 2314, 2316 of the illustrated example is controlled by a memory controller 2317.

The processor platform 2300 of the illustrated example also includes interface circuitry 2320. The interface circuitry 2320 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 2322 are connected to the interface circuitry 2320. The input device(s) 2322 permit(s) a user to enter data and/or commands into the processor circuitry 2312. The input device(s) 2302 can be implemented by, for example, an audio sensor, a microphone, a camera (still or video), a keyboard, a button, a mouse, a touchscreen, a track-pad, a trackball, an isopoint device, and/or a voice recognition system.

One or more output devices 2324 are also connected to the interface circuitry 2320 of the illustrated example. The output devices 2324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 2320 of the illustrated example, thus, typically includes a graphics driver card, a graphics driver chip, and/or graphics processor circuitry such as a GPU.

The interface circuitry 2320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 2326. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 2300 of the illustrated example also includes one or more mass storage devices 2328 to store software and/or data. Examples of such mass storage devices 2328 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine readable instructions 2332, which may be implemented by the machine readable instructions of FIG. 5, may be stored in the mass storage device 2328, in the volatile memory 2314, in the non-volatile memory 2316, and/or on a removable non-transitory computer readable storage medium such as a CD or DVD.

Figure 24:
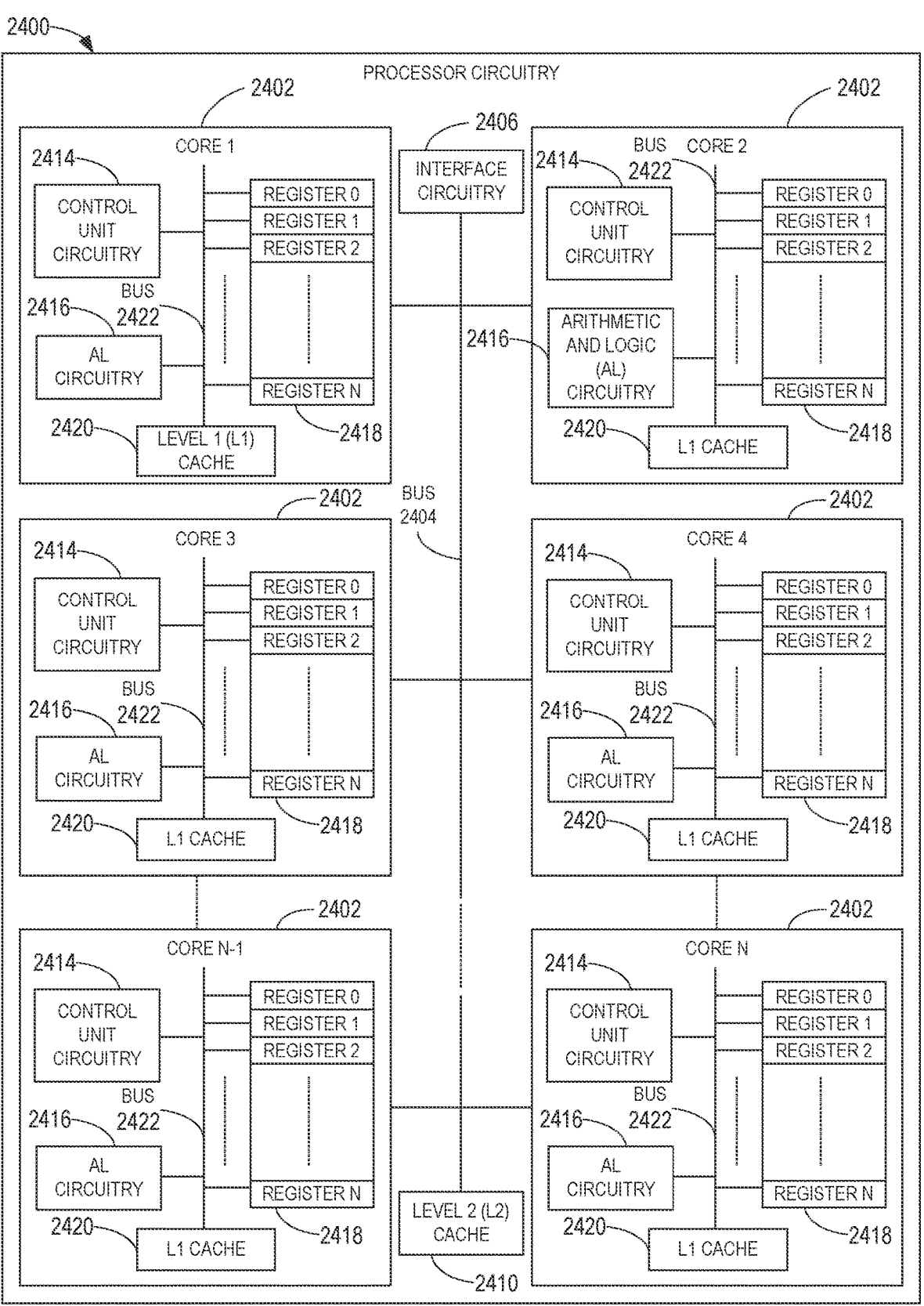
FIG. 24 is a block diagram of an example implementation of the processor circuitry of FIGS. 21-23.

FIG. 24 is a block diagram of an example implementation of the processor circuitry 2112, 2212, 2312 of FIGS. 21-23. In this example, the processor circuitry 2112, 2212, 2312 of FIGS. 21, 23, 23 is implemented by a microprocessor 2400. For example, the microprocessor 2400 may implement multi-core hardware circuitry such as a CPU, a DSP, a GPU, an XPU, etc. Although it may include any number of example cores 2402 (e.g., 1 core), the microprocessor 2400 of this example is a multi-core semiconductor device including N cores. The cores 2402 of the microprocessor 2400 may operate independently or may cooperate to execute machine readable instructions. For example, machine code corresponding to a firmware program, an embedded software program, or a software program may be executed by one of the cores 2402 or may be executed by multiple ones of the cores 2402 at the same or different times. In some examples, the machine code corresponding to the firmware program, the embedded software program, or the software program is split into threads and executed in parallel by two or more of the cores 2402. The software program may correspond to a portion or all of the machine readable instructions and/or operations represented by the flowcharts of FIGS. 5-8.

The cores 2402 may communicate by an example bus 2404. In some examples, the bus 2404 may implement a communication bus to effectuate communication associated with one(s) of the cores 2402. For example, the bus 2404 may implement at least one of an Inter-Integrated Circuit (I2C) bus, a Serial Peripheral Interface (SPI) bus, a PCI bus, or a PCIe bus. Additionally or alternatively, the bus 2404 may implement any other type of computing or electrical bus. The cores 2402 may obtain data, instructions, and/or signals from one or more external devices by example interface circuitry 2406. The cores 2402 may output data, instructions, and/or signals to the one or more external devices by the interface circuitry 2406. Although the cores 2402 of this example include example local memory 2420 (e.g., Level 1 (L1) cache that may be split into an L1 data cache and an L1 instruction cache), the microprocessor 2400 also includes example shared memory 2410 that may be shared by the cores (e.g., Level 2 (L2_cache)) for high-speed access to data and/or instructions. Data and/or instructions may be transferred (e.g., shared) by writing to and/or reading from the shared memory 2410. The local memory 2420 of each of the cores 2402 and the shared memory 2410 may be part of a hierarchy of storage devices including multiple levels of cache memory and the main memory (e.g., the main memory 2114, 2116 of FIG. 21). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 2402 may be referred to as a CPU, DSP, GPU, etc., or any other type of hardware circuitry. Each core 2402 includes control unit circuitry 2414, arithmetic and logic (AL) circuitry (sometimes referred to as an ALU) 2416, a plurality of registers 2418, the L1 cache 2420, and an example bus 2422. Other structures may be present. For example, each core 2402 may include vector unit circuitry, single instruction multiple data (SIMD) unit circuitry, load/store unit (LSU) circuitry, branch/jump unit circuitry, floating-point unit (FPU) circuitry, etc. The control unit circuitry 2414 includes semiconductor-based circuits structured to control (e.g., coordinate) data movement within the corresponding core 2402. The AL circuitry 2416 includes semiconductor-based circuits structured to perform one or more mathematic and/or logic operations on the data within the corresponding core 2402. The AL circuitry 2416 of some examples performs integer based operations. In other examples, the AL circuitry 2416 also performs floating point operations. In yet other examples, the AL circuitry 2416 may include first AL circuitry that performs integer based operations and second AL circuitry that performs floating point operations. In some examples, the AL circuitry 2416 may be referred to as an Arithmetic Logic Unit (ALU). The registers 2418 are semiconductor-based structures to store data and/or instructions such as results of one or more of the operations performed by the AL circuitry 2416 of the corresponding core 2402. For example, the registers 2418 may include vector register(s), SIMD register(s), general purpose register(s), flag register(s), segment register(s), machine specific register(s), instruction pointer register(s), control register(s), debug register(s), memory management register(s), machine check register(s), etc. The registers 2418 may be arranged in a bank as shown in FIG. 24. Alternatively, the registers 2418 may be organized in any other arrangement, format, or structure including distributed throughout the core 2402 to shorten access time. The bus 2422 may implement at least one of an I2C bus, a SPI bus, a PCI bus, or a PCIe bus.

Each core 2402 and/or, more generally, the microprocessor 2400 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 2400 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 25:
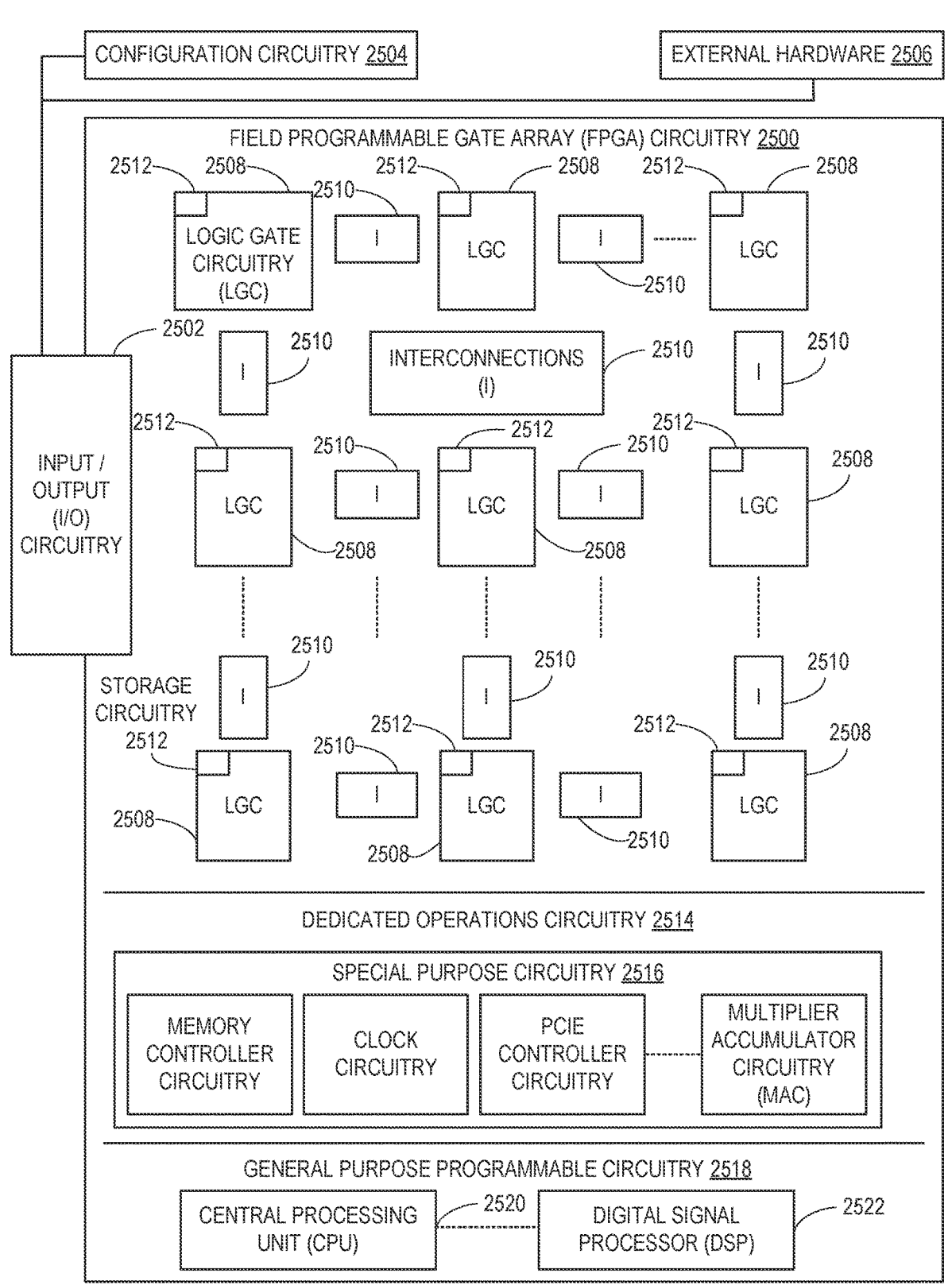
FIG. 25 is a block diagram of another example implementation of the processor circuitry of FIGS. 21-23.

FIG. 25 is a block diagram of another example implementation of the processor circuitry 2112, 2212, 2312 of FIGS. 21-23. In this example, the processor circuitry 2112, 2212, 2312 is implemented by FPGA circuitry 2500. The FPGA circuitry 2500 can be used, for example, to perform operations that could otherwise be performed by the example microprocessor 2400 of FIG. 24 executing corresponding machine readable instructions. However, once configured, the FPGA circuitry 2500 instantiates the machine readable instructions in hardware and, thus, can often execute the operations faster than they could be performed by a general purpose microprocessor executing the corresponding software.

More specifically, in contrast to the microprocessor 2400 of FIG. 24 described above (which is a general purpose device that may be programmed to execute some or all of the machine readable instructions represented by the flowcharts of FIGS. 5-8 but whose interconnections and logic circuitry are fixed once fabricated), the FPGA circuitry 2500 of the example of FIG. 25 includes interconnections and logic circuitry that may be configured and/or interconnected in different ways after fabrication to instantiate, for example, some or all of the machine readable instructions represented by the flowcharts of FIGS. 5-8. In particular, the FPGA 2500 may be thought of as an array of logic gates, interconnections, and switches. The switches can be programmed to change how the logic gates are interconnected by the interconnections, effectively forming one or more dedicated logic circuits (unless and until the FPGA circuitry 2500 is reprogrammed). The configured logic circuits enable the logic gates to cooperate in different ways to perform different operations on data received by input circuitry. Those operations may correspond to some or all of the software represented by the flowcharts of FIGS. 5-8. As such, the FPGA circuitry 2500 may be structured to effectively instantiate some or all of the machine readable instructions of the flowcharts of FIGS. 5-8 as dedicated logic circuits to perform the operations corresponding to those software instructions in a dedicated manner analogous to an ASIC. Therefore, the FPGA circuitry 2500 may perform the operations corresponding to the some or all of the machine readable instructions of FIGS. 5-8 faster than the general purpose microprocessor can execute the same.

In the example of FIG. 25, the FPGA circuitry 2500 is structured to be programmed (and/or reprogrammed one or more times) by an end user by a hardware description language (HDL) such as Verilog. The FPGA circuitry 2500 of FIG. 25, includes example input/output (I/O) circuitry 2502 to obtain and/or output data to/from example configuration circuitry 2504 and/or external hardware (e.g., external hardware circuitry) 2506. For example, the configuration circuitry 2504 may implement interface circuitry that may obtain machine readable instructions to configure the FPGA circuitry 2500, or portion(s) thereof. In some such examples, the configuration circuitry 2504 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 2506 may implement the microprocessor 2400 of FIG. 24. The FPGA circuitry 2500 also includes an array of example logic gate circuitry 2508, a plurality of example configurable interconnections 2510, and example storage circuitry 2512. The logic gate circuitry 2508 and interconnections 2510 are configurable to instantiate one or more operations that may correspond to at least some of the machine readable instructions of FIGS. 5-8 and/or other desired operations. The logic gate circuitry 2508 shown in FIG. 25 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2508 to enable configuration of the electrical structures and/or the logic gates to form circuits to perform desired operations. The logic gate circuitry 2508 may include other electrical structures such as look-up tables (LUTs), registers (e.g., flip-flops or latches), multiplexers, etc.

The interconnections 2510 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2508 to program desired logic circuits.

The storage circuitry 2512 of the illustrated example is structured to store result(s) of the one or more of the operations performed by corresponding logic gates. The storage circuitry 2512 may be implemented by registers or the like. In the illustrated example, the storage circuitry 2512 is distributed amongst the logic gate circuitry 2508 to facilitate access and increase execution speed.

The example FPGA circuitry 2500 of FIG. 25 also includes example Dedicated Operations Circuitry 2514. In this example, the Dedicated Operations Circuitry 2514 includes special purpose circuitry 2516 that may be invoked to implement commonly used functions to avoid the need to program those functions in the field. Examples of such special purpose circuitry 2516 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2500 may also include example general purpose programmable circuitry 2518 such as an example CPU 2520 and/or an example DSP 2522. Other general purpose programmable circuitry 2518 may additionally or alternatively be present such as a GPU, an XPU, etc., that can be programmed to perform other operations.

Although FIGS. 24 and 25 illustrate two example implementations of the processor circuitry 2112, 2212, 2312 of FIGS. 21, 22, 23, many other approaches are contemplated. For example, as mentioned above, modern FPGA circuitry may include an on-board CPU, such as one or more of the example CPU 2520 of FIG. 25. Therefore, the processor circuitry 2112, 2212, 2312 of FIGS. 21, 22, 23 may additionally be implemented by combining the example microprocessor 2400 of FIG. 24 and the example FPGA circuitry 2500 of FIG. 25. In some such hybrid examples, a first portion of the machine readable instructions represented by the flowcharts of FIGS. 5-8 may be executed by one or more of the cores 2402 of FIG. 24 and a second portion of the machine readable instructions represented by the flowchart of FIGS. 5-8 may be executed by the FPGA circuitry 2500 of FIG. 25.

In some examples, the processor circuitry 2112, 2212, 2312 of FIGS. 21, 22, 23 may be in one or more packages. For example, the processor circuitry 2400 of FIG. 24 and/or the FPGA circuitry 2500 of FIG. 25 may be in one or more packages. In some examples, an XPU may be implemented by the processor circuitry 2112, 2212, 2312 of FIGS. 21, 22, 23, which may be in one or more packages. For example, the XPU may include a CPU in one package, a DSP in another package, a GPU in yet another package, and an FPGA in still yet another package.

Figure 26:
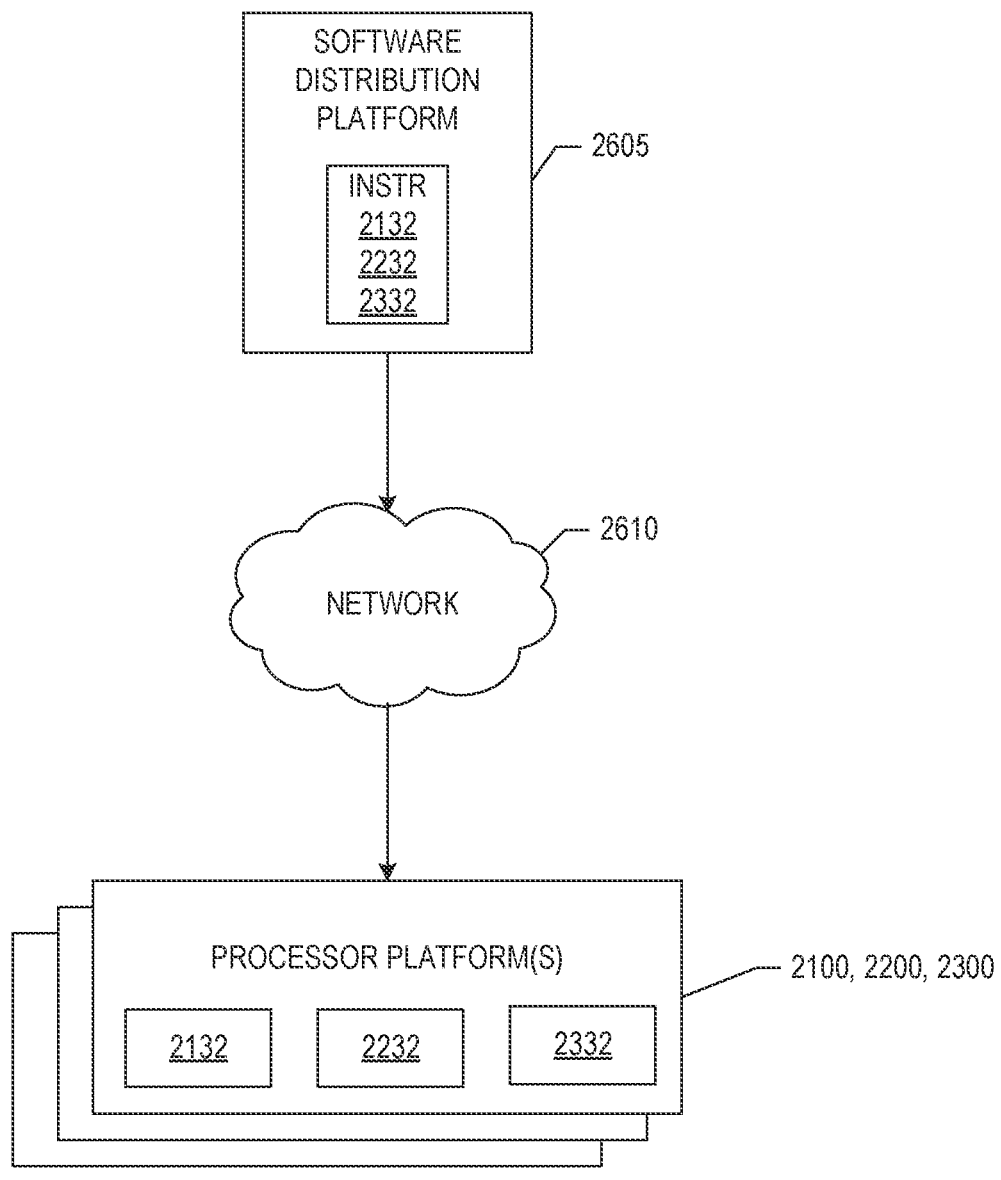
FIG. 26 is a block diagram of an example software distribution platform (e.g., one or more servers) to distribute software (e.g., software corresponding to the example machine readable instructions of FIGS. 5, 6, 7) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 2605 to distribute software such as the example machine readable instructions 2132, 2232, 2332 of FIGS. 21, 22, 23 to hardware devices owned and/or operated by third parties is illustrated in FIG. 26. The example software distribution platform 2605 may be implemented by any computer server, data facility, cloud service, etc., capable of storing and transmitting software to other computing devices. The third parties may be customers of the entity owning and/or operating the software distribution platform 2605. For example, the entity that owns and/or operates the software distribution platform 2605 may be a developer, a seller, and/or a licensor of software such as the example machine readable instructions 2132, 2232, 2332 of FIGS. 21, 22, 23. The third parties may be consumers, users, retailers, OEMs, etc., who purchase and/or license the software for use and/or re-sale and/or sub-licensing. In the illustrated example, the software distribution platform 2605 includes one or more servers and one or more storage devices. The storage devices store the machine readable instructions 2132, 2232, 2332 of FIGS. 21, 22, 23, which may correspond to the example machine readable instructions of FIGS. 5-8, as described above. The one or more servers of the example software distribution platform 2605 are in communication with a network 2610, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 2132, 2232, 2332 of FIGS. 21, 22, 23 from the software distribution platform 2605. For example, the software, which may correspond to the example machine readable instructions of FIGS. 5-8, may be downloaded to the example processor platform 2100, 2200, 2300, which is to execute the machine readable instructions 2132, 2232, 2332 of FIGS. 21, 22, 23 to implement the voxelized reference generating circuitry 202 of FIG. 2, the training circuitry 302 of FIG. 3, and/or the controlling circuitry 402 of FIG. 4. In some example, one or more servers of the software distribution platform 2605 periodically offer, transmit, and/or force updates to the software (e.g., the example machine readable instructions 2132, 2232, 2332 of FIGS. 21, 22, 23) to ensure improvements, patches, updates, etc., are distributed and applied to the software at the end user devices.

From the foregoing, it will be appreciated that methods and apparatus described herein permit the control of 3D-printing process inputs (e.g., power, spot size, scan speed, intensity profile, etc.) based on a generated voxelized reference map and/or printing sensor suite inputs used to control the part quality to a desired level. In the examples disclosed herein, a control algorithm is used to maximize or otherwise increase the efficiency of various models, including a model for capturing thermal characteristics of a complex part, a model for estimating meltpool properties for given process parameters and geometric features, and/or a model that estimates meltpool characteristics from sensor-based data. In the examples disclosed herein, a set of algorithms can be used to minimize or otherwise reduce an error metric between the reference map and the process observable estimates, adjusting the process input parameters (e.g., power, speed, spot-size, beam profile, etc.) to drive the error metric down to an acceptable value so that the desired quality (e.g., as intended by the reference map) is maintained. The corrective actions are applicable in a real-time setting at individual voxel levels, strike levels, layer levels, build levels and/or a combination thereof.

Example methods, apparatus, systems, and articles of manufacture for sensor-assisted part development in additive manufacturing are disclosed herein. Further examples and combinations thereof include the following:

Example 1 includes an apparatus for voxelized reference generation, comprising at least one memory, instructions in the apparatus, and processor circuitry to execute the instructions to translate at least one user-defined material property selection into a desired process observable, the desired process observable including a meltpool property, perform voxel-based autozoning of an input part geometry, the input part geometry based on a computer-generated design, and output a voxelized reference map for the input part geometry based on the desired process observable and the voxel-based autozoning.

Example 2 includes the apparatus of any preceding clause, wherein the user-defined material property selection includes at least one of a porosity or a surface finish.

Example 3 includes the apparatus of example 1, wherein the voxelized reference map includes one or more zones based on the input part geometry, wherein the user-defined material property selection is translated to a process observable for each zone.

Example 4 includes the apparatus of any preceding clause, wherein the one or more zones are discrete or continuous.

Example 5 includes the apparatus of any preceding clause, wherein the voxel-based autozoning includes using a drill down model to compute voxel distance from a down-facing surface.

Example 6 includes the apparatus of any preceding clause, wherein the voxel-based autozoning includes setting a reference for a voxel based on a vertical distance of the voxel from an underlying powder location.

Example 7 includes the apparatus of any preceding clause, wherein the voxel-based autozoning includes setting a reference for a voxel based on a thermal leakage characteristic of the voxel.

Example 8 includes a method for voxelized reference generation, comprising translating at least one user-defined material property selection into a desired process observable, the desired process observable including a meltpool property, performing voxel-based autozoning of an input part geometry, the input part geometry based on a computer-generated design, and outputting a voxelized reference map for the input part geometry based on the desired process observable and the voxel-based autozoning.

Example 9 includes the method of any preceding clause, wherein the user-defined material property selection includes at least one of a porosity or a surface finish.

Example 10 includes the method of any preceding clause, wherein the voxelized reference map includes one or more zones based on the input part geometry, wherein the user-defined material property selection is translated to a process observable for each zone.

Example 11 includes the method of any preceding clause, wherein the one or more zones are discrete or continuous.

Example 12 includes the method of any preceding clause, further including using a drill down model to compute voxel distance from a downfacing surface.

Example 13 includes the method of any preceding clause, further including setting a reference for a voxel based on a vertical distance of the voxel from an underlying powder location.

Example 14 includes the method of any preceding clause, further including setting a reference for a voxel based on a thermal leakage characteristic of the voxel.

Example 15 includes a non-transitory computer readable storage medium comprising instructions that, when executed, cause a processor to at least translate at least one user-defined material property selection into a desired process observable, the desired process observable including a meltpool property, perform voxel-based autozoning of an input part geometry, the input part geometry based on a computer-generated design, and output a voxelized reference map for the input part geometry based on the desired process observable and the voxel-based autozoning.

Example 16 includes the non-transitory computer readable storage medium of any preceding clause, wherein the voxelized reference map includes one or more zones based on the input part geometry, wherein the user-defined material property selection is translated to a process observable for each zone.

Example 17 includes the non-transitory computer readable storage medium of any preceding clause, wherein the one or more zones are discrete or continuous.

Example 18 includes the non-transitory computer readable storage medium of any preceding clause, wherein the processor is to perform autozoning using a drill down model to compute voxel distance from a downfacing surface.

Example 19 includes the non-transitory computer readable storage medium of any preceding clause, wherein the processor is to identify a reference for a voxel based on a vertical distance of the voxel from an underlying powder location.

Example 20 includes the non-transitory computer readable storage medium of any preceding clause, wherein the processor is to perform autozoning by setting a reference for a voxel based on a thermal leakage characteristic of the voxel.

Example 21 includes an apparatus, comprising at least one memory, instructions in the apparatus, and processor circuitry to execute the instructions to identify a reference process observable of a computer-generated part, receive input from at least one sensor during three-dimensional printing to identify an estimated process observable using feature extraction, and adjust at least one three-dimensional printing process parameter to reduce an error identified from a mismatch between the estimated process observable and the reference process observable.

Example 22 includes the apparatus of any preceding clause, wherein the processor circuitry is to identify the reference process observable based on a material property or a geometric feature of the computer-generated part.

Example 23 includes the apparatus of any preceding clause, wherein the reference process observable or the estimated process observable is at least one of a meltpool width, a meltpool depth, a meltpool height, a temperature profile, or a cooling rate.

Example 24 includes the apparatus of any preceding clause, wherein, when the reference process observable is a meltpool characteristic, the processor circuitry is to extract meltpool features, in real-time or offline, using the at least one sensor.

Example 25 includes the apparatus of any preceding clause, wherein the processor circuitry is to adjust the at least one three-dimensional printing process parameter based on at least one of a real-time, a layer-to-layer, or a build-to-build feedback implementation.

Example 26 includes the apparatus of any preceding clause, wherein the processor circuitry is to obtain (1) first estimated process observable information from a previous build using the build-to-build feedback implementation and (2) second estimated process observable information from a previous layer of the same build using the layer-to-layer feedback implementation.

Example 27 includes the apparatus of any preceding clause, wherein the at least one three-dimensional printing process parameter includes at least one of a power, a speed, a focus, a beam shape, or an energy density.

Example 28 includes the apparatus of any preceding clause, wherein the at least one sensor includes an on-axis sensor or an off-axis sensor.

Example 29 includes a method, comprising identifying a reference process observable of a computer-generated part, receiving input from at least one sensor during three-dimensional printing to identify an estimated process observable using feature extraction, and adjusting at least one three-dimensional printing process parameter to reduce an error identified from a mismatch between the estimated process observable and the reference process observable.

Example 30 includes the method of any preceding clause, further including identifying the reference process observable based on a material property or a geometric feature of the computer-generated part.

Example 31 includes the method of any preceding clause, wherein the reference process observable or the estimated process observable is at least one of a meltpool width, a meltpool depth, a meltpool height, a temperature profile, or a cooling rate.

Example 32 includes the method of any preceding clause, further including, when the reference process observable is a meltpool characteristic, extracting meltpool features, in real-time or offline, using the at least one sensor.

Example 33 includes the method of any preceding clause, further including adjusting the at least one three-dimensional printing process parameter based on at least one of a real-time, a layer-to-layer, or a build-to-build feedback implementation.

Example 34 includes the method of any preceding clause, further including (1) obtaining first estimated process observable information from a previous build using the build-to-build feedback implementation and (2) obtaining second estimated process observable information from a previous layer of the same build using the layer-to-layer feedback implementation.

Example 35 includes the method of any preceding clause, wherein the at least one three-dimensional printing process parameter includes at least one of a power, a speed, a focus, a beam shape, or an energy density.

Example 36 includes the method of any preceding clause, wherein the at least one sensor includes an on-axis sensor or an off-axis sensor.

Example 37 includes a non-transitory computer readable storage medium comprising instructions that, when executed, cause a processor to at least identify a reference process observable based on a computer-generated part, receive input from at least one sensor during three-dimensional printing to identify an estimated process observable using feature extraction, and adjust at least one three-dimensional printing process parameter to reduce an error identified from a mismatch between the estimated process observable and the reference process observable.

Example 38 includes the non-transitory computer readable storage medium of any preceding clause, wherein the processor is to identify the reference process observable based on a material property or a geometric feature of the computer-generated part.

Example 39 includes the non-transitory computer readable storage medium of any preceding clause, wherein the processor is to adjust the at least one three-dimensional printing process parameter based on at least one of a real-time, a layer-to-layer, or a build-to-build feedback implementation.

Example 40 includes the non-transitory computer readable storage medium of any preceding clause, wherein the processor is to obtain (1) first estimated process observable information from a previous build using the build-to-build feedback implementation and (2) second estimated process observable information from a previous layer of the same build using the layer-to-layer feedback implementation.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus for voxelized reference generation, comprising:

at least one memory;

instructions in the apparatus; and processor circuitry to execute the instructions to:

translate at least one user-defined material property selection into a desired process observable, the desired process observable including a meltpool property;

perform voxel-based autozoning of an input part geometry, the input part geometry based on a computer-generated design;

output a voxelized reference map for the input part geometry based on the desired process observable and the voxel-based autozoning;

train a machine learning model to predict the desired process observable based on input from one or more sensors of a three-dimensional printer; and update, based on the machine learning model, at least one of a layer-to-layer or a build-to-build algorithm for energy density based on one or more identified desired process observable errors.

2. The apparatus of claim 1, wherein the user-defined material property selection includes at least one of a porosity or a surface finish.

3. The apparatus of claim 1, wherein the voxelized reference map includes one or more zones based on the input part geometry, wherein the user-defined material property selection is translated to a process observable for each zone.

4. The apparatus of claim 3, wherein the one or more zones are discrete or continuous.

5. The apparatus of claim 1, wherein the voxel-based autozoning includes using a drill down model to compute voxel distance from a downfacing surface.

6. The apparatus of claim 5, wherein the voxel-based autozoning includes setting a reference for a voxel based on a vertical distance of the voxel from an underlying powder location.

7. The apparatus of claim 1, wherein the voxel-based autozoning includes setting a reference for a voxel based on a thermal leakage characteristic of the voxel.

8. A method for voxelized reference generation, comprising:

translating at least one user-defined material property selection into a desired process observable, the desired process observable including a meltpool property;

performing voxel-based autozoning of an input part geometry, the input part geometry based on a computer-generated design; outputting a voxelized reference map for the input part geometry based on the desired process observable and the voxel-based autozoning; and training a machine learning model to predict the desired process observable based on input from one or more sensors of a three-dimensional printer; and updating, based on the machine learning model, at least one of a layer-to-layer or a build-to-build algorithm for energy density based on one or more identified desired process observable errors.

9. The method of claim 8, wherein the user-defined material property selection includes at least one of a porosity or a surface finish.

10. The method of claim 8, wherein the voxelized reference map includes one or more zones based on the input part geometry, wherein the user-defined material property selection is translated to a process observable for each zone.

11. The method of claim 10, wherein the one or more zones are discrete or continuous.

12. The method of claim 8, further including using a drill down model to compute voxel distance from a downfacing surface.

13. The method of claim 12, further including setting a reference for a voxel based on a vertical distance of the voxel from an underlying powder location.

14. The method of claim 8, further including setting a reference for a voxel based on a thermal leakage characteristic of the voxel.

15. A non-transitory computer readable storage medium comprising instructions that, when executed, cause a processor to at least:

translate at least one user-defined material property selection into a desired process observable, the desired process observable including a meltpool property;

perform voxel-based autozoning of an input part geometry, the input part geometry based on a computer-generated design; output a voxelized reference map for the input part geometry based on the desired process observable and the voxel-based autozoning; and train a machine learning model to predict the desired process observable based on input from one or more sensors of a three-dimensional printer; and update, based on the machine learning model, at least one of a layer-to-layer or a build-to-build algorithm for energy density based on one or more identified desired process observable errors.

16. The non-transitory computer readable storage medium of claim 15, wherein the voxelized reference map includes one or more zones based on the input part geometry, wherein the user-defined material property selection is translated to a process observable for each zone.

17. The non-transitory computer readable storage medium of claim 16, wherein the one or more zones are discrete or continuous.

18. The non-transitory computer readable storage medium of claim 15, wherein the processor is to perform autozoning using a drill down model to compute voxel distance from a downfacing surface.

19. The non-transitory computer readable storage medium of claim 18, wherein the processor is to identify a reference for a voxel based on a vertical distance of the voxel from an underlying powder location.

20. The non-transitory computer readable storage medium of claim 15, wherein the processor is to perform autozoning by setting a reference for a voxel based on a thermal leakage characteristic of the voxel.

*    *    *    *    *